(12) United States Patent
Tanaka et al.

(10) Patent No.: US 7,792,398 B2
(45) Date of Patent: Sep. 7, 2010

(54) OPTICALLY CONTROLLED OPTICAL-PATH-SWITCHING-TYPE DATA DISTRIBUTION APPARATUS AND DISTRIBUTION METHOD

(75) Inventors: Norio Tanaka, Tokyo (JP); Ichiro Ueno, Isehara (JP); Takashi Hiraga, Ikeda (JP); Nobutaka Tanigaki, Ikeda (JP); Toshiko Mizokuro, Ikeda (JP); Noritaka Yamamoto, Ikeda (JP); Hiroyuki Mochizuki, Ikeda (JP)

(73) Assignees: Dainichiseika Color & Chemicals Mfg. Co., Ltd., Tokyo (JP); National Institute of Advanced Industrial Science and Technology, Tokyo (JP)

( * ) Notice: Subject to any disclaimer, the term of this patent is extended or adjusted under 35 U.S.C. 154(b) by 1083 days.

(21) Appl. No.: 10/586,854

(22) PCT Filed: Mar. 14, 2005

(86) PCT No.: PCT/JP2005/004895

§ 371 (c)(1),
(2), (4) Date: Jul. 20, 2006

(87) PCT Pub. No.: WO2005/089010

PCT Pub. Date: Sep. 22, 2005

(65) Prior Publication Data

US 2007/0159682 A1    Jul. 12, 2007

(30) Foreign Application Priority Data

Mar. 16, 2004    (JP)    ............... 2004-074874

(51) Int. Cl.
*G02B 6/26* (2006.01)
*G02B 6/28* (2006.01)
*G02B 6/32* (2006.01)
*G02F 1/295* (2006.01)
*G02F 1/01* (2006.01)
*H04J 14/00* (2006.01)
*H04J 14/02* (2006.01)

(52) U.S. Cl. ............... 385/16; 385/4; 385/5; 385/24; 385/33; 359/244; 398/45; 398/71

(58) Field of Classification Search ............... None
See application file for complete search history.

(56) References Cited

U.S. PATENT DOCUMENTS 5,659,351 A * 8/1997 Huber ............... 725/101

(Continued)

FOREIGN PATENT DOCUMENTS

EP    1 011 007 A1    6/2000

(Continued)

OTHER PUBLICATIONS

Ueno et al. "Development of Optically Controlled Optical Switch", Light Alliance, Nov. 1, 2003, vol. 14, No. 11, pp. 26-29.*

(Continued)

*Primary Examiner*—Michelle R Connelly Cushwa
(74) *Attorney, Agent, or Firm*—Oliff & Berridge, PLC

(57) ABSTRACT

Data to be sent are, in a data communication unit, first divided into electric signal packets by a data transmission/receipt control unit, whereby an electric signal sequence tag is added to each electric signal packet, then converted into optical packets by an optical signal transmitting unit, and transmitted through an optical signal path. At optical switch, the optical paths of the packets are switched to optical signal paths by the actions of optical destination tags that are respectively synchronized with optical packets and irradiated by an optical signal transmitting unit. At optical signal receiving units, the received optical packets are converted to electric signal packets, and reassembled to be original data according to the identification information on the reassembly sequence recorded in the sequence tag in an electric signal packet by data transmission/receipt control units, and distributed to client devices as electric signals.

9 Claims, 26 Drawing Sheets

U.S. PATENT DOCUMENTS

| | | |
|---|---|---|
| 6,452,710 B1 | 9/2002 | Hiraga et al. |
| 6,529,301 B1 | 3/2003 | Wang |
| 7,461,292 B2 * | 12/2008 | Barge et al. .................. 714/15 |

FOREIGN PATENT DOCUMENTS

| | | |
|---|---|---|
| JP | A 60-014221 | 1/1985 |
| JP | A 63-243298 | 10/1988 |
| JP | A 04-099609 | 3/1992 |
| JP | 05219540 A * | 8/1993 |
| JP | A 8-286220 | 11/1996 |
| JP | A 8-320535 | 12/1996 |
| JP | A 8-320536 | 12/1996 |
| JP | B2-2599569 | 1/1997 |
| JP | A 9-329816 | 12/1997 |
| JP | A 10-090733 | 4/1998 |
| JP | A 10-090734 | 4/1998 |
| JP | 10-148852 | 6/1998 |
| JP | A 10-148853 | 6/1998 |
| JP | A 11-194373 | 7/1999 |
| JP | A 2001-119734 | 4/2001 |
| JP | A 2003-324456 | 11/2003 |
| JP | A 2004-109892 | 4/2004 |
| JP | A 2005-234356 | 9/2005 |
| WO | WO 2004/027508 A1 | 4/2004 |

OTHER PUBLICATIONS

Ueno, I., et al. "Development of Optically Controlled Optical Switch," *Light Alliance*, vol. 14, No. 11, pp. 26-29, Nov. 1, 2003.

* cited by examiner

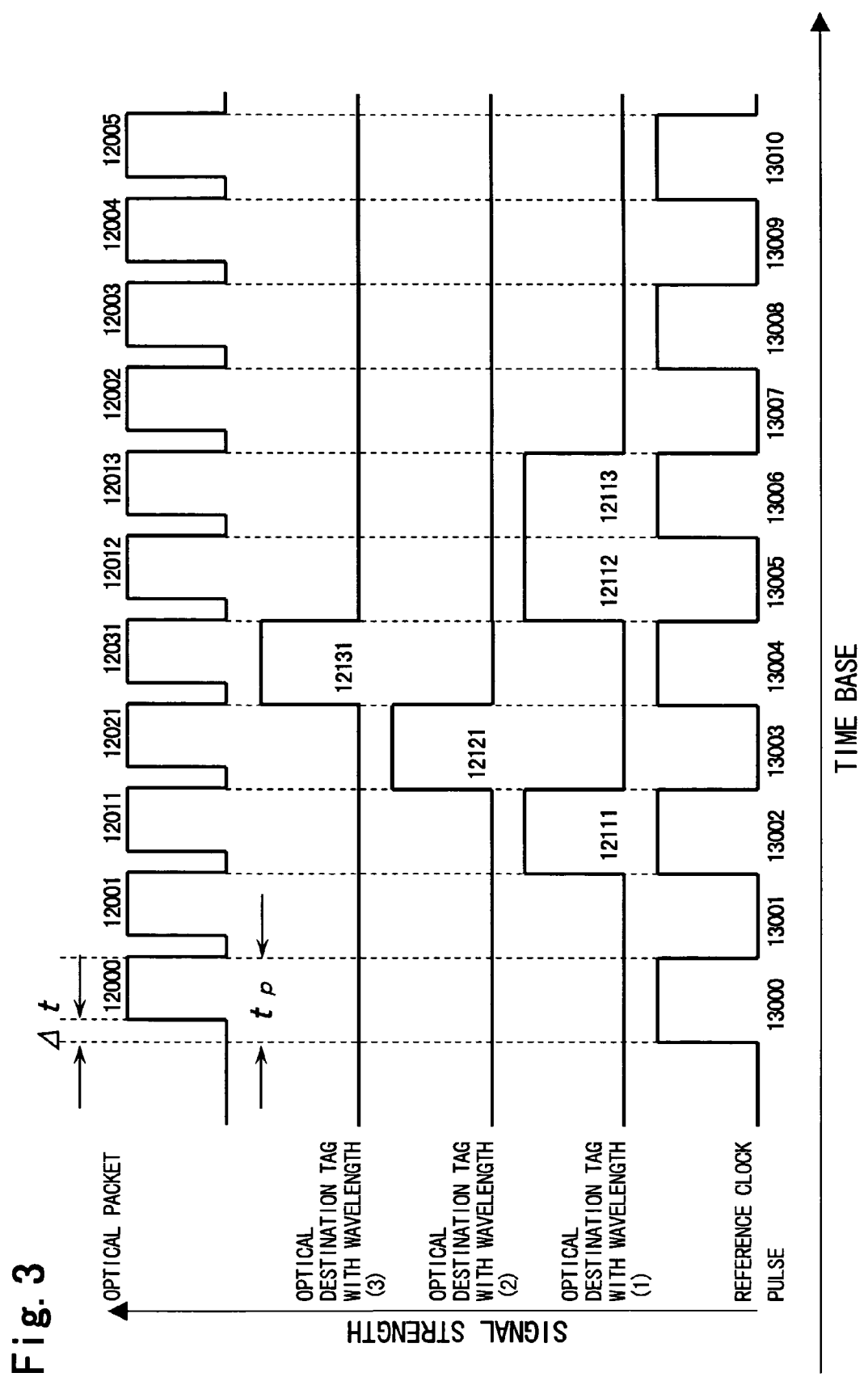

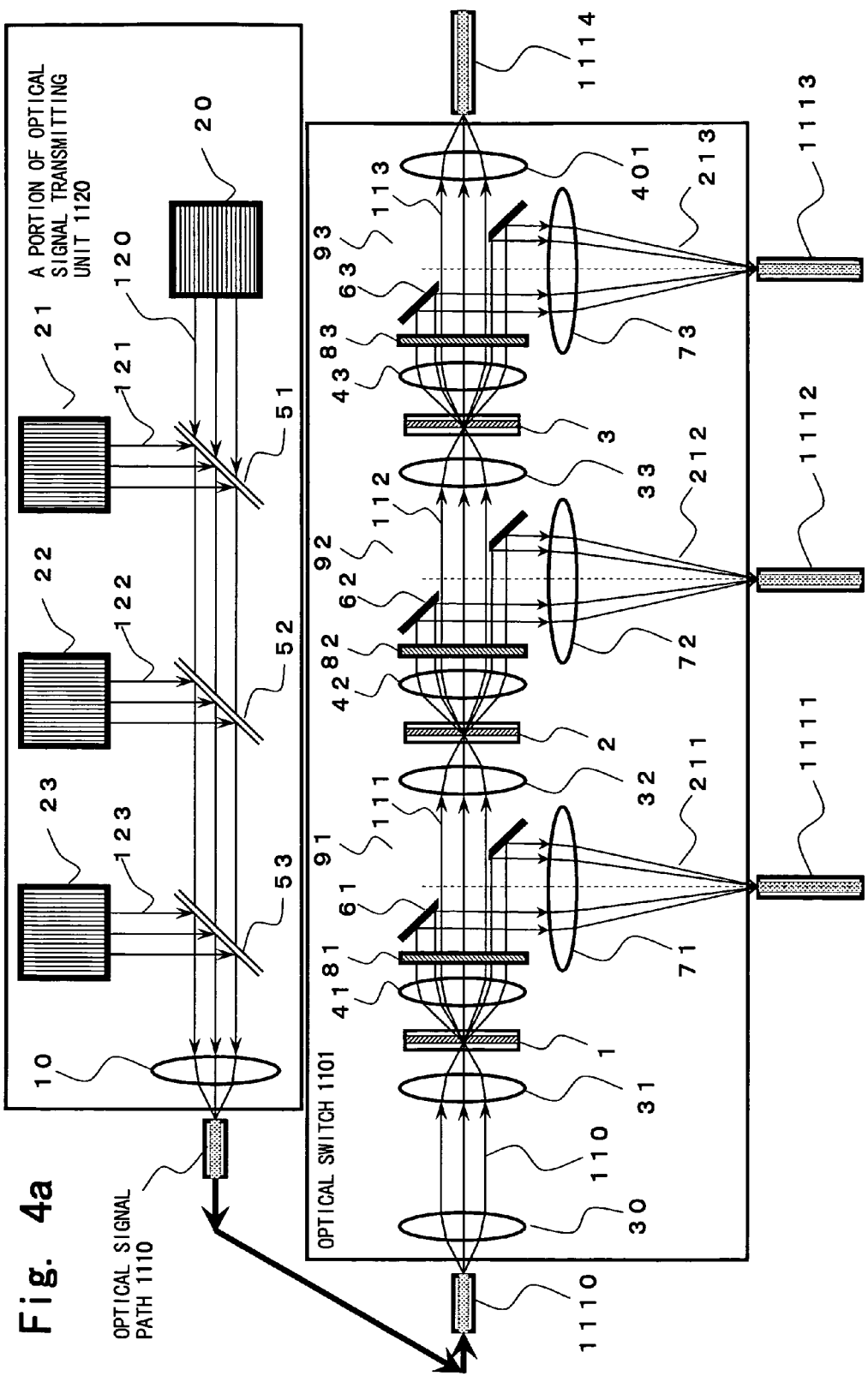

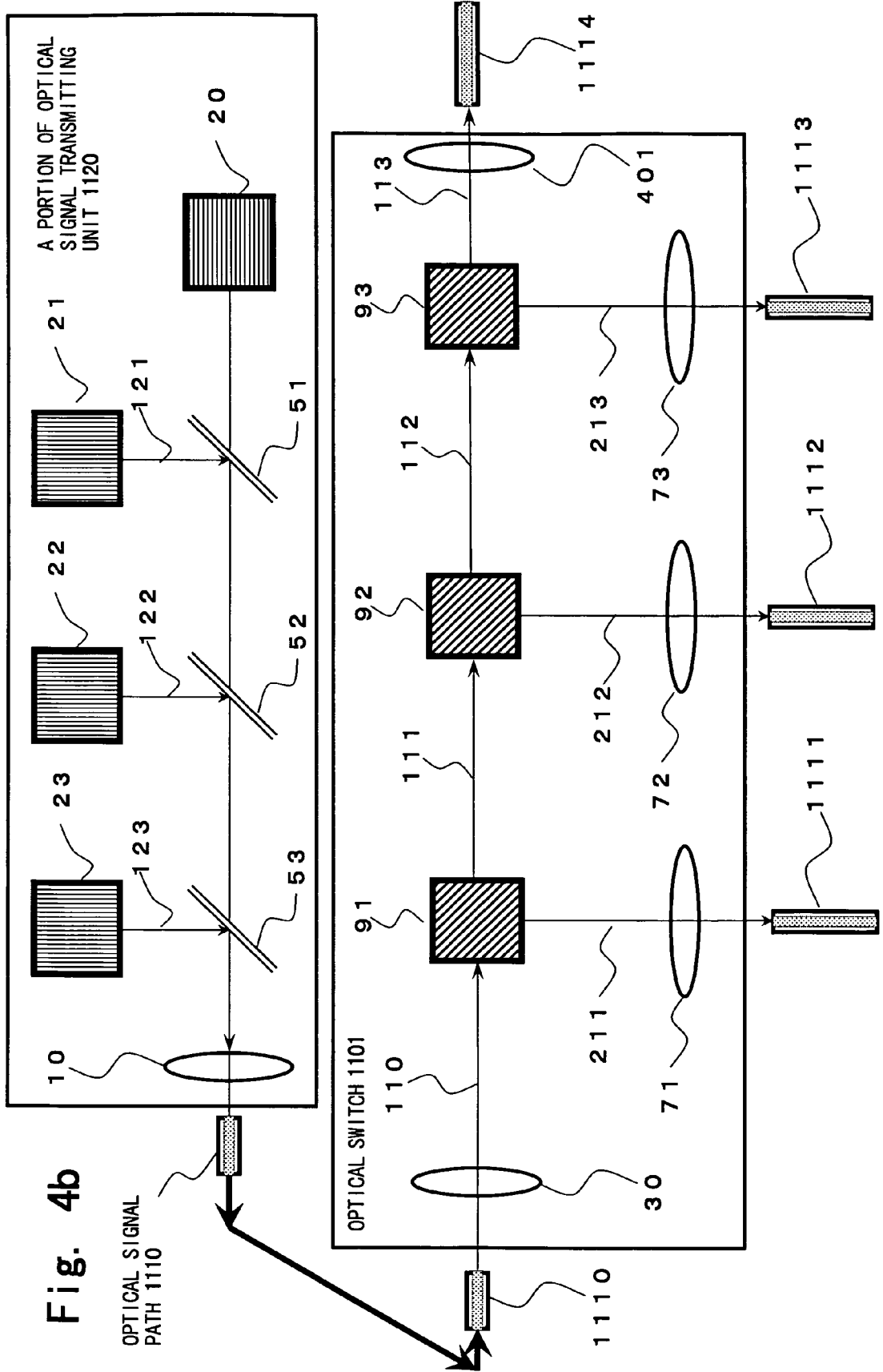

OPTICALLY CONTROLLED OPTICAL-PATH-SWITCHING-TYPE DATA DISTRIBUTION APPARATUS AND DISTRIBUTION METHOD

BACKGROUND OF THE INVENTION

1. Field of the Invention

The present invention relates to an optically controlled optical-path-switching-type data distribution apparatus and distribution method. More specifically, the present invention relates to an optically controlled optical path switching type data distribution apparatus and distribution method using an optical packet communication system to distribute a large volume of digital data such as high definition image data, high definition moving image data, etc. from a server to a specific client among a plurality of clients in an office of a company, a plant, a hospital, an ordinary home, etc.

2. Description of the Invention

Due to the dramatic progress of personal computers and their peripheral equipment, an almost inconceivably large volume of digital data including digitized and recorded high-definition static and moving images is transmitted everyday. For example, when a conventional color television program is digitized and recorded on a hard disk type storage unit in a personal computer or on an optical recording medium such as a DVD at home, a large volume of digital data with several gigabytes of data per one airtime hour is handled. Furthermore, with the advancement and improvement of diagonal medical instruments, super high-definition static images and digital high-vision images represented by 1600×1200 pixels or more are used, for example, to detect a cancer in early stages. An example is that a cancerous growth as small as 1 mm, or even smaller, in an early stage can be detected by rendering a three dimensional image by combining 1000 sliced images of a human body, each image having 1600× 1200 pixels, on a display.

Recently, because the capacity of typical hard disk type storage units has increased, the recording of such high definition static images and moving images is not highly problematic. However, quick transfer or transmission of an image data to a remote site (another room within a hospital, a classroom in a university hospital and another site for remote treatment) still requires several minutes to several tens of minutes, even when using a high speed LAN capable of communication at 1 gigabit per second. Therefore, transfer of such a large volume of digital data to an optical recording medium such as DVD first has been practiced, however, a significant time is required to record the data and to physically transport the recording medium. However, as medical use requires electromagnetic compatibility, it is desirable that a large volume of digital data can be transmitted in the form of optical signals from a transmitting device provided with an electromagnetic shield to a receiving device also provided with an electromagnetic, without employing any electric signals during the transmission path. Such a configuration would be preferable in order to minimize generation of electromagnetic waves associated with transmission and reception of the high speed digital data, as well as switching of transmission paths, and further to eliminate interference from electromagnetic waves originating from external sources.

Currently, mass-produced optical transceivers having a data communication speed on the order of 10 to 40 Gbps per second are available and are successfully operated in data distribution devices in which their data transmitting and receiving sides are connected via optical fiber. In the field of data delivery using optical signals, the most strongly desired technological development is an optical path switching unit (optical switch), or light-to-light direct switching unit that does not employ an electric signal for use in high speed distribution of data from a data distribution device (server) to specific client devices.

Known apparatuses and methods for switching the path of light traveling through space (optical paths) include, for example, a space division type that switches optical paths in an optical waveguide or between optical waveguides, a wavelength division multiplexing type that switches a multiplexed light beam having a plurality of wavelengths by dividing the light beam for optical paths according to the wavelength, a time division multiplexing type that switches optical paths of light beams that is time-division-multiplexed at an constant time interval and a free space type that divides and couples spatially optical paths of light beams propagating through space using a mirror or a shutter. Each of these schemes can be multiplexed or a plurality of different schemes can be used in combination.

Proposed space-division-type optical switches include those that utilize a directional coupler, those that create a copy of an optical signal using an optical dropper and switch a light beam between ON and OFF using a gate device, those that transmit or reflect a light beam propagating a waveguide by varying the refractive index of the waveguide at a crossing portion of an intersection or a Y-shaped branching point, and others. However, all of these remain in the stage of research and development. Apparatuses employing a thermo-optical effect created by using an electric heater to vary the refractive index of a waveguide of a Mach-Zehnder-interferometer-type optical waveguide switch are approaching practical application, but such apparatuses are disadvantageous in that this type of apparatus has a low response speed, of approximately 1 millisecond, and also requires an electric signal to operate the optical switch.

Meanwhile, available free-space-type optical switches include a micro-electro mechanical system (abbreviated to MEMS), an exciton absorption reflection switch (abbreviated to EARS), a multi-stage-beam-deflector-type optical switch, a hologram-type switch, a liquid crystal switch, and others. However, these switches cannot be said to be sufficiently developed for practical use because they have assignments such as that they have mechanically movable portions; they are dependent on polarized electromagnetic radiation, and other factors.

On the other hand, there is active study of total-light-type optical devices or optical control methods that modulate the intensity or the frequency of a light beam directly by utilizing variation of the transmittance or the refractive index caused when an optical device is irradiated with light. The inventors of the invention described in the present application are continuing an ongoing study of an optical control method aimed at development of a new information processing technique with a total-light-type optical device, etc. using an organic nanoparticle thermo-optical lens forming device formed by dispersing organic pigment aggregate in a polymer matrix (see Takashi Hiraga, Norio Tanaka, Kikuko Hayamizu and Tetsuo Moriya, "Formation, Structure Evaluation and Photo-Material Property of Associated/Aggregated Pigment", Journal of Electronic Technology General Institute, Electronic Technology General Institute, Agency of Industrial Science and Technology, Ministry of International Trade and Industry, Vol. 59, No. 2, pp. 29-49 (1994)). Currently, a device employing a scheme that modulates a signal light beam (780 nm) by a control light beam (633 nm), having a characteristic that the control light beam and the signal light beam are coaxial and have incidence of the same focal point, and based on an operational principle that the signal light beam is refracted by a thermal lens formed transiently by absorption of the control light beam, is being developed and a high-speed response of approximately 20 nanoseconds has been achieved. Japanese Patent Application Laid-Open Publications Nos. 1996-286220, 1996-320535, 1996-320536, 1997-329816, 1998-90733, 1998-90734 and 1998-148852 disclose an optical control method of carrying out intensity modulation and/or light flux density modulation of a signal light beam transmitted through an optical device by reversibly varying the transmittance and/or the refractive index of the signal light beam in a different wavelength band from that of the control light beam by irradiating the optical device comprising optically responsive composition, with the control light beam, wherein the control light beam and the signal light beam are converged and irradiated on the optical device, and the optical paths of the control light beam and the signal light beam are adjusted such that an area having the highest photon density in the vicinity of a focus (beam waist) of each of the control light beam and the signal light beam are overlapped on each other in the optical device. Furthermore, Japanese Patent Application Laid-Open Publication No. 1998-148853 discloses an optical control method of carrying out intensity modulation and/or light flux density modulation of a signal light beam transmitting a thermal lens by reversibly forming the thermal lens based on the distribution of density variation caused by a temperature increase generated in an area of the photo-responsive composition, that has absorbed the control light beam and the surrounding area thereof, wherein a control light beam and the signal light beam having a wavelength different from each other are irradiated on an optical device comprising photo-responsive composition, the wavelength of the control light beam is selected from a wavelength band that the photo-responsive composition absorbs. Yet further, in Japanese Patent Application Laid-Open Publication No. 1998-148853, it is described that a pigment/resin film or a pigment solution film is, for example, used as the optical device and a response time of the signal light beam against the irradiated control light beam for the case where the control light beam has a power of 2 to 25 mW is shorter than 2 μsec.

Here, the thermal lens effect is a refractive effect in which molecules, etc. that have absorbed light in the central area of light absorption convert the light into heat, a temperature distribution is created by propagation of this heat to the surrounding area, and, as a result, the refractive index of an optical transmitting matter is varied spherically from the center of the light absorption to the outer region to create a distribution for the refractive index which is lower at the center of the light absorption and higher continuing outward, with functions similar to those of a convex lens. The thermal lens effect has long been utilized in the field of spectral analysis, and an ultra high sensitivity spectral analysis can be carried out that can detect the light absorption of even a single molecule (see Kitao Fujiwara, Keiichiro Fuwa and Takayosi Kobayasi, "A Laser-Induced Thermal Lens Effect and Its Application to Calorimetry", Chemistry, Kagaku-Dojin, Vol. 36, No. 6, pp. 432-438 (1981); Takehiko Kitamori and Tsuguro Sawada, "Photo-Thermo Conversion Spectral Analysis Method", Bunseki, Japanese Society of Analytical Chemistry, March, 1994, pp. 178-187).

Moreover, Japanese Patent Application Laid-Open Publication No. 1985-14221 discloses, as a method of deflecting an optical path using variation of refractive index caused by the thermal lens effect or heat, a method of deflecting a light beam by creating a distribution of refractive index in a medium by providing heat using a heating resistor.

However, because, in all of the above methods, heat is produced using a heating resistor and a medium is heated using conduction, these methods have an intrinsic problem of diffusion of heat. That is, because of the diffusion of heat, a fine thermal gradient cannot be provided over a large area and a desired distribution of the refractive index cannot not be easily or reliably obtained. Furthermore, in actual practice, the fine processing of a heating resistor is limited, even when a photolithography technique used for semiconductor integrated circuits is employed, such that it is not possible to prevent the size of the device from increasing. When the size of the device increases, the optical system becomes larger and more complicated. Furthermore, because heat is produced using a heating resistor and the medium is heated by conduction of the heat, this invention has intrinsic disadvantages such as that the response is slow and the frequency for varying the refractive index cannot be increased.

Moreover, Japanese Patent Application Laid-Open Publication No. 1999-194373 discloses a deflecting device using an optical device, comprising at least the optical device comprising an photo-sensitive composition and intensity distribution adjusting means for irradiating the optical device with light in a wedge-shaped optical intensity distribution, wherein a distribution of refractive index is formed in the optical device by a control light beam and deflection of a signal light beam having a wavelength different from that of the control light beam is carried out by the distribution of the refractive index. Although this scheme is excellent in terms of controlling light using light, this scheme is constrained in that the angle of deflection must be within 30 degrees and, therefore, is problematic in that directions for switching optical paths cannot be freely set.

The present inventors disclosed in an earlier patent application an optical path switching apparatus and optical path switching method with no polarized-electromagnetic-wave dependence, for which angles and directions for switching optical paths can be set freely, with which optical intensity attenuation of a signal light beam is small, and which can be used in a plurality of connection; a control light beam having a wavelength selected from a wavelength band that a light absorbing layer film absorbs and a signal light beam having a wavelength selected from a wavelength band that the light absorbing layer film does not absorb are respectively converged and irradiated on the light absorbing layer film in a thermal lens forming device containing at least the light absorbing layer film; arrangement is adjusted such that at least the control light beam is focused within the light absorbing layer film; and a thermal lens based on a distribution of the refractive index created reversibly caused by a temperature increase produced in an area of the light absorbing layer film that has absorbed the control light beam and the area surrounding the area is used. Thereby, a state wherein the converged signal light beam exits from the thermal lens forming device at an ordinary divergence angle when the control light beam is not irradiated and no thermal lens is formed, and another state wherein the converged signal light beam exits from the thermal lens forming device at a divergence angle larger than the ordinary divergence angle when the control light beam is irradiated and a thermal lens is formed are realized in response to the presence or absence of the irradiation of the control light beam; when the control light beam is not irradiated and no thermal lens is formed, the signal light beam exiting from the thermal lens forming device at the ordinary divergence angle is caused to travel, either unchanged or with its ordinary divergence angle modified using a light-receiving lens, straight through a hole in a mirror. On the other hand, when the control light beam is irradiated and a thermal lens is formed, the signal light beam exiting while diverging from the thermal lens forming device at a divergence angle larger than the ordinary divergence angle is reflected, unchanged or after the divergence angle of the divergence is changed using a light-receiving lens, using the hole-provided mirror. (See Japanese Patent Applications No. 2002-275713 and No. 2004-44991.)

SUMMARY OF THE INVENTION

The present invention advantageously provides an optically controlled optical-path-switching-type data distribution apparatus and distribution method involving an optical packet communication system, that has no mechanical components, that operates at a high speed, that is durable and has no dependence on polarized electromagnetic waves, and that cause no electromagnetic disturbances and is itself not affected by electromagnetic waves.

In order to attain the above advantages, the present invention provides an optically controlled optical-path-switching-type data distribution apparatus for providing data from a data server device to one or more of specific client devices selected among a plurality of client devices. This comprises at least a data server device, a data communication unit, and a client device, wherein data communication unit includes at least an optical switch, an optical signal path, an optical signal transmitting unit, an optical signal receiving unit, and a data transmission/receipt control unit, the optical signal transmitting unit has at least a signal light beam light source for irradiating a signal light beam having one or more wavelengths, and a control light beam light source for irradiating a control light beam having one or more wavelengths that are different from those of the signal light beam in response to a control signal from the data transmission/receipt control unit, the optical switch includes at least one or more light absorbing layer films for transmitting the signal light beam and selectively absorbing only one specific wavelength of the control light beam, means for respectively converging and irradiating the control light beam and the signal light beam to each of the light absorbing layer films, one or more thermal lens forming device for causing the converged signal light beam to exit maintaining the beam converged or for varying the angle of divergence of the signal light beam and for causing the signal beam to exit, in response to presence/absence of irradiation of the one specific wavelength of the control light beam, by using a thermal lens containing the light absorbing layer films and based on a distribution of refractive index produced reversibly caused by temperature increase generated in an area of the light absorbing layer film that has absorbed the one specific wavelength of the control light beam and in the periphery thereof, and a mirror provided respectively behind each of the thermal lens forming devices and having a hole and reflecting means, for passing the signal light beam having exited from the thermal lens forming devices through the hole or reflecting the optical path of the signal light beam by deflecting the signal light beam by the reflecting means in response to presence/absence of irradiation of the one specific wavelength of the control light beam.

Another optically controlled optical-path-switching-type data distribution apparatus of the present invention comprises the apparatus described above wherein the data communication unit at least irradiates and transmits an arbitrary size of digital information that has been split into optical packets, each containing a fixed length or variable length optical digital signals as the signal light beam, and actuates the optical switch by irradiating an optical tag representing the identification information of a destination client device to each of the optical packets as the control light beam in synchronization with the irradiation of the optical packets.

According to another aspect of the present invention, the present invention provides a method comprising causing a signal light beam having one or more wavelengths transporting data converted to an optical signal, and a control light beam that is irradiated from a control light beam light source according to the data transporting destination and that has one or more wavelengths that are different from those of the signal light beam to travel substantially coaxial and in the same direction; converging and irradiating respectively the control light beam and the signal light beam on each of one or more light absorbing layer films that transmit the signal light beam and that absorbs selectively only one specific wavelength of the control light beam; at each of one or more thermal lens forming devices each containing the light absorbing layer films, by using a thermal lens based on a distribution of refractive index produced reversibly caused by temperature increase generated in an area of the light absorbing layer film that has absorbed the one specific wavelength of the control light beam and in the periphery thereof, in response to presence/absence of irradiation of the control light beam having the one specific wavelength, causing the converged signal light beam to exit as it is or to exit with a divergence angle larger than the ordinary divergence angle, or with the normal divergence angle thereof; using a hole-provided mirror having a reflecting surface, in response to presence/absence of irradiation of the control light beam of the one specific wavelength, causing the signal light beam exited from the thermal lens forming device to travel straight through the hole or changing the optical paths thereof by reflecting the signal light beam at the reflecting surface; distributing the data to one or more specific client devices that are selected among a plurality of client devices. In the optically controlled optical-path-switching-type data distribution method of the present invention comprises the method described above, the signal light beam may transport packets containing digital information of arbitrary size that has been split into a pack of fixed length or variable length digital signals, as optical packets; the control light beam may be irradiated in synchronization with the irradiation of the optical packets as the optical tag representing the identification information on a destination client device for each packet, and that changes optical paths of the optical packets.

In an optically controlled optical-path-switching-type data distribution apparatus of the present invention, the data server device may distribute a digital static image or moving images to one or more specific client devices selected among a plurality of client devices.

In an optically controlled optical-path-switching-type data distribution apparatus of the present invention comprises as described above, the data server device may distribute a digital static image or moving images for medical use to one or more specific client devices selected among a plurality of client devices.

BRIEF DESCRIPTION OF THE DRAWINGS

FIG. 3 is a diagram illustrating the synchronization of optical packets, optical destination tags, and reference clock pulses.

FIG. 4a is a partial schematic view of the configuration of an optically controlled optical-path-switching-type data transmitting apparatus depicted with an optical path switching mechanism as in an Example 1 of the present invention;

FIG. 4b is a partial schematic view of the configuration of an optically controlled optical-path-switching-type data transmitting apparatus depicted with a simplified representation of the optical path switching mechanism as in Example 1 of the present invention;

FIG. 18 shows photographic images of cross-sectional views of an exiting signal light beam that were captured by projecting the exited signal light onto a semi-transparent screen, in which

DESCRIPTION OF PREFERRED EMBODIMENT

[Principle of Optical Packet Communication]

In packet communication systems in the telecommunication field, an arbitrary amount of digital information (data) is divided into packets, each having a pack of fixed length or variable length digital signals; each of the packets is transmitted after a tag representing the identification information containing a destination and a re-assembly sequence is added; a communication path control device on a communication path delivers the packet to a destination by identifying the destination based on the information contained in the tag; the receiving side restores the original information by arranging the sequence (order) of the segments of information that was divided into packets based on the information contained in the tag and accepts the original information.

The optically controlled optical-path-switching-type data distribution apparatus and distribution method of the present invention replaces such electric signal packets and tags with light beams. In other words, an arbitrary size of digital information (data) is divided into optical packets of a pack of fixed or variable length optical signals for transmission; an "optical destination tag" representing identification information of the destination and an "optical sequence tag" representing identification information of the re-configuration sequence of an optical packet are added to each of the packets; the optically controlled optical switch on a communication path operates to deliver the optical packets to the destination by identifying the destination based on the identification information contained in the optical destination tag; the receiving side reconfigures the information that has been divided into optical packets to obtain the original information. In this manner, a control light beam having a wavelength that is different from a signal light beam is used as an optical destination tag representing the destination of an optical packet, while an optical sequence tag representing the identification information on the sequence to reassemble optical packets is added to the optical packets themselves and transmitted as a signal light beam.

Figure 1:
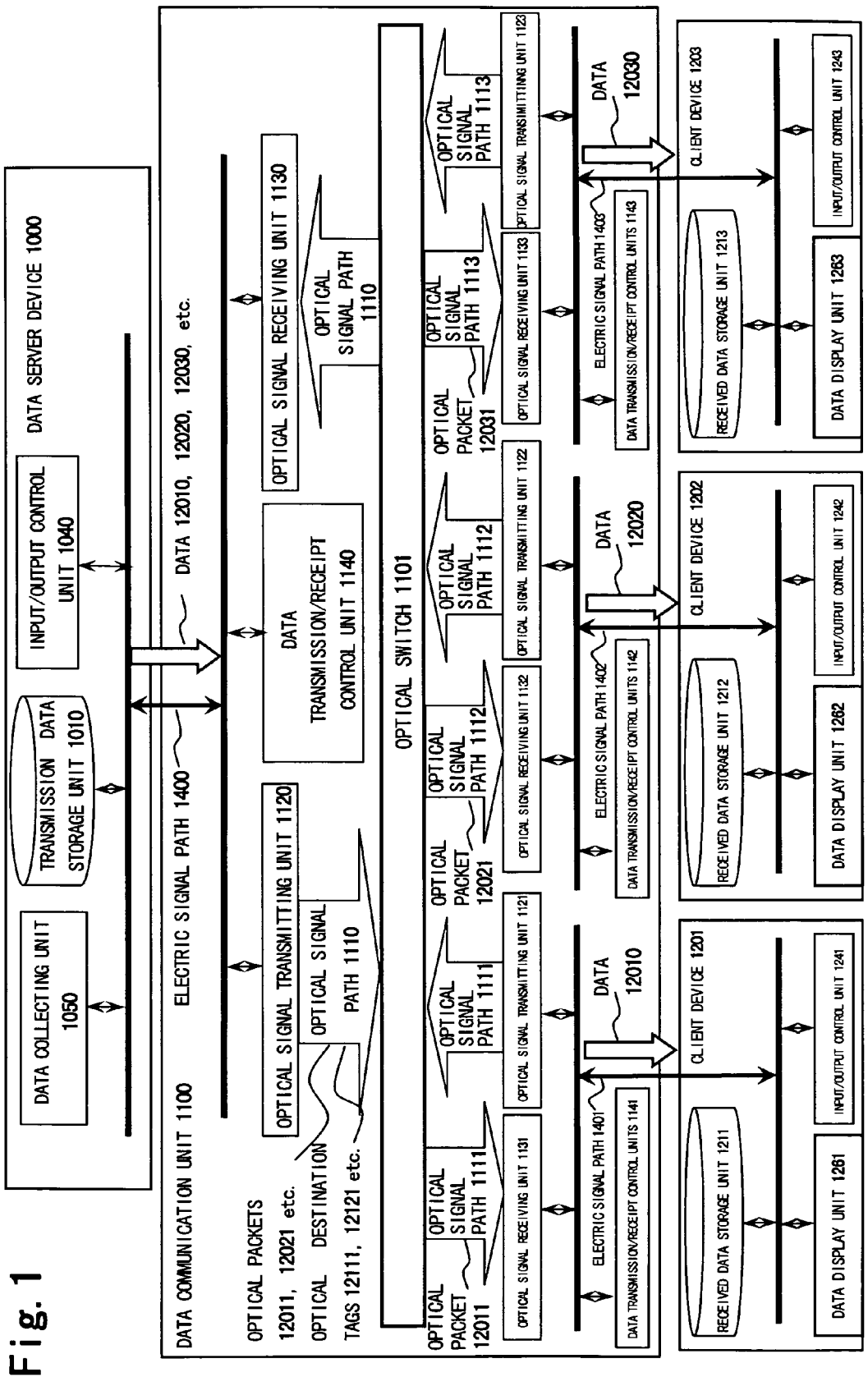
FIG. 1 is a schematic view of the configuration of an optically controlled optical-path-switching-type data distribution apparatus.
Figure 2:
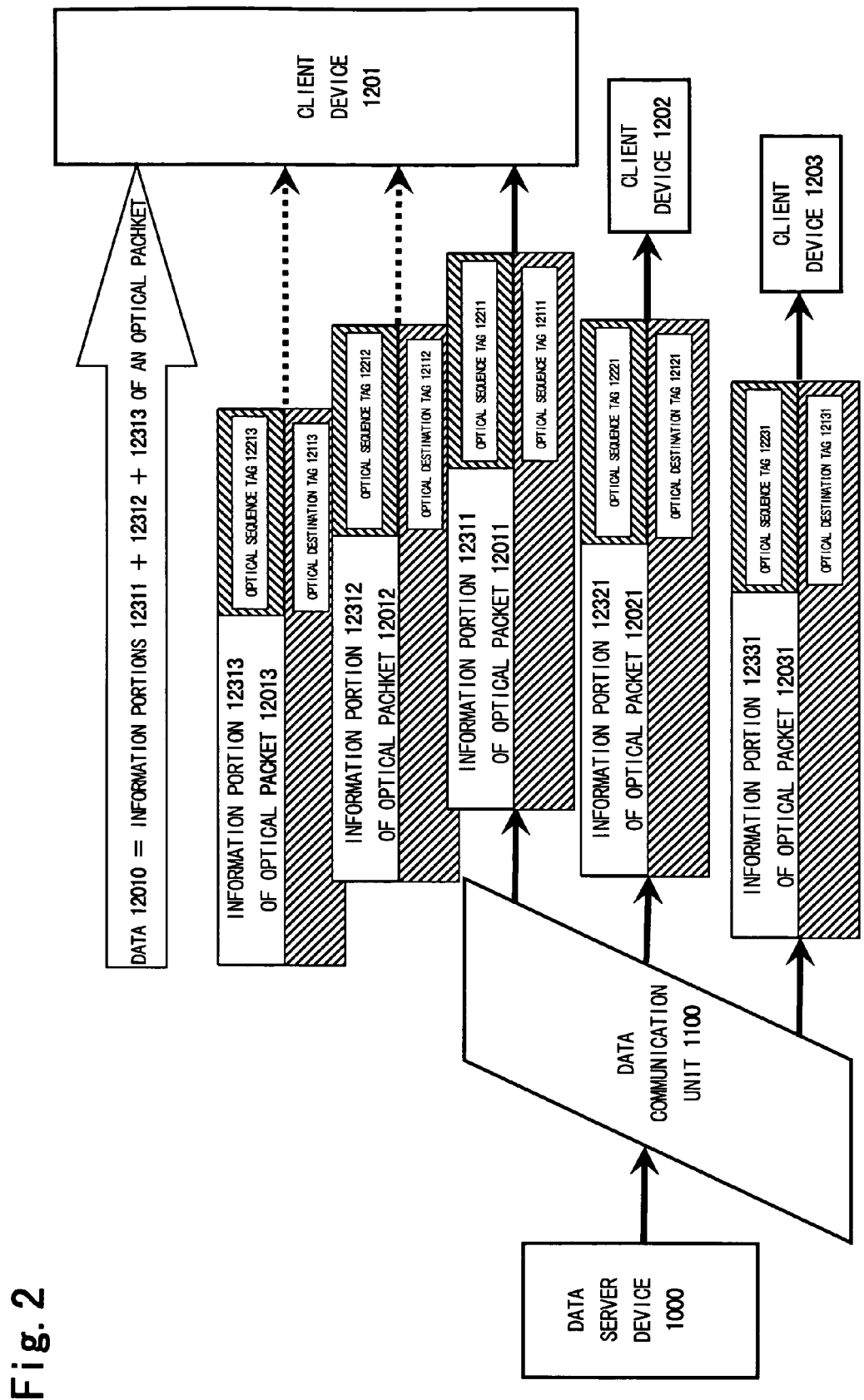
FIG. 2 is a diagram showing the flow of data to be distributed from the data server device to a specific client device via the data communication unit, using optical packets, optical sequence tags, and optical destination tags.

For example, in FIGS. 1 and 2, data 12010, 12020, 12030, etc. to be sent to client devices 1201, 1203, 1203, etc. respectively from a data server device 1000 are first divided into electric signal packets by a data transmission/receipt control unit 1140 in a data communication unit 1100; an electric signal sequence tag is attached to each electric signal packet, which is then converted into an optical packet 12011, 12021, 12031, 12012, 12013, or the like by an optical signal transmitting unit 1120, and transmitted through an optical signal path 1110, at optical switch 1101, the optical paths of the packets are switched to optical signal paths 1111, 1112 and 1113 by the actions of optical destination tags 12111, 12121, 12131, 12112, 12113 or the like that are irradiated in synchronization with each of the optical packets by an optical signal transmitting unit 1120. At the end of optical signal paths, optical signal receiving units 1131, 1132 and 1133 are disposed, by which the received optical packets are converted to electric signal packets, reassembled to the original data 12010, 12020, 12030 or the like based on the identification information on the re-configuration sequence recorded in the sequence tag in an electric signal packet at data transmission/receipt control units 1141, 1142 and 1143, and distributed to client devices 1201, 1202, 1203, etc. as electric signals. As shown in FIG. 2, for example, an original data 12010 is split into information portions 12311, 12312 and 12313 of an optical packet, then their optical paths are switched by an optical switch and distributed, then the information is restored based on the identification information on the re-configuration sequences of data which have been distributed as optical sequence tags 12211, 12212 and 12213, and delivered to a client device 1201.

[Synchronization of Optical Packet and Optical Destination Tag]

Synchronization of an optical packet and an optical destination tag is carried out as exemplified below.

As shown in FIG. 3, reference clock pulses generated by a data transmission/receipt control unit 1140 at the data transmitting side, are aligned so that ON states 13000, 13002, 13004, 13006, etc. and OFF states 13001, 13003, 13005, etc. are aligned alternatively at an equal pulse time width $t_p$ (for example, 125 millisecond). Optical packets 12000, 12001 etc. are originated to both of ON and OFF states of the reference clock pulse, and for either state they are transmitted at a timing that is delayed by pre-determined delay time $\Delta t$ after the rise or fall of the reference clock pulse. This delay time $\Delta t$, as described more specifically in Examples, is set according to the time that is required for the optical switch of the present invention to switch optical paths (for example, 1 millisecond of delay time $\Delta t$ for a pulse interval $t_p$, 125 millisecond). Optical destination tags with wavelengths (1), (2), (3) etc. that are different from each other and generated from one or more control light beam sources are generated in synchronization with the reference clock pulses. In the example shown in FIG. 3, an optical destination tag 12111 having a wavelength (1) and an optical packet 12011 are synchronized and generated corresponding to the reference clock pulse ON state 13002, an optical destination tag 12121 having a wavelength (2) and an optical packet 12021 are synchronized and generated corresponding to the reference clock pulse OFF state 13003, an optical destination tag 12131 having a wavelength (3) and an optical packet 12031 are synchronized and generated corresponding to the reference clock pulse ON state 13004 respectively. When optical destination tags 12112 and 12113 are irradiated and transmitted in succession, the corresponding optical packets 12012 and 12013 are distributed to the same client device (in this case, 1201) in succession.

[Elements Configuring an Optically Controlled Optical-Path-Switching-Type Data Distribution Apparatus]

Elements configuring an optically controlled optical-path-switching-type data distribution apparatus of the present invention are shown in FIG. 1. These elements are described in due order.

[Data Server Device]

A data server device 1000 comprises at least a data collecting unit 1050 and a transmission data storage unit 1010, and, as ordinary computer units, may further includes an input/output control unit 1040, an auxiliary storage unit, an external storage unit, a power supply unit, etc.

The data collecting unit 1050 includes a known arbitrary data input device, and may have an auxiliary storage unit such as a temporary storage device (buffer memory) as necessary. Practical examples of data input devices are, for example, input interfaces complied with digital data communication standards such as RS-232C, IEEE 1394, USB2.0 and SCSI, recording medium reading units such as floppy disk drive units, CD drive units, DVD drive units, magnetic tape units, semiconductor memory read units, etc., and digital interface boards for television images.

The transmission data storage unit 1010 includes a known arbitrary data storage/recording device, and may also comprise an auxiliary storage unit such as a temporary storage unit (buffer memory) that operates at a high speed, as necessary. As a digital data storage/recording device, large capacity storage devices such as a hard disk drive unit, rewritable DVD drive unit, magnetic tape unit, or DVD auto-changer unit can be used.

[Data Communication Unit]

The data communication unit 1100 includes a data transmission side portion directly connected to the data server device 1000, an optical path and an optical switch connecting the data transmitting side and receiving side, and a data receiving side portion directly connected to a client device 1201 or the like.

The data transmission side portion directly connected to the data server device 1000 includes at least a data transmission/receipt control unit 1140 and an optical signal transmitting unit 1120, and may be provided with an optical signal receiving unit 1130 for receiving a response signal or data transmission request signal from the client device side, as necessary. Transmission of an optical signal from the client device to the data server device can be carried out corresponding to the timing of the optical switch through which the signal will pass.

The data transmission/receipt control unit 1140 at the data transmitting side performs the splitting of digital information (such as data 12010) to be transmitted into electric signal packets, adding of an electric sequence tag representing the identification information on each electric signal packet reconfiguration sequence to the electric signal packet, temporary storing individual electric signal packets, controlling transmission of an optical destination tag generated by converting an electric signal destination tag representing each of optical packet destination to a control light beam (transmission synchronized with the corresponding optical packet), and controlling transmission of an optical packet (transmission synchronized with the corresponding optical destination tag). Further, the data transmission/receipt control unit at the data transmitting side controls receipt of a response signal or data transmission request signal from the client device to the data server device based on the operating status of the optical switch.

As a part of optical signal transmitting unit 1120 at the data transmitting side, a configuration of optical elements is shown in FIG. 4a, and FIGS. 4b to 10. In FIG. 4a, and FIGS. 4b to 10, the electric circuit of an optical signal transmitting unit 1120 is omitted.

The optical signal transmitting unit at the data transmitting side first controls the oscillation state of a signal light beam source 20 in response to the ON and OFF signals of an electric signal packet, and sends the oscillation state as an optical packet 12011, etc. to convert the electric signal packet containing a sequence tag represented by the electric signal to the intensity or continuation/discontinuation of a signal light beam 120, and secondary controls the oscillation states of one or more control light beam sources 21, 22, 23, etc. at the optical signal transmitting unit in response to the destination tag of an electric signal at the time the optical packet is sent, to transmit it as an optical destination tag 12111, etc. As an optical signal transmitting unit at the data transmitting side, a laser oscillation control device and a laser source of a known desirable system can be used. Other optical elements of an optical signal transmitting unit will be described in the Examples.

For an optical signal path 1110 that connects the data transmitting side with the data receiving side, one or more of open space, optical fibers, and optical waveguides can be used in combination, as appropriate. For example, an optical fiber between the optical signal transmitting unit to the optical switch, a space within the optical switch, and further an optical waveguide in the optical signal receiving unit may be used in combination, as appropriate. As an optical fiber, a multimode or single mode quartz glass optical fiber or a plastic optical fiber can be selectively used, considering the transmission loss property at the wavelengths of the control light beam and signal light beam to be used and transmission distance. For example, as long as the transmission loss of a single mode quartz glass optical fiber is 5 dB/km or less at wavelength range of 600 nm to 1.6 μm and the transmission distance is 100 to 200 m or so, the single mode quartz glass optical fiber can be used without consideration of transmission loss.

The data receiving side directly connected to a client device comprises at least a data transmission/receipt control unit 1141, etc. and an optical signal receiving unit 1131, etc. at the data receiving side, and may be provided with optical signal transmitting unit 1121 for transmission of a response signal or data transmission request signal from the client device to the data server device.

A data transmission/receipt control unit 1141, 1142, 1143, etc. at the data receiving side temporarily stores all the packets received and converted to electric signals, confirms the portion representing the destination in the sequence tag added to each of the packets and discards any incorrectly received packets, confirms and temporarily stores the sequence tag representing the identification information on the sequence for reassembling individual packets, and reassembles digital information (data) based on the information contained in the sequence tag. Further, the data transmission/receipt control units at the data receiving side controls a response signal or data transmission request signal from the client device to the data server device in response to the optical switch operating status.

The optical signal receiving unit at the data receiving side receives the optical packet 12011, etc., and converts it to an electric signal packet. It is desirable to form an electric signal based on the intensity or continuation/discontinuation state of an optical signal that was received by separating noise components from the signal.

As the optical signal receiving unit and the data transmission/receipt control unit at the data receiving side, a known arbitrary optical communication receiver (optical transceiver) can be selectively used in accordance with the wavelength band and data transfer rate (bit rate) of the signal light beam to be used.

[Client Device]

A client device comprises a received data storage unit 1211, etc., or data display unit 1261, etc., and may further comprise ordinary computer units such as an input/output control unit, an auxiliary storage unit, an external storage unit, a power supply unit, etc. A received data storage unit comprises a known arbitrary digital data storage/recording unit, and may have an auxiliary storage unit such as a temporary storage unit (buffer memory) that is operable at a high speed, as necessary. As a digital data storage/recording unit, a large capacity storage unit such as a hard disk drive unit, or rewritable DVD drive unit can preferably be used.

For the elements configuring the optically controlled optical-path-switching-type data distribution apparatus of the present invention described above, known units excluding the optical switch can be used in a known manner to embody the present invention.

[Optical Switch]

Figure 5:
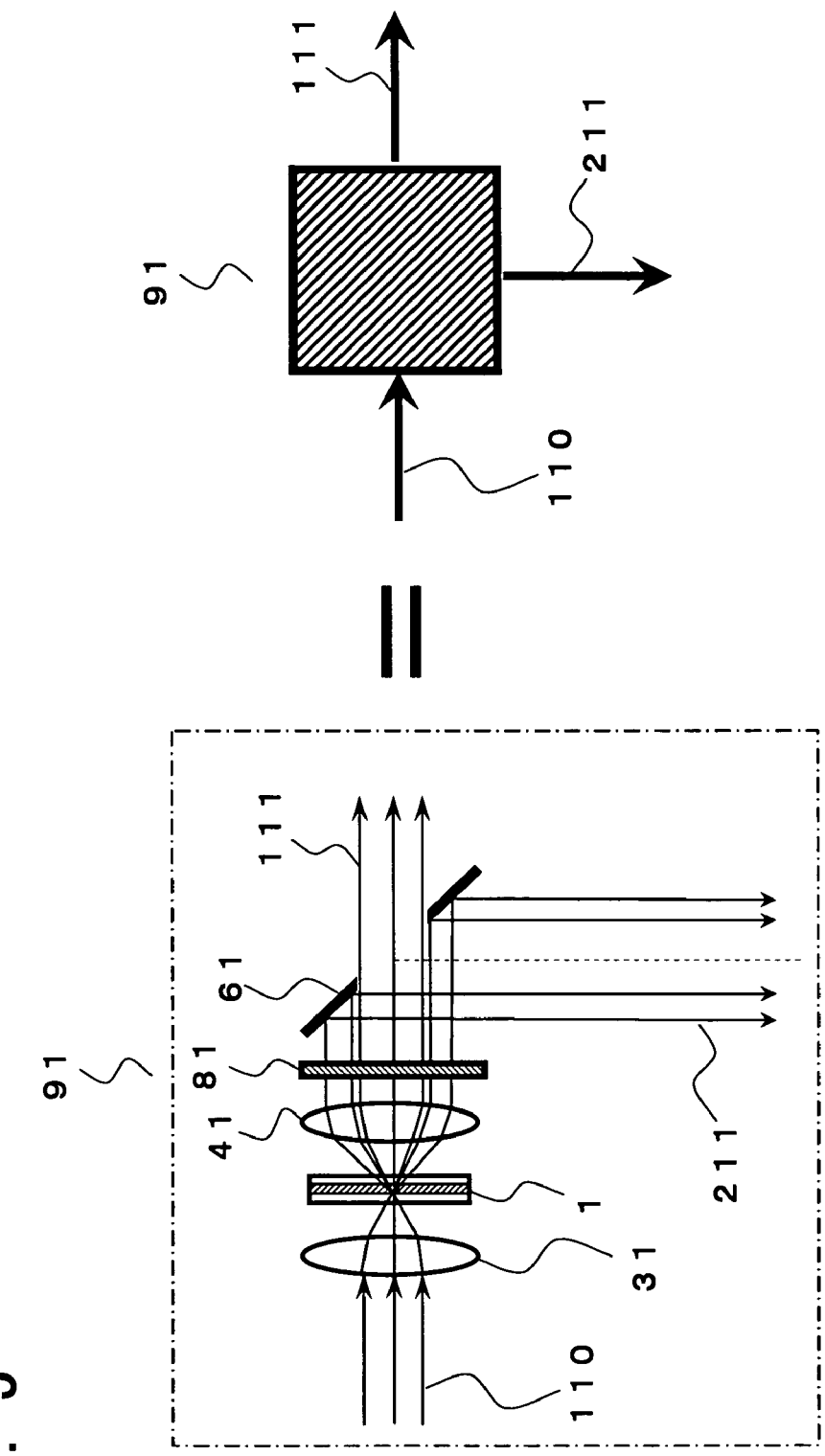
FIG. 5 is a simplified representation of the configuration of an optical path switching mechanism of a space-coupling type.

An optical path switching mechanism 91 of an optical switch with a minimum configuration used in an optically controlled optical-path-switching-type data distribution apparatus of the present invention is shown in FIG. 5. The schematic view of an optical switch 1101 connecting three optical path switching mechanisms 91, 92 and 93 in three stages in a space is exemplified in FIG. 4a (see Example 1). The principle of the operation of an optical switch used in the present invention is shown in FIGS. 11a, 11b, 12a, 12b, 13a, 13b, 14a, and 14b.

Figure 11A:
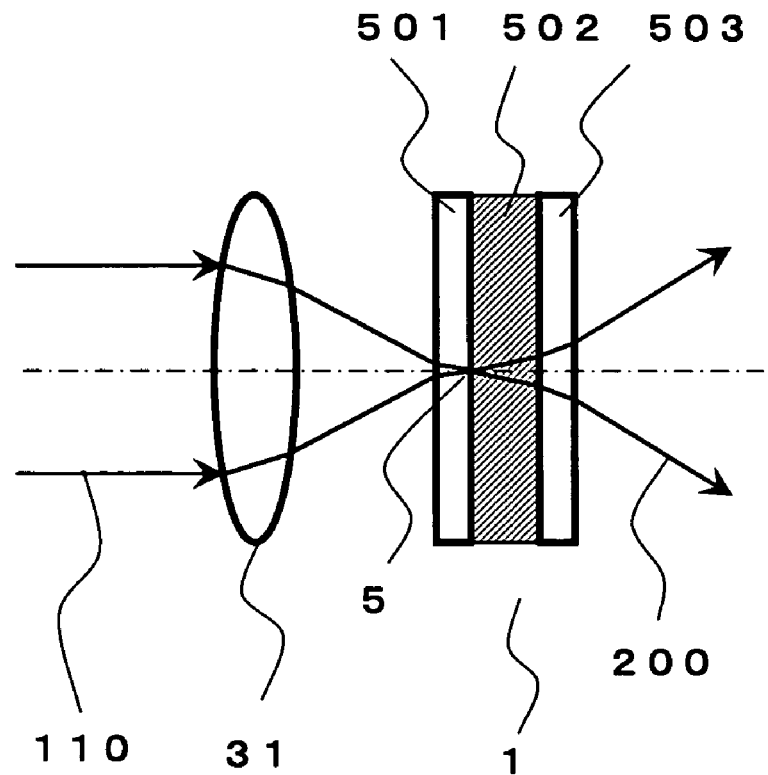
FIG. 11a shows an example path of a light beam in an example where no thermal-lens is formed.
Figure 11B:
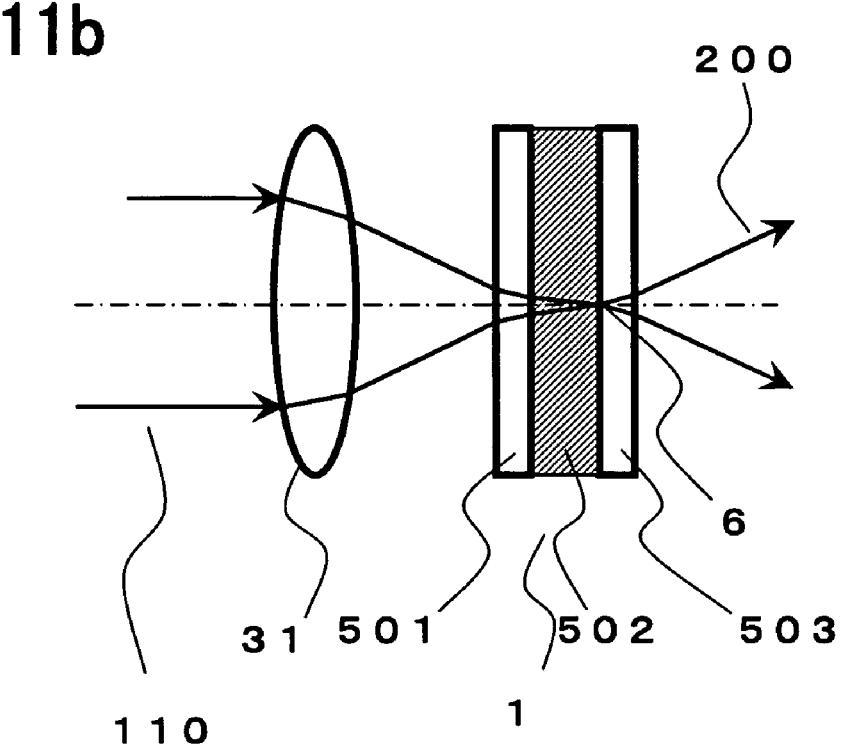
FIG. 11b shows another example path of a light beam in an example where no thermal-lens is formed.
Figure 12A:
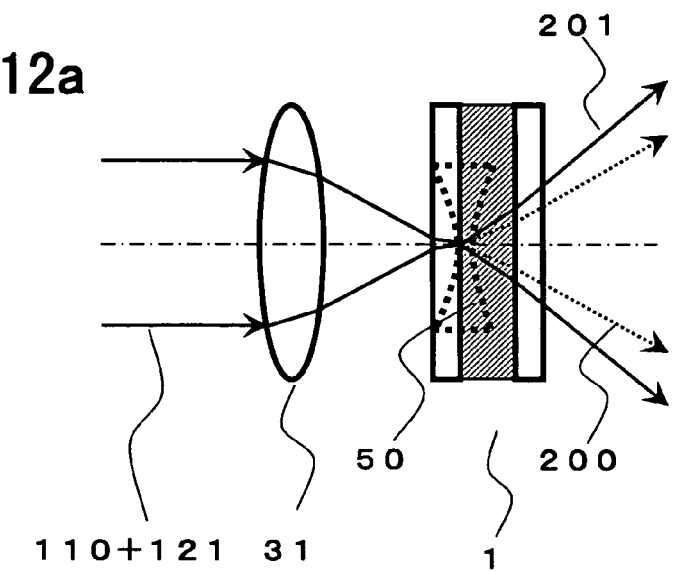
FIG. 12a shows the path of a light beam when a thermal lens is formed when the position of the beam waist is adjusted such that the beam waist is positioned in the vicinity of the beam-entering side of a light absorbing layer film.
Figure 12B:
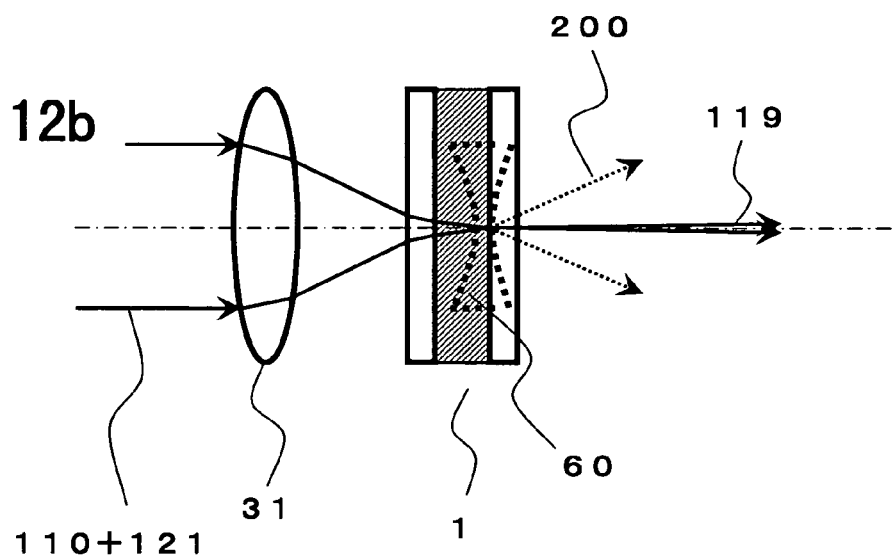
FIG. 12b shows the path of a light beam when a thermal lens is formed when the position of the beam waist is adjusted such that the beam waist is positioned in the vicinity of the beam-exiting side of a light absorbing layer film.

The optical switch 1101 used in the present invention comprises at least a thermal lens forming device 1, etc. containing one or more light absorbing layer film and thermal lens forming layer 502 that transmits the signal light beam (optical packet) 120, 110, 111, 112, etc. and selectively absorbs only one specific wavelength of the control light beams respectively, means (for example, condenser lens 31, 32, 33, etc.) for converging and irradiating the control light beam and the signal light beam on to each of the light absorbing layer films, and the light absorbing layer film; a thermal lens forming device 1, 2, 3, etc. that includes the light absorbing layer films and, by using a thermal lens 50 or 60 based on a distribution of refractive index reversely proportional to the temperature increase generated in an area of the light absorbing layer film that has absorbed the one specific wavelength of the control light beam and in the periphery thereof, and in response to the presence/absence of irradiation of one specific wavelength of the control light beam, causes the converged signal light beam to exit as it is as shown in FIG. 12b, and causes the converged signal light beam to exit with a divergence angle larger than the ordinary divergence angle as shown in FIG. 12a, or as shown in FIG. 11a or 11b, causes the converged signal light beam to exit with an ordinary divergence angle; a mirror 61 provided respectively behind each of the thermal lens forming devices and having a hole 161 and reflecting means, for passing the signal light beam having exited the thermal lens forming devices through the hole 161 or deflecting the optical path by reflecting the signal light beam by the reflecting means in response to presence/absence of irradiation of the one specific wavelength of the control light beam.

The components of an optical switch used in the present invention will now be described in detail.

[Means for Respectively Converging and Irradiating a Control Light Beam and Signal Light Beam]

In operating an optical switch utilizing the thermal lens effect of the present invention, a condenser lens or concave mirror is used as a means to respectively converge and irradiate a control light beam and a signal light beam on the same area of a light absorbing layer film/thermal lens forming layer 502. As a condenser lens, a normal convex lens or the like, an aspheric convex lens, a distributed index condenser lens, an objective lens for a microscope consisting of a plurality of lenses, a lens for photographic equipment, or the like can preferably be used. A chromatic aberration correcting lens that is a combination of convex lenses with different refractive indices may be used to correct chromatic aberration caused by differences in refraction indices of lens materials in response to the differences in wavelength of a signal light beam and a control light beam. In order to cause a signal light beam and control light beam to enter the light absorbing layer film without any loss, the effective aperture of a condenser lens or concaved mirror must be larger than the beam diameter of a parallel beam containing a signal light beam and a control light beam. Furthermore, positional relation with a light absorbing layer film is set based on the focal distance and working distance of the condenser lens or concaved mirror. Specific examples are described in the Examples.

[Light Receiving Lens]

A light receiving lens receives the exiting signal light beam without loss, when a control light beam is not irradiated and the converged signal light beam exits from a thermal lens forming device at an ordinary divergence angle and when a control light beam is irradiated and signal light beam is exited at a divergence angle larger than an ordinary angle from the thermal lens forming device, and used as a means to restore a parallel light beam. A lens similar to a condenser lens can be used as a light receiving lens. For a light receiving lens as used herein, a concaved mirror can also be used. Further, it is recommended that the numerical aperture (hereinafter, referred to simply as "NA") of these light receiving lenses be set to be a value larger than the NA of the condenser lenses. More specifically, by setting the NA of the light receiving lenses equal to or more than twice as large as the NA of the condenser lens, the light receiving lens can receive light beams without loss, even when a signal light beam exits at a divergence angle larger than an ordinary divergence angle.

On the other hand, when a configuration is employed in which the converged signal light beam exits unchanged from a thermal lens forming device when a control light beam is irradiated, if the beam diameter of the exited light beam remains small, convergence of the light beam will likely be insufficient due to diffraction of light, in converging and irradiating the light beam again on the thermal lens forming device in the optical switch or having the light beam condensed and causing to enter in an optical fiber at a latter stage. In such a case, it is recommended that the beam diameter be expanded by expanding the signal light beam that exited while being converged. As a means for expanding a light beam, a known means such as, for example, a Keplerian optical system comprising two convex lenses may be used.

[Wavelength Selecting and Transmitting Filter]

As long as the transmittance of a control light beam at a thermal lens forming device in an optical switch for use in the present invention is not 0%, an amount of the control light beam corresponding to the transmittance is transmitted through and exits from the thermal lens forming devices. In order to prevent this amount of light from entering the thermal lens forming devices or elsewhere where it may cause malfunction or cross-talk, it is necessary to make the transmittance of each of the control light beams in the thermal lens forming devices 1, 2, and 3 approach 0%. Furthermore, it is preferable that the wavelength selecting and transmitting filters (81, 82 and 83 in FIG. 4) be provided behind the thermal lens forming devices 1, 2 and 3. As these wavelength selecting and transmitting filters, any known filters may be used that completely block light in the wavelength band of each of the control light beams while that can efficiently transmit light in the wavelength band of the signal light beams and that of the control light beams for the optical switch in the latter stages. For example, plastic or glass colored by a pigment, glass provided with a dielectric multi-layer film on the surface thereof, etc. can be used. A thin film comprising such a material for the wavelength selecting and transmitting filter may be formed on the surface of the condenser lenses (41, 42 and 43 in FIG. 4) by a coating method, a sputtering method, etc. and may function as the wavelength selecting and transmitting filter.

[Thermal Lens Forming Device]

In the present invention, a device having a lamination film-type structure can be used as a thermal lens device and the following combinations, for example, can be listed as the structure of a lamination film.

(1) A light-absorbing layer film alone. However, this light-absorbing layer film may be any one of a single-layer film literally comprising only a light-absorbing film, or a lamination layer-type thin film having a two-layer structure such as a light-absorbing film/thermal lens forming layer, or a three-layer structure such as a light-absorbing film/thermal lens forming layer/light-absorbing layer. The following light-absorbing layer films (2) to (10) contain a structure same as that described above:

(2) Light-absorbing layer film/heat-insulating layer film.

(3) Heat-insulating layer film/light-absorbing layer film/heat-insulating layer film.

(4) Light-absorbing layer film/heat-conducting layer film.

(5) Heat-conducting layer film/light-absorbing layer film/heat-conducting layer film.

(6) Light-absorbing layer film/heat-insulating layer film/heat-conducting layer film.

(7) Heat-conducting layer film/light-absorbing layer film/heat-insulating layer film.

(8) Heat-conducting layer film/light-absorbing layer film/heat-insulating layer film/heat-conducting layer film.

(9) Heat-conducting layer film/heat-insulating layer film/light-absorbing layer film/heat-insulating layer film.

(10) Heat-conducting layer film/heat-insulating layer film/light-absorbing layer film/heat-insulating layer film/heat-conducting layer film.

(11) Refractive-index-distributed-type lens/(light-transmitting layer/) any one of thermal lens forming devices of above (1) to (10).

(12) Refractive-index-distributed-type lens/(light-transmitting layer/) any one of thermal lens forming devices of above (1) to (10)/(light-transmitting layer/) Refractive index-distributed-type lens.

The above "(light-transmitting layer/)" means to provide a light-transmitting layer when necessary. In addition, an anti-reflection film (AR coating film) may be provided on an entering surface and an exiting surface of a light beam when necessary.

Cross-sectional views exemplifying the structure of a thermal lens forming device are shown in FIGS. 11a, 11b, 12a, and 12b. As exemplified in FIGS. 11a and 11b, a thermal lens forming device 1 comprises, for example, a heat-conducting layer film 501/a light absorbing layer film and thermal lens forming layer 502/a heat-conducting layer film 503 stacked in this order from the entering side for a control light beam 121 and a signal light beam 110.

Figure 15:
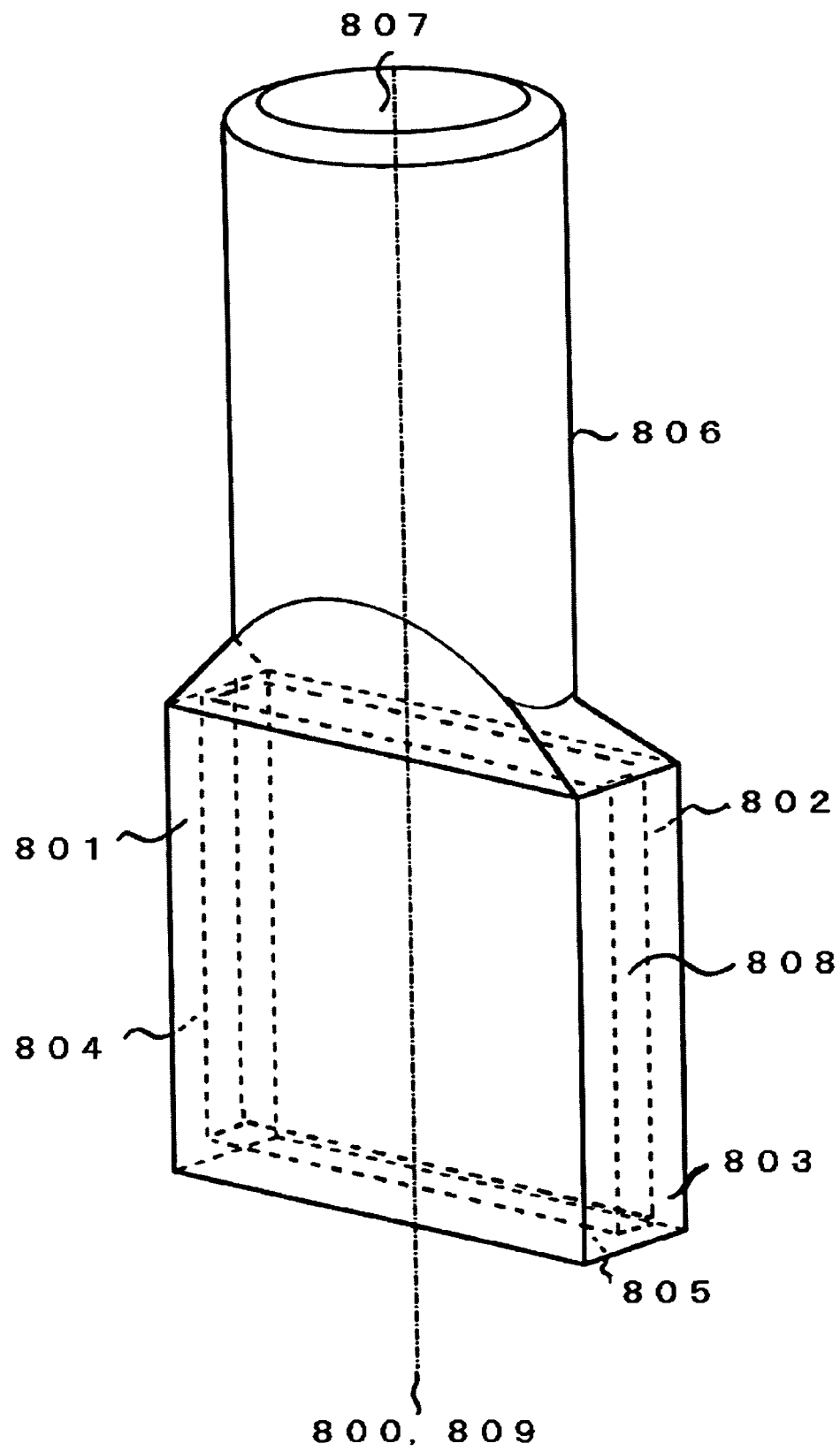
FIG. 15 is a schematic view exemplifying a pigment-solution-filling-type thermal lens forming device.

Furthermore, a schematic view exemplifying a pigment-solution-filling-type thermal lens forming device is shown in FIG. 15. As exemplified in FIG. 15, a pigment-solution-filling-type thermal lens forming device 800 is a device produced in a manner that a pigment solution working as a combined light-absorbing layer film and thermal lens forming layer is filled from an introducing inlet 807 of an introducing pipe 806 into a pigment solution filling unit 808 of an optical cell 809 surrounded by entering and exiting surface glass plates 801 and 802 working as heat-conducting layer films, side glass plates 803 and 804, and a bottom glass plate 805, and the introducing inlet 807 is closed. That is, this device 800 has a simple device structure such as heat-conducting layer film/light-absorbing layer film and combined light-absorbing layer film and thermal lens forming layer/heat-conducting layer film.

The light-absorbing layer film, the thermal lens forming layer, the heat-insulating layer film, the heat-conducting layer film, the light-transmitting layer, and materials and production methods of the refractive-index-distributed-type lens and film thicknesses of these films will be described below.

The light-absorbing layer film, the thermal lens forming layer, the heat-insulating layer film, the heat-conducting layer film, the light-transmitting layer, and materials of the refractive-index-distributed-type lens used in the invention may contain known oxidation inhibitors, UV-absorbing agents, singlet oxygen quenchers, dispersion assistants, etc. as additives to the extent those additives do not influence those films, layers and materials in order to improve the processability thereof or improve stability and durability as an optical device.

[Materials of the Light-absorbing Layer Film]

Various known materials may be used as the light-absorbing materials used for the light-absorbing layer film in the thermal lens forming device used in the invention.

Specifically examples of light-absorbing materials which may be preferably used for the light-absorbing layer film in the thermal lens forming device used in the invention include, for example, a single crystal of a compound semiconductor such as GaAs, GaAsP, GaAlAs, InP, InSb, InAs, PbTe, InGaAsP, ZnSe; materials obtained by dispersing fine particles of these compound semiconductor into a matrix material; a single crystal of a metal halide (for example, potassium bromide, sodium bromide, etc.) doped with ions of another metal; materials obtained by dispersing fine particles of these metal halides (for example, copper bromide, copper chloride, cobalt chloride, etc.) into a matrix material; a single crystal of cadmium chalcogenide such as CdS, CdSe, CdSeS, CdSeTe, etc. doped with ions of another metal such as copper, etc.; materials obtained by dispersing fine particles of these cadmium chalcogenide into a matrix material; a semiconductor single crystal thin film such as silicon, germanium, selenium, tellurium, etc.; a polycrystalline thin film or a porous thin film; materials obtained by dispersing fine particles of a semiconductor such as silicon, germanium, selenium, tellurium, etc. into a matrix material; a single crystal (generally called "laser crystal") corresponding to a jewel doped with ions of a metal, such as a ruby, an alexandrite, a garnet, a Nd:YAG, a sapphire, a Ti:sapphire, a Nd:YLF, etc.; a ferroelectric crystal such as lithium niobate ($LiNbO_3$), $LiB_3O_5$, $LiTaO_3$, $KTiOPO_4$, $KH_2PO_4$, $KNbO_3$, $BaB_2O_2$, etc. doped with ions of a metal (for example, iron ions); quartz glass, soda glass, boron silicate glass, other glasses, or the like, doped with ions of a metal (for example, neodymium ions, erbium ions, etc.); and, in addition, materials obtained by dissolving or dispersing a pigment into a matrix material; and an amorphous pigment aggregate.

Among the above-listed materials, those obtained by dissolving or dispersing a pigment into a matrix material are especially preferable because such materials offer a wide range for selecting the matrix material and the pigment, and because they are easy to process into a thermal lens forming device.

Specific examples of pigments that can be preferably used in the optically controlled optical-path-switching-type optical signal transmission apparatus and the optical signal optical path switching method of the invention include, for example, a xanthene-based pigment such as rhodamine-B, rhodamine-6G, eosin, floxin-B, etc.; an acridine-based pigment such as acridine orange, acridine red, etc.; an azo pigment such as ethyl red, methyl red, etc.; a porphyrin-based pigment; a phthalocyanine-based pigment; a naphthalocyanine-based pigment; a cyanine pigment such as 3,3'-diethylthiacarbocyanine iodide, 3,3'-diethyloxadicarbocyanine iodide, etc.; a triarylmethane-based pigment such as ethyl violet, Victoria blue-R, etc.; a naphthoquinone-based pigment; an anthraquinone-based pigment; a naphthalenetetracarboxydiimide-based pigment; a perylenetetracarboxydiimide-based pigment; etc.

In the optically controlled optical-path-switching-type optical signal transmission apparatus and the optical signal optical path switching method of the invention, any of the pigments may be used individually, or two or more pigments may be used in combination.

As a matrix material that can be used in the optically controlled optical-path-switching-type optical signal transmission apparatus and the optical signal optical path switching method of the invention, any material that satisfies both of the following conditions may be used:

(1) The material has a high transmittance in a wavelength region of the light used in the optically controlled optical-path-switching-type optical signal transmission apparatus and the optical signal optical path switching method of the invention; and (2) The material is able to solve or disperse with high stability the pigments or various fine particles that are used in the optically controlled optical-path-switching-type optical signal transmission apparatus and the optical signal optical path switching method of the invention.

Examples of acceptable inorganic solid-state matrix materials include, for example, a single crystal of a metal halide, a single crystal of a metal oxide, a single crystal of a metal chalcogenide, quartz glass, soda glass, boron silicate glass, and, in addition, a low-melting-point glass material produced in a generally-called sol-gel processing method.

Examples of acceptable inorganic liquid-state matrix materials include, for example, water, water glass (a thick water solution of alkaline silicate), hydrochloric acid, sulfuric acid, nitric acid, aquaregia, chlorsulfonic acid, methanesulfonic acid, and trifluoromethansulfonic acid. Examples of acceptable organic solvents include, specifically, alcohols such as methanol, ethanol, isopropyl alcohol, n-butanol, amyl alcohol, cyclohexanol, bnzyl alcohol; polyatomic alcohols such as ethylene glycol, diethylene glycol, glycerin, etc.; esters such as ethyl acetate, n-butyl acetate, amyl acetate, isopropyl acetate, etc.; ketones such as acetone, methylethylketone, methylisobutylketone, cyclohexanone, etc; ethers such as diethyl ether, dibutyl ether, methoxy ethanol, ethoxy ethanol, buthoxy ethanol, carbithol, etc.; cyclic ethers such as tetrahydrofuran, 1,4-dioxan, 1,3-dioxoran, etc.; hydrocarbon halides such as dichloromethan, chroloform, carbon tetrachloride, 1,2-dichloroethane, 1,1,2-trichloroethane, trichlene, bromoform, dibromomethane, diiodomethan, etc.; aromatic hydrocarbons such as benzene, toluene, xylene, chlorobenzene, o-dichlorobenzene, nitrobenzene, anisole, α-chloronaphthalene, etc.; aliphatic hydrocarbons such as n-pentane, n-hexane, n-pentane, cyclohexane, etc.; amides such as N,N-dimethylformamide, N,N-dimethylacetamide, hexamethylphosphorictriamide, etc.; cyclic amides such as N-methylpyrrolidone, etc.; urea derivatives such as tetramethylurea, 1,3-dimethyl-2-imidazolidinone, etc.; sulfoxides such as dimethylsulfoxide, etc.; ester carbonates such as propylene carbonate, etc; nitriles such as acetonitrile, propionitrile, benzonitrile, etc.; nitrogen-containing heterocyclic compounds such as pyridine, quinoline, etc.; amines such as triethylamine, triethanolamine, diethylaminoalcohol, aniline, etc.; organic acids such as chloracetic acid, trichloracetic acid, trifluoroacetic acid, acetic acid, etc.; and, in addition, such solvents as nitromethane, carbon disulfide, sulfolan, etc. A plurality of these solvents can be used also in combination.

Furthermore, as organic matrix materials, liquid-state, solid-state, glass-state, or rubber-state organic high-molecule materials can be used. Specific examples of those materials include resins such as polystyrene, poly(α-methylstyrene), polyindene, poly(4-methyl-1-pentene), polyvinylpyridine, polyvinylformal, polyvinylacetal, polyvinylbutiral, polyvinyl acetate, polyvinyl alcohol, polyvinyl chloride, polyvinylidene chloride, polyvinylmethyl ether, polyvinylethyl ether, polyvinylbezyl ether, polyvinylmethylketone, poly(N-vinylcarbazole), poly(N-vinylpyrrolidone), polymethylacrylate, polyethylacrylate, polyacrylic acid, polyacrylonitrile, polymethylmethacrylate, polyethylmethacrylate, polybutylmethacrylate, polybenzylmethacrylate, polycyclohexylmethacrylate, polymethacrylic acid, polymethacrylamide, polymethacrylonitrile, polyacetaldehyde, polychloral, polyethylene oxide, polypropylene oxide, polyethylene terephthalate, polycarbonates (bisphenols+carbonic acid), poly(diethyleneglycol/bisaryl carbonate), 6-nylon, 6,6-nylon, 12-nylon, 6,12-nylon, polyethylasparaginate, polyethylglutaminate, polylysine, polyproline, poly(γ-benzyl-L-glutamate), methylcellurose, ethylcellorose, bezylcellurose, hydroxyethylcellurose, hydroxypropylcellurose, acetylcellurose, cellurose triacetate, cellurose tributylate, alkyd resin (phthalic anhydride+glycerin), aliphatic acid-denatured alkyd resin (aliphatic acid+phthalic anhydride+glycerin), unsaturated polyester resin (maleic anhydride+phthalic anhydride+propyleneglycol), epoxy resin (bisphenol+epichlorhydrin), polyurethane resin, phenol resin, urea resin, melamine resin, xylene resin, toluene resin, guanamine resin, etc.; organic polysilanes such as poly(phenylmethylsilane),etc.; and organicpolygermane and copolymers and condensation-copolymer thereof. Also acceptable are certain high-molecular compounds obtained by plasma-polymerizing a compound having no polymerizing property in the normal state, etc., such as carbon bisulfide, carbon tetrafluoride, ethylbenzene, per-fluorobenzene, per-fluorocyclohexanone or trimethylchlorosilane, etc. Furthermore, a residual radical of a pigment as a side chain of each monomer as a unit, or as a bridging radical of each copolymericmonomer as a unit, or as a polymerization starting terminal is combined to any one of these organic high-molecular compounds can also be used as a matrix material. The residual radical of a pigment and a matrix material may form chemical bonding.

Known methods can be used for dissolving or dispersing the pigment into these matrix materials. For example, any of the below-described methods can be preferably employed.

After the pigment and the matrix material have been solved and mixed in a common solvent, the solvent is removed by evaporation; after the pigment is solved and mixed in a raw material solution of the inorganic matrix material produced in the sol-gel processing method, the matrix material is prepared; using a solvent when necessary, the pigment is solved or dispersed in a monomer of the organic high-molecular matrix material and, thereafter, the matrix material is prepared by polymerizing or condensation-polymerizing the monomer; and, a solution obtained by dissolving the pigment and the organic high-molecular matrix material in a common solvent is dropped into a solvent that does not dissolve both the pigment and the thermoplastic high-molecular matrix material, precipitants are filtered off, dried, and heat/melting processed. The aggregation of pigment molecules to form special associated bodies known as "H-associated bodies" and "J-associated bodies" by devising the combination and the processing method of the pigment and the matrix material is known, and pigment molecules in the matrix material can be used in a state where the pigment molecules may form either the aggregated state or the associated state.

Furthermore, known methods may be used in order to disperse the above-described various fine particles in these matrix materials. Examples of steps that may be preferably employed include that, after the fine particles have been dispersed in a solution of the matrix material or a solution of a precursor of the matrix material, the solvent is removed; using a solvent when necessary, the fine particles are dispersed and the matrix material is prepared by polymerizing or condensation-polymerizing the monomer; after metal salt such as, for example, cadmium perchlorate or gold chloride as a precursor of the fine particles has been melted or dispersed in the organic high-molecular matrix material, fine particles of cadmium sulfide are deposited in the matrix material by processing with hydrogen sulfide, or fine particles of gold are deposited in the matrix material by heat-processing; chemical vapor deposition and sputtering; and others.

In a case wherein the pigment can exist by itself as a thin film in an amorphous state that causes little optical dispersion, an amorphous film of the pigment can also be used as the light-absorbing layer film without using any matrix material.

Furthermore, in the case wherein the pigment can exist by itself as an aggregation of fine crystals that does not cause optical dispersion, a fine crystal aggregation of the pigment can also be used as the light-absorbing layer film without using any matrix material. As in the thermal lens forming device used in the invention, in a case wherein the pigment fine crystal aggregation as a light-absorbing layer film exists being laminated with a thermal lens forming layer (such as resin, etc.), a heat-conducting layer film (such as glass, etc.) and/or a heat-insulating layer film (such as resin, etc.), optical dispersion is not substantially caused when the particle diameter of the pigment fine crystal does not exceed 1/5 of the wavelength that is the smaller wavelength of that the signal light beam and that of the control light beam.

[Combination and Order of Material of the Light-Absorbing Layer Film, Wavelength Band of the Signal Light Beam and Wavelength Band of the Control Light Beam]

The material of the light-absorbing layer film, a wavelength band of the signal light beam and a wavelength band of the control light beam used in the optically controlled optical-path-switching-type optical signal transmission apparatus and the optical signal optical path switching method of the invention can be used by selecting a proper combination thereof according to the purpose of use, as a combination thereof.

As a specific procedure to make settings, for example, first, a wavelength or a wavelength band of the signal light beam may be determined according to the purpose of use and a combination of a material of the light-absorbing layer film and a wavelength of the control light beam optimal for controlling the determined wavelength or the determined wavelength band of the signal light beam may be selected. Alternatively, after a combination of wavelengths of the signal light beam and the control light beam have been determined according to the purpose of use, a material of the light-absorbing layer film suitable for the determined combination may be selected.

As a specific example of such a selection procedure, an example will be described wherein a near-infrared light beam having a wavelength of 850 nm, 1350 nm, or 1550 nm oscillated from a semiconductor laser and which can be modulated at an ultra-high speed on the order of gigahertz is used as the signal light beam, wherein this light beam is switched between optical paths by the control light beam of a plurality of visible light beam wavelength bands. As a light source of the control light beam, a continuous wave (CW) oscillation laser that can be turned on and off at a response speed greater than sub-millisecond can be preferably used. Examples, listed in order of increasing wavelength, include a blue-violet or blue semiconductor laser light beam having a wavelength of 405 to 445 nm; a light beam obtained by converting a light beam having a wavelength of 1064 nm of a semiconductor-excited Nd:YAG laser into a green light beam of 532 nm by a second order non-linear optical device; a red semiconductor laser light beam of 635 nm or 670 nm; and a near-infrared laser light beam of 780 nm or 800 nm. As a pigment that shows absorption in these wavelength bands for the control light beam and does not absorb a near infrared light beam of 850 nm or 1550 nm, for example, two (2) or more of such pigments can be selected and preferably used respectively as: for example, N,N'-bis(2,5-di-tert-butylphenyl)-3,4,9,10-perylenedicarboxyimide) [1],

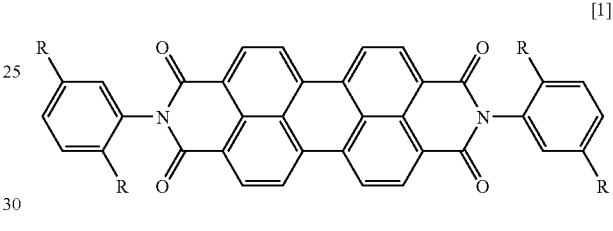

[R = C(CH3)3]

Copper(11)2,9,16,23-tetra-tert-butyl-29H,31H-phthalocyanine [2],

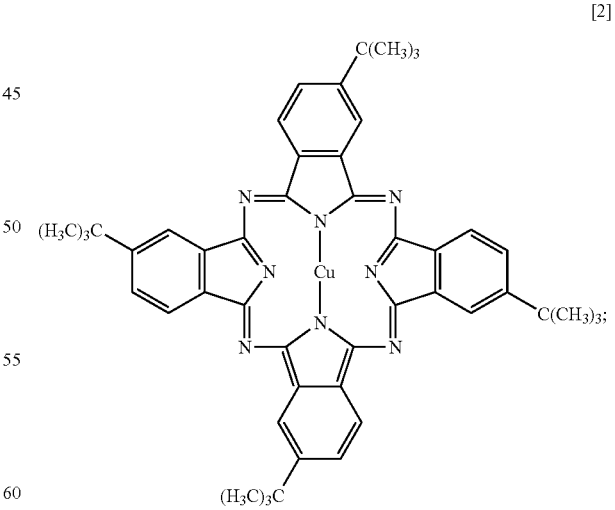

Vanadyl 2,11,20,29-tetra-tert-butyl-2,3-naphthalocyanine [3],

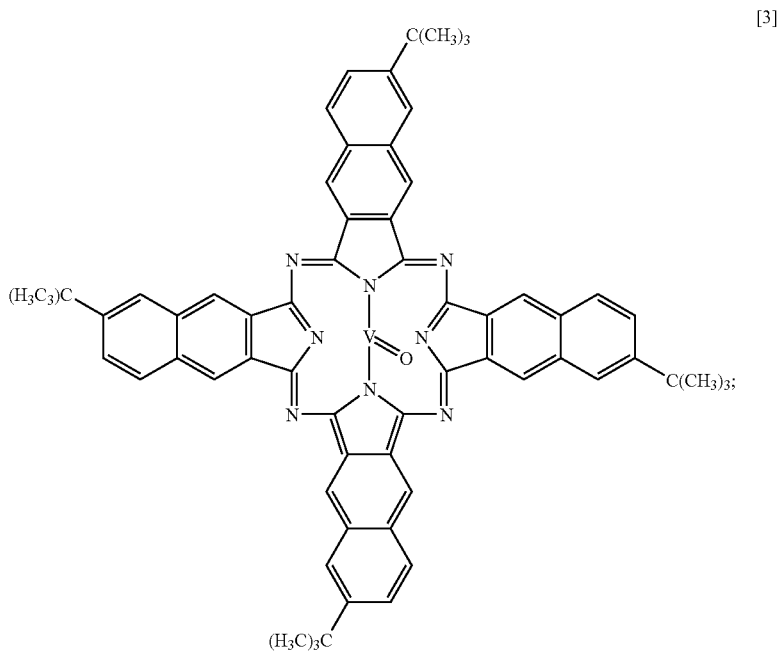

Figure 16:
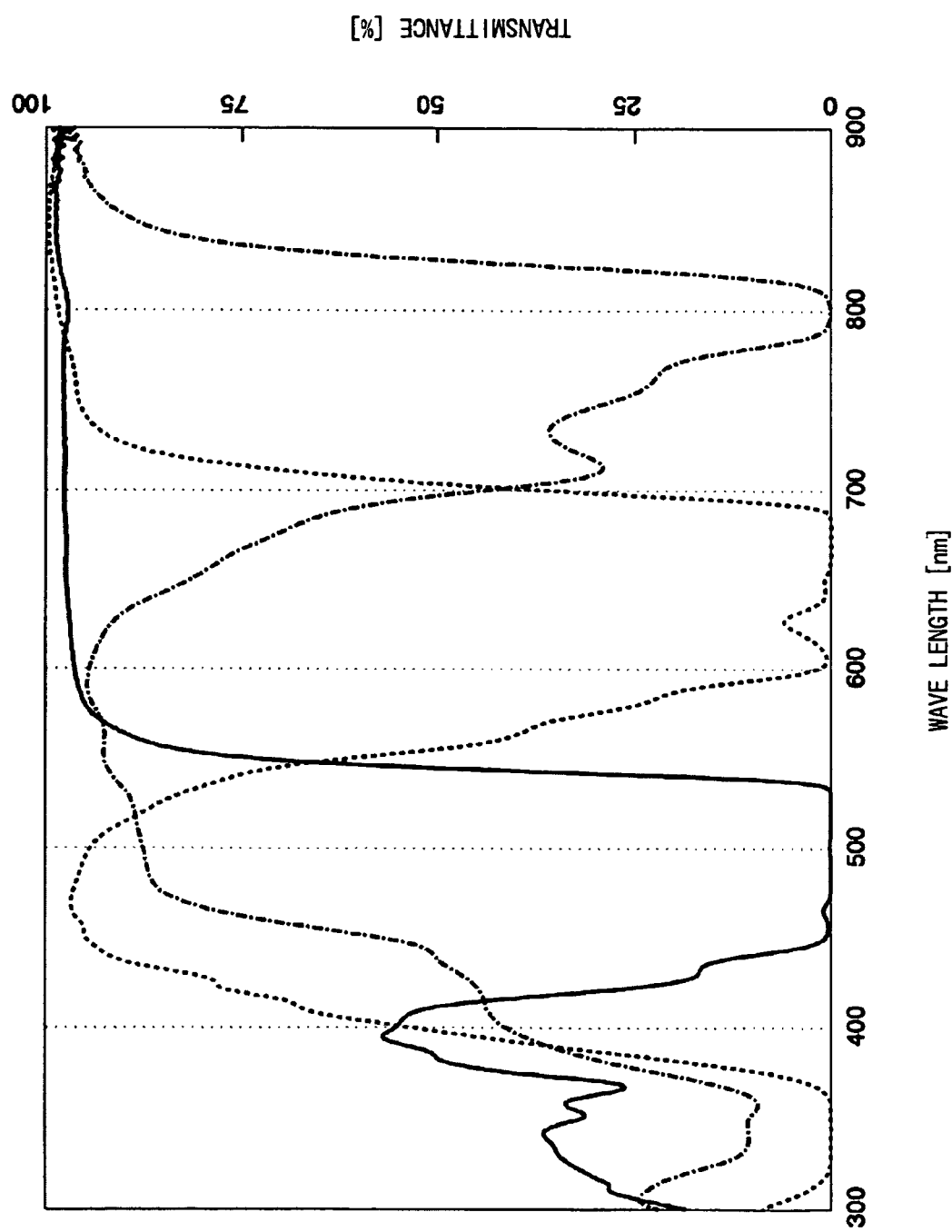
FIG. 16 shows transmittance spectra of solutions of pigments [1], [2], and [3], respectively.

Any one of these pigments has high light resistance and heat resistance and is especially preferable as the pigment for the light-absorbing layer film to form a thermal lens in the optically controlled optical-path-switching-type optical signal transmission apparatus and the optical signal optical path switching method of the invention. Transmittance spectra of tetrahydrofuran solutions of the pigments [1], [2], and [3] are shown in FIG. 16 by a solid line, a broken line, and a dotted dashed line, respectively. Although not shown in FIG. 16, these pigment solutions have a transmittance of 98% or higher in a near infrared region of 900 to 1550 nm.

Relationships between the oscillation frequency of the control light beam laser and the transmittance spectra of these pigments are as shown in Table 1.

or by forming the pigments in a film as a spin-coated film or a vapor-deposited film on the heat-conducting layer film.

When two or more of these pigments are selected and used, it is preferable to use optical path switching mechanisms containing thermal lens forming devices responding to the absorption wavelength bands of each pigment, connecting these mechanisms starting from the one for the smallest wavelength. That is, the absorption bands and non-absorption bands of each of the pigments can be overlapped efficiently and used by, for example, using the pigments in a two-stage configuration of the pigment [1] for an optical path switching mechanism in a first stage and the pigment [2] or the pigment [3] for a second stage, or in a three-stage configuration of the

TABLE 1

|  | Pigment | Laser Oscillation Wavelength [nm] | | | | | | |
| --- | --- | --- | --- | --- | --- | --- | --- | --- |
|  | Number | 445 | 532 | 635 | 650 | 670 | 780 | 800 | 850 |
| Transmittance | [1] | 3.59 | 0.10 | 97.08 | 97.36 | 97.33 | 97.67 | 97.15 | 98.64 |
|  | [2] | 93.64 | 81.67 | 2.32 | 0.78 | 0.00 | 97.23 | 98.37 | 99.63 |
|  | [3] | 52.19 | 89.90 | 88.72 | 81.56 | 73.35 | 9.06 | 0.12 | 89.00 |

As can be seen from Table 1, the pigment [1] is preferable as a material of the light-absorbing layer film of the thermal lens forming device that absorbs the control light beam having a wavelength of 445 to 532 nm. Similarly, the pigment [2] is preferable as a material of the light-absorbing layer film responding to a wavelength of 635 to 670 nm, and the pigment [3] is preferable as a material of the light-absorbing layer film responding to a wavelength of 780 to 800 nm. These pigments can be used by dissolving the pigments in the above solvent and filling the solution in the optical cell, or by dissolving the pigments in the organic high-molecular material and sandwiching the solution between the heat-conducting layer films, pigment [1] for the first stage, the pigment [2] for the second stage and the pigment [3] for a third stage.

[Composition of Material of Light-Absorbing Layer Film, Film Thickness of Light-Absorbing Layer Film in Light-Absorbing Layer Film and Film Thickness of Thermal Lens Forming Layer]

In the thermal lens forming device used in the optically controlled optical-path-switching-type optical signal transmission apparatus and the optical signal optical path switching method, the light-absorbing layer film may be a laminated-layer-type thin film having any one of a single-layer-film structure of "light-absorbing film" alone, or a two-layer structure of "light-absorbing film/thermal lens forming layer", or a three-layer structure of "light-absorbing film/thermal lens forming layer/light-absorbing film". It is preferable that the thickness of the whole light-absorbing layer film does not exceed a length that is twice as long as a confocal distance of the control light beam that has been converged. Furthermore, when a higher response speed is desired, it is preferable that the thickness of the light-absorbing layer film comprising the stacked-layer-type thin films does not exceed the confocal distance of the control light beam that has been converged.

Under these conditions, the composition of the material of the light-absorbing layer film and a thickness of the light-absorbing films in the light-absorbing layer film can be set relative to the transmittance of the control light beam and the signal light beam transmitting the light-absorbing layer film as a combination of these items. For example, among the compositions of the material of the light-absorbing layer film, first, the density of at least a component that absorbs the control light beam or the signal light beam is determined and, then, the thickness of the light-absorbing film(s) in the light-absorbing layer film may be set such that the transmittance of the control light beam and the signal light beam transmitting the thermal lens forming device is of a specific value. Alternatively, first, for example, the thickness of the light-absorbing films in the light-absorbing layer film is set at a specific value in response to the necessity in the apparatus designing. Thereafter, the composition of the material of the light-absorbing layer film can be adjusted such that the transmittance of the control light beam and the signal light beam transmitting the thermal lens forming device becomes a specific value.

The values of the transmittance of the control light beam and the signal light beam transmitting the light-absorbing film, optimal for bringing out a thermal lens effect of a sufficient magnitude and at a high speed with as low power as possible from the thermal lens forming device used in the optically controlled optical-path-switching-type optical signal transmission apparatus and the optical signal optical path switching method of the invention, are respectively as described in the following.

In the thermal lens forming device used in the optically controlled optical-path-switching-type optical signal transmission apparatus and the optical signal optical path switching method of the invention, it is recommended that control of the density and the existing state of the light-absorbing component in the light-absorbing layer film and setting of the film thickness of the light-absorbing films in the light-absorbing layer film are carried out such that the transmittance of the control light beam propagating the light-absorbing layer film in the thermal lens forming device becomes 90% to 0%.

On the other hand, when the control light beam is not irradiated, it is recommended that control of the density and the existing state of the light-absorbing component in the light-absorbing layer film and setting of the film thickness of the light-absorbing films in the light-absorbing layer film be carried out such that the transmittance of the signal light beam propagating the light-absorbing layer film in the thermal lens forming device becomes 10% as the lower limit or higher and approaches unlimitedly 100% as the upper limit. The lower limit of the thickness of the thermal lens forming layer film in the light-absorbing layer film is selected according to the material of the thermal lens forming layer described as follows.

[Material of Thermal Lens Forming Layer and the Film Thickness of Thermal Lens Forming Layer in the Light-Absorbing Layer Film]

Although the single-layer light-absorbing film may itself function as the thermal lens forming layer, other materials may be assigned the functions of light absorption and lens formation, and the optimal materials selected may be employed by stacking the materials.

As the material of the thermal lens forming layer in the light-absorbing layer film, a liquid, liquid crystal, and solid material can be used. Especially, it is preferable that the thermal lens forming layer comprises an organic compound selected from a group consisting of an amorphous organic compound, an organic compound liquid, and a liquid crystal. However, in the case where the material of the thermal lens forming layer is liquid crystal or liquid, the thermal lens forming layer can be produced by, for example, forming the light-absorbing film and/or the heat-conducting layer film from a self-form-maintaining material, providing a cavity having the size corresponding to the thickness of the thermal lens forming layer, and injecting the thermal lens forming layer material in a fluid state. On the other hand, when the material of the thermal lens forming layer is a solid, the light-absorbing film may be produced by stacking the light-absorbing film on one (1) side or both sides of the thermal lens forming layer.

The material of the thermal lens forming layer may not be a single material and, for example, may be formed from a plurality of stacked solid layers, or may be formed from stacked solid and liquid layers.

The thickness of the thermal lens forming layer may be between several nanometers to 1 mm and, more preferably between several tens nanometers to several hundred μm, depending on the kind of the material used.

As described above, it is preferable that the total thickness of the light-absorbing layer film obtained by stacking the thermal lens forming layer and one (1) or two (2) light-absorbing films does not exceed twice the confocal distance of the control light beam that has been converged.

Although any of liquid, liquid crystal, and solid material can be used as the material of the thermal lens forming layer in the light-absorbing layer film, for any of these materials, the refractive index of the material should exhibit a high degree of temperature dependence.

The material property values of the temperature dependence of the refractive index of the typical organic compound liquids and water are described in literature [D. Solimini: J. Appl. Phys., vol. 37, 3314 (1966)]. The variation of refractive index with temperature for a light beam having the wavelength of 633 nm [unit: 1/K] is larger in alcohols such as methanol ($3.9 \times 10^{-4}$) than in water ($0.8 \times 10^{-4}$), and is much larger in non-hydrogen-bonding organic solvents such as cyclopentane ($5.7 \times 10^{-4}$), benzene ($6.4 \times 10^{-4}$), chloroform ($5.8 \times 10^{-4}$), carbon dichloride ($7.7 \times 10^{-4}$).

When liquid crystal is used as the material of the thermal lens forming layer in the light-absorbing layer film, any known liquid crystal can be used. Specifically, any of the following materials may be used as liquid crystal: various cholesterol derivatives;
4'-alkoxybenzylidene-4-cyanoanilines such as
4'-n-butoxybenzylidene-4-cyanoaniline and
4'-n-hexylbenzylidene-4-cyanoaniline;
4'-alkoxybenzylideneanilines such as
4'-ethoxybenzylidene-4-n-butylaniline,
4'-methoxybenzylideneaminoazobenzene,
4-(4'-methoxybenzyldene)aminobiphenyl, and
4-(4'-methoxybenzylidene)aminostilbene;

4'-cyanobenzylidene-4-alkoxyanilines such as 4'-cyanobenzylidene-4-n-butoxyaniline and 4'-cyanobenzylidene-4-n-hexyloxyaniline; carbonated esters such as 4'-n-butoxycarbonyloxybenzylidene-4-methoxyaniline and p-carboxyphenyl•n-amylcarbonate, n-heptyl• 4-(4'-ethoxyphenoxycarbonyl)phenylcarbonate; 4-alkylbenzoic acid•4'-alkoxyphenyl esters such as 4-n-butylbenzoic acid•4'-ethoxyphenyl, 4-n-butylbenzoic acid•4'-octyloxyphenyl, 4-n-pentylbenzoic acid• 4'-hexyloxyphenyl; azoxybenzene derivatives such as 4,4'-di-n-amyloxyazoxybenzene, 4,4'-di-n-nonyloxyazoxybenzene; 4-cyano-4'-alkylbiphenyls such as 4-cyano-4'-n-octylbiphenyl, 4-cyano-4'-n-dodecylbiphenyl: and ferroelectric liquid crystal such as (2S, 3S)-3-methyl-2-chloropentanoic acid• 4',4"-octyloxybiphenyl, 4'-(2-methylbutyl)biphenyl-4-carboxylic acid• 4-hexyloxyphenyl, and 4'-octylbiphenyl-4-carboxylic acid• 4-(2-methylbutyl)phenyl.

When a solid material is used as the material of the thermal lens forming layer in the light-absorbing layer film, an amorphous organic compound that causes little optical dispersion and has high dependence on temperature of the refractive index thereof is especially preferable. Specifically, similarly to the matrix material described above, compounds known as optical resins can be preferably selected and used. Variation with temperature of the refractive index [unit: 1/K] of optical resins is $1.2 \times 10^{-4}$ for poly(methylmethacrylate), $1.4 \times 10^{-4}$ for polycarbonate, and $1.5 \times 10^{-4}$ for polystyrene, according to the Technical Information Association publication "Development and Properties of the Latest Optical Resins and Design and Forming Techniques of High-Precision Parts" [Technical Information Association (1993), p. 35]. These resins can be preferably used as the material of the thermal lens forming layer in the light-absorbing layer film.

The above organic solvents have an advantage that the temperature dependence of refractive index thereof is higher than that of the above optical resins. However, the organic solvents have a problem that the solvents boil when the increase in temperature resulting from irradiation with the control light beam heats to organic solvents to their respective boiling points (No such arises when a high-boiling point solvent is used). In contrast, an optical resin from which volatile impurities have been thoroughly removed, for example, polycarbonate can be used under harsh conditions wherein the increase in temperature resulting from irradiation with the control light beam exceeds 250° C.

[Heat-Insulating Layer Film]

When a gas is used as the heat-insulating layer film, in addition to air, inert gases such as nitrogen, helium, neon, argon, etc. can be preferably used.

When a liquid is used as the heat-insulating layer film, any liquid can be used as long as the heat conductivity of the liquid is equal to that of the light-absorbing layer film or smaller than that of the light-absorbing layer film, the liquid transmits the control light beam and the signal light beam, and the liquid does not melt or corrode the material of the light-absorbing layer film. For example, liquid paraffin can be used when the light-absorbing layer film comprises polymethylmethacrylate containing a cyanine pigment.

When a solid is used as the heat-insulating layer film, any solid can be used as long as the solid has a heat conductivity equal to that of the light-absorbing layer film (the light-absorbing film and the thermal lens forming layer) or smaller than that of the light-absorbing layer film, transmits the control light beam and the signal light beam and does not react with the material of the light-absorbing layer film and the heat-conducting layer film. For example, polymethylmethacrylate not containing any pigment [having the heat conductivity of 0.15 W/mK at 300K] can be used when the light-absorbing layer film comprises polymethylmethacrylate containing a cyanine pigment.

[Material of Heat-Conducting Layer Film]

A material having larger heat conductivity than that of the light-absorbing layer film is preferable as the material of the heat-conducting layer film, and any material can be used when the material transmits the control light beam and the signal light beam and does not react with the materials of the light-absorbing layer film and the heat-insulating layer film. Examples of usable materials having high heat-conductivity and small light absorption in wavelength bands in the visible spectrum include, for example, diamond [having a heat conductivity of 900 W/mK at 300K], sapphire [having a heat conductivity of 46 W/mK at 300K], a single quartz crystal [having a heat conductivity of 10.4 W/mK at 300K in a direction parallel to c-axis], quartz glass [having a heat conductivity of 1.38 W/mK at 300K], hard glass [having a heat conductivity of 1.10 W/mK at 300K], etc.

[Material of Light-Absorbing Layer]

In the thermal lens forming device used in the invention, a refractive-index-distributed-type lens functioning as means for converging the control light beam may be provided stacked on the side through which the control light beam enters the light-transmitting layer and materials. For this lens, solid materials similar to those of the heat-insulating layer film and/or the heat-conducting layer film can be used. The light-transmitting layer is provided not only for improving the efficiency of transmission of the control light beam and the signal light beam, but also for adhering the refractive-index-distributed-type lens as an element constituting the thermal-lens forming device. Among UV-curing-type resins and electron-beam-curing-type resins, those having high light transmittance in the wavelength bands of the control light beam and the signal light beam can be especially preferably employed.

[Method of Producing Thermal Lens Forming Device]

A method of producing the thermal lens forming device used in the present invention can be selected in consideration of the configuration of the thermal lens forming device and the materials used, and any suitable known method can be used.

For example, when the material of the light absorbance used for the light-absorbing film in the thermal lens forming device is a single crystal as described above, the light-absorbing film can be produced by cutting and polishing process the single crystal.

In another example, when a thermal lens forming device having a "heat-conducting layer film/light-absorbing film/thermal lens forming layer/light-absorbing film/heat-conducting layer film" configuration for which the light-absorbing film comprising the matrix material containing a pigment is produced, and in which the thermal lens forming layer comprising an optical resin and optical glass as the heat-conducting layer film are combined, the light-absorbing film can be first produced on the heat-conducting layer film by any of the methods listed hereafter.

A method may be used of forming the light-absorbing film by coating a solution dissolving the pigment and the matrix material on a glass plate used as the heat-conducting layer film by a coating method such as an applying method, a blade coating method, a roll coating method, a spin-coating method, a dipping method, a spraying method, etc., or by printing the solution on the glass plate by a printing method such as planography, relief printing, intaglio printing, mimeograph, screen printing, transferring, etc. In conjunction with any of these methods, a method of producing an inorganic matrix material by the sol-gel method can also be utilized for forming the light-absorbing film.

Electrochemical film-forming techniques such as an electro-deposition method, an electrolytic polymerization method, a micelle electrolysis method (see, for example, Japanese Patent Application Laid-Open Publication No. 1988-243298), etc. can be used.

Furthermore, the Langmuir-Blodgett method that transfers a mono-molecular film formed on water can also be used.

As methods of utilizing reactions of polymerization or condensation-polymerization of a raw material monomer, in the case where the monomer is liquid, a casting method, a reaction injection molding method, a plasma polymerization method, a photo-polymerization method, etc. are among methods that can be employed.

Additional applicable methods include a sublimation transfer method, a vapor-deposition method, a vacuum vapor-deposition method, an ion beam method, a sputtering method, a plasma polymerization method, a CVD method, an organic molecular beam vapor-deposition method, etc.

A method of producing a composite-type optical thin film (see, for example, Japanese Patent Application Publication No. 2599569) can be utilized, wherein an organic optical material having two (2) or more components in a solution state or a dispersed liquid state is deposited on a substrate by spraying the material into a high-vacuum container from a spray nozzle provided for each component and is heat-processed.

The above-described methods of producing the solid light-absorbing film can also be preferably used in, for example, when the heat-insulating film comprising a solid organic high-molecular material.

Next, when the thermal lens forming layer is produced using the thermo-plastic optical resin, an element having a configuration of "heat-conducting layer film/light-absorbing film/thermal lens forming layer/light-absorbing film/heat-conducting layer film" can be produced for use as the thermal-lens forming device using a vacuum hot-pressing method (see, for example, Japanese Patent Application Laid-Open Publication No. 1992-99609). That is, the laminated-layer-type thin film device having the above configuration can be produced by sandwiching powder or a sheet of the thermo-plastic optical resin by two (2) heat-conducting layer films (glass plates) having respectively a light-absorbing film formed on the surface thereof by the method described above, and heating and pressing these films and resin.

[Material and Method of Producing Refractive-Index-Distributed-Type Lens]

For the thermal lens forming device used in the invention, the refractive-index-distributed-type lens as means for converging the control light beam may be provided stacked on the side of the device through which the control light beam enters through the light-absorbing layer. However, known materials and methods can be used optionally as the material and the method of producing this refractive-index-distributed-type lens.

For example, the refractive-index-distributed-type lens of a refractive-index-distributed type can be produced with an organic high-molecular material utilizing osmosis/diffusion phenomena of monomer [M. Oikawa, K. Iga and T. Sanada, Jpn. J. Appl. Phys., 20 (1), L51-L54 (1981)]. That is, the refractive-index-distributed-type lens can be fabricated monolithically on a flat substrate by a monomer exchange technique. For example, methylmethacrylate as a low-refractive-index plastic (n=1.494) is diffused into a flat plastic substrate of polydiacrylisophthalate having a high refractive index from the circumference of a mask of a circular disk having a diameter of 3.6 mm.

Furthermore, the refractive-index-distributed-type lens of a refractive-index-distributed type can be fabricated from an inorganic glass material utilizing diffusion phenomenon of inorganic ion [M. Oikawa and K. Iga, Appl. Opt., 21 (6), pp. 1052-1056 (1982)]. That is, after a mask is set onto a glass substrate, a circular window having a diameter of approximately 100 μm is provided to the mask by a photolithography technique, the substrate with the mask is dipped in melted salt, and a distribution of refractive index is formed by ion exchange, and a lens having, for example, a diameter of 0.9 mm, a focal distance of 2 mm and a numerical aperture NA=0.23 can be formed by facilitating ion exchange by applying an electric field for several hours during the dipping process.

[Optical Cell]

The optical cell used in the pigment-solution-filling-type thermal lens forming device has a function of holding the pigment solution and another function of effectively providing a shape to the pigment solution and causing the pigment solution to work as a combined light-absorbing layer film and thermal lens forming layer and, furthermore, has another function of receiving the converged and irradiated signal light beam and the control light beam and causing the signal light beam and the control light beam to propagate to the above-described light-responding composition, and yet another function of causing the diverging signal light beam to propagate and exit after transmitting the light-responding composition.

The shape of the optical cell used in the pigment-solution-filling-type thermal lens forming device can be roughly classified into an "outer shape" and an "inner shape".

As the outer shape of the optical cell, a plate shape, a 000000cuboidal shape, a columnar shape, a semi-cylindrical shape, a quadrangular-prism shape, a triangular-prism shape, etc. is used according to the configuration of the optically controlled optical-path-switching-type optical signal transmission apparatus of the invention.

The inner shape of the optical cell is, i.e., the shape of a pigment solution filling unit and effectively gives a shape to the pigment solution. Specifically, the inner shape of the optical cell can be properly selected from, for example, a thin-film shape, a thick-film shape, a plate shape, a cuboidal shape, a columnar shape, a semi-cylindrical shape, a quadrangular-prism shape, a triangular-prism shape, a convex-lens shape, a concave-lens shape, etc. according to the configuration of the optically controlled optical-path-switching-type optical signal transmission apparatus of the invention.

As the configuration and the material of the optical cell, any combination of configurations and materials that satisfies the following conditions can be used as desired:

(1) the outer shape and the inner shape described above are precisely maintained under actual use conditions;

(2) the material is inert to a pigment solution;

(3) variations of composition resulting from emanation, permeation, or osmosis of the components constituting the pigment solution are prevented; and (4) the pigment solution is prevented from degrading due to contact with gases or liquids such as oxygen, water, etc. present in the environment during use.

As specific examples of materials of the optical cell, materials that can be preferably used regardless of the kind of the pigment include various optical glass such as soda glass, boron silicate glass; quartz glass; sapphire, etc. When the solvent of the pigment solution is water or alcohol, plastics such as poly(methyl methacrylate), polystyrene, polycarbonate, etc. can also be used.

However, among the conditions described above, the function of preventing variation of the composition and degradation of the pigment solution may be exerted only within the range of the designed life as the thermal lens forming device.

An optical cell having an integrated configuration incorporating other optical elements, i.e., the condenser lens, the light-receiving lens, the wavelength selecting and transmitting filter, etc. into the optical cell can be employed.

[Calculation of Beam Waist Diameter]

In order to effectively utilize the thermal lens effect in the optically controlled optical-path-switching-type optical signal transmission apparatus and the optical signal optical path switching method of the invention, it is preferable that the shape and the size of the beam cross section of the signal light beam and the control light beam are set respectively such that the magnitude of the beam cross-sectional area of the signal light beam in the area having the highest photon density in the vicinity of a focal point (the point on which light is concentrated), i.e., the beam waist, does not exceed the magnitude of the beam cross-sectional area of the control light beam at the beam waist.

Now, a case wherein the distribution of amplitudes of the electric field of the beam cross section in the direction of traveling, i.e., the energy distribution of the light flux is the Gaussian distribution, will be described. In the following description, although an example wherein a condenser lens (refractive-index-distributed-type lens) is used as beam converging means will be described, the same description can be applied even when the converging means is a concave mirror or a refractive-index-dispersed-type lens.

Figure 17:
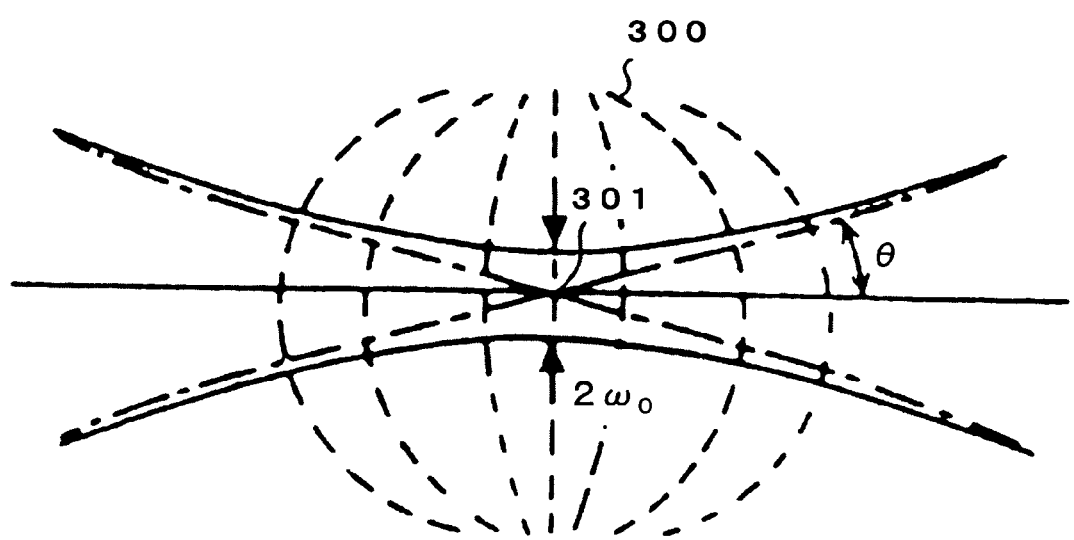
FIG. 17 is a schematic view showing the vicinity of a focal point of a Gaussian beam converged by a condenser lens, etc.

A view of a light beam flux and wave fronts 300 in the vicinity of a focal point 301 when a Gaussian beam is converged at a divergence angle of $2\theta$ by a condenser lens 31, etc. of FIG. 4a and FIG. 4b is shown in FIG. 17. Here, the position at which the diameter $2\omega$ of the Gaussian beam having a wavelength $\lambda$ reaches its minimum value is referred to as the beam waist, and the beam waist diameter is hereinafter represented by $2\omega_0$. $2\omega_0$ does not become zero (0) and has a finite value because of the diffraction effect of light. The definition of beam radiuses $\omega$ and $\omega_0$ is that these lengths are obtained by measuring distances from the beam center to the position at which energy becomes $1/e^2$ (e is the base of the natural logarithm) relative to the energy at the beam central portion of the Gaussian beam, and the beam diameter is represented by $2\omega$ or $2\omega_0$. Obviously, the photon density is highest at the center of the beam waist.

For a Gaussian beam, a beam divergence angle $\theta$ at a position sufficiently far away from the beam waist thereof is correlated with the wavelength $\lambda$ thereof and the beam waist radius $\omega_0$ by the following Equation [4].

$$\Pi \cdot \theta \cdot \omega_0 \approx \lambda \quad [4]$$

Here, $\Pi$ is the ratio of the circumference of a circle to the diameter thereof.

When the above Equation [4] is used under the condition that is sufficiently far away from the beam waist, the beam waist radius $\omega_0$ of the beam waist created by concentrating the light beam using a condenser lens can be calculated from the beam radius $\omega$ of the light beam entering into the condenser lens and the numerical aperture and the focal distance of the condenser lens.

Furthermore, the beam waist diameter $2\omega_0$ in the case where a parallel Gaussian beam (wavelength $\lambda$) having a beam radius $\omega$ is converged by a condenser lens having an effective aperture radius "a" and a numerical aperture NA can be generally represented by the following Equation [5].

$$2\omega_0 \approx k \cdot \lambda / NA \quad [5]$$

Here, because a coefficient k can not be solved algebraically, the coefficient k can be determined by carrying out numerical analytical calculation of the optical intensity distribution on a lens imaging plane.

When the numerical analytical calculation is carried out changing the ratio of the beam radius $\omega$ entering the condenser lens and the effective aperture radius a of the condenser lens, the value of the coefficient k in the Equation [5] can be obtained as follows.

When $a/\omega=1$, $k \approx 0.92$;
When $a/\omega=2$, $k \approx 1.3$;
When $a/\omega=3$, $k \approx 1.9$; and
When $a/\omega=4$, $k \approx 3$.

That is, as the beam radius $\omega$ becomes smaller than the effective aperture radius a of the condenser lens, the beam waist radius $\omega_0$ becomes larger.

For example, when a signal light beam having a wavelength of 780 nm is converged using a lens having a numerical aperture of 0.25 and an effective aperture radius of approximately 5 mm as a condenser lens, and the beam radius $\omega$ of a beam entering the condenser lens is 5 mm, then $a/\omega$ is approximately one (1) and the beam waist radius $\omega_0$ is calculated to be 1.4 μm. Similarly, when $\omega$ is 1.25 mm, then $a/\omega$ is approximately four (4) and $\omega_0$ is calculated to be 4.7 μm. Similarly, when the control light beam having a wavelength of 633 nm is converged, if the beam radius $\omega$ is 5 mm, then, $a/\omega$ is approximately one (1) and the beam waist radius $\omega_0$ is 1.2 μm; if $\omega$ is 1.25 mm, then, $a/\omega$ is approximately four (4) and $\omega_0$ is 3.8 μm.

As can be clearly seen from the above examples of calculations, in order to minimize the cross-sectional area of a light beam at the area having the highest photon density in the vicinity of a focal point of a condenser lens, i.e., the beam waist, the beam diameter may be expanded (beam expanding) until the intensity distribution of the light beam entering the condenser lens becomes almost that of a plane wave. Furthermore, it is understood that the beam waist diameter becomes smaller as the wavelength of the light becomes shorter when the beam diameters of the beams entering the condenser lens are the same.

As described above, in order to effectively utilize the thermal lens effect in the optically controlled optical-path-switching-type optical signal transmission apparatus and the optical signal optical path switching method of the invention, it is preferable that the shape and the size of the beam cross section of the signal light beam and the control light beam are set respectively such that the magnitude of the beam cross-sectional area of the signal light beam in the area having the highest photon density in the vicinity of a beam waist does not exceed the magnitude of the beam cross-sectional area of the control light beam at the beam waist. In a case wherein Gaussian beams are used as both the signal light beam and the control light beam, it can be ensured that the magnitude of the beam cross-sectional area of the signal light beam in the area having the highest photon density in the vicinity of the beam waist will not to exceed the magnitude of the beam cross-sectional area of the control light beam at the beam waist thereof by adjusting the beam diameters of the signal light beam and the control light beam in the state where these light beams are parallel beams respectively before being converged by converging means such as a condenser lens, etc., in response to the wavelengths of these beams, by expanding the beam when necessary, according to the above description and above equations for calculation. As means for expanding a light beam, known means such as, for example, a Keplerian optical system comprising two (2) convex lenses may be used.

[Calculation of Confocal Distance Zc]

In general, a converged Gaussian light beam can be approximated as a parallel light beam in the vicinity of the beam waist of the light flux converged by converging means such as a convex lens, i.e., a section between the confocal distances Zc sandwiching a focal point. The confocal distance Zc can be represented by Equation [6] that uses the ratio of the circumference of a circle to the diameter thereof Π, the beam waist radius $\omega_0$, and the wavelength λ.

$$Zc = \Pi \omega_0^2 / \lambda \qquad [6]$$

By substituting the Equation [5] for $\omega_0$ of the Equation [6], an Equation [7] is obtained.

$$Zc \approx \Pi (k/NA)^2 \lambda / 4 \qquad [7]$$

For example, when a signal light beam having a wavelength of 780 nm is converged using a lens having a numerical aperture of 0.25 and an effective aperture radius of approximately 5 mm as a condenser lens, if the beam radius ω of the light beam entering the condenser lens is 5 mm, then, a/ω is approximately one (1), the beam waist radius $\omega_0$ is 1.4 μm and the confocal distance Zc is calculated to be 8.3 μm and, if ω is 1.25 mm, then, a/ω is approximately four (4), $\omega_0$ is 4.7 μm and the confocal distance Zc is calculated to be 88 μm. Similarly, when the control light beam having a wavelength of 633 nm is converged, if the beam radius ω is 5 mm, then, a/ω is approximately one (1), the beam waist radius $\omega_0$ is 1.2 μm and the confocal distance Zc is calculated to be 6.7 μm and, if ω is 1.25 mm, then, a/ω is approximately four (4), $\omega_0$ is 3.8 μm and the confocal distance Zc is calculated to be 71 μm.

[Numerical Aperture of Condenser Lens and Light-Receiving Lens]

In the optically controlled optical-path-switching-type optical signal transmission apparatus and the optical signal optical path switching method of the present invention, the signal light beam and the control light beam are converged by the condenser lens and irradiated such that these light beams focus in the thermal lens forming device. However, when the light beams exiting from the thermal lens forming device at a divergence angle larger than the ordinary divergence angle are received by a light-receiving lens and are collimated into parallel light beams, it is preferable that the numerical aperture (hereinafter, referred to as "NA") of the light-receiving lens be set at an NA larger than the NA of the light-receiving lens. In addition, it is preferable that the NA of the light receiving lens equals to or exceeds an NA twice as large as the NA of the light-receiving lens. However, when the effective aperture radius a is larger than the beam radius ω of the beam entering the condenser lens (i.e., a/ω>1), the substantial numerical aperture of the condenser lens is smaller than the numerical aperture of the condenser lens. Therefore, it is preferable that the numerical aperture of the light-receiving lens is set to be larger than the substantial numerical aperture of the condenser lens but the numerical aperture of the condenser lens and to be equal to or larger than a numerical aperture twice as large as the substantial numerical aperture of the condenser lens. By setting the NA of the light-receiving lens to be equal or larger than an NA twice as large as the NA of the condenser lens, the signal light beam can be received without any loss even when the beam diameter of the signal light beam is expanded to a diameter equal to or exceeding a diameter twice as large as the diameter thereof at the time when the signal light beam enters the thermal lens forming device.

[Optical Film Thickness of Light-Absorbing Layer Film]

Experimental results determined by producing samples while varying the thickness of the thermal lens forming device without changing the thickness of the one (1) or two (2) light-absorbing films constituting the light-absorbing layer film and conducting experiments for a plurality of thermal lens forming devices having different thickness and a constant optical density revealed the optical response speed of the thermal lens effect was sufficiently high when the a distance twice as large as the confocal distance Zc calculated as described above was set as the upper limit of the film thickness of the light-absorbing layer film.

As to the lower limit of the film thickness of the light-absorbing layer film, it is preferable that the light-absorbing layer film be made as thin as possible while preserving the thermal lens effect.

[Film Thickness of Heat-Insulating Layer Film]

Optimal values for the film thickness of the heat-insulating layer film (the lower limit value and the upper limit value) are those that maximize the magnitude or the speed of the optical response. These values can be determined experimentally according to the configuration of the thermal lens forming device, the material and the thickness of the light-absorbing layer film, the material of the heat-insulating layer film, the material and the thickness of the heat-conducting layer film, etc. For example, in a case wherein, using the ordinary boron silicate glass as the heat-conducting layer film, polycarbonate as the material of the heat-insulating layer film and the thermal lens forming layer, and a vapor-deposited film of platinaphthalocyanine as the light-absorbing film, a thermal lens forming device is produced, that has a configuration of glass (heat-conducting layer film having a film thickness of 150 μm)/polycarbonate resin layer (heat-insulating layer)/platinaphthalocyanine-vapor-deposited film (light-absorbing film having a film thickness of 0.2 μm)/polycarbonate resin layer (thermal lens forming layer having a thickness of 20 μm)/platinaphthalocyanine-vapor-deposited film (light-absorbing film having a film thickness of 0.2 μm/polycarbonate resin layer (heat-insulating layer)/glass (heat-conducting layer film having a thickness of 150 μm), the thickness of the heat-insulating layer film is preferably from 5 nm to 5 μm and, more preferably, is 50 nm to 500 nm.

[Film Thickness of Heat-Conducting Layer Film]

Optimal values for the thickness of the heat-conducting layer film (in this case, the lower limit value) are values that maximize the magnitude or the speed of the optical response. Such values can be determined experimentally according to the configuration of the thermal lens forming device, the material and the thickness of the light-absorbing layer film, the material and the thickness of the heat-insulating layer, the material of the heat-conducting layer film, etc. For example, in the case where, using the ordinary boron silicate glass as the heat-conducting layer film, polycarbonate as the material of the heat-insulating layer film and the thermal lens forming layer, and a vapor-deposited film of platinaphthalocyanine as the light-absorbing film, a thermal lens forming device is produced, that has a configuration of glass (heat-conducting layer film having a film thickness of 150 μm)/polycarbonate resin layer (heat-insulating layer)/platinaphthalocyanine-vapor-deposited film (light-absorbing film having a film thickness of 0.2 μm)/polycarbonate resin layer (thermal lens forming layer having a thickness of 20 μm)/platinaphthalocyanine-vapor-deposited film (light-absorbing film having a film thickness of 0.2 μm/polycarbonate resin layer (heat-insulating layer)/glass (heat-conducting layer film having a thickness of 150 μm), the lower limit of the thickness of the heat-conducting layer film is preferably 10 μm and, more preferably, 100 μm. The upper limit of the thickness of the heat-conducting layer film in terms of the magnitude or the speed of the optical response is not especially constrained. However, it is necessary to design this thickness matching this thickness with the types, focal distances and working distances of the condenser lens and the light-receiving lens used.

[Operation Principle and Operating Mode of Optical Path Switching Mechanism Using Thermal Lens Effect]

Views for describing the operation principles of an optical path switching mechanism 91 as the minimum unit that configures an optical switch used in the present invention are shown in FIGS. 11a, 11b, 12a, 12b, 13a, 13b, 14a and 14b. In these figures, a thermal lens forming device 1 has a structure in which a heat-conducting layer film 501, a light absorbing layer film and thermal lens forming layer 502, and a heat-conducting layer film 503 are stacked in that order. A Gaussian beam, in which the intensity distribution on a cross section of the laser beam used as a control light beam shows a Gaussian distribution, is employed. Converging a Gaussian beam using a condenser lens such as a convex lens, the optical intensity distribution at the beam waist (concentrating point; focal point) becomes a Gaussian distribution.

As shown FIGS. 11a and 11b, when a collimated parallel light beam 110 (signal light beam or control light beam) is converged by a condenser lens 31 and irradiated on a light absorbing layer film and a thermal lens forming layer 502 in a thermal lens forming device 1, the control light beam converged and irradiated as the parallel light beam is absorbed in the light absorbing layer film, the light energy is converted to thermal energy, and the temperature of the thermal lens forming layer in the vicinity of and adjacent to the light absorbing layer film where light is absorbed is increased, resulting in decrease of the refractive index thereof. When a light beam having Gaussian-distributed optical intensity as described above is irradiated, the central portion of the Gaussian distribution having the strongest optical intensity is converged and the area being irradiated with the light beam becomes the center of light absorption and, in this area, the temperature becomes the highest and the refractive index becomes the lowest. The absorbed light changes into heat from the central portion of the light absorption toward the outer circumference and, furthermore, the refractive index of the light absorbing layer film containing the thermal lens forming layer is varied spherically from the center of the light absorption toward the exterior due to the heat conveyed to the periphery, and a distribution of refractive index having low refractive index at the center of the light absorption and higher refractive index toward the exterior is created, and locally this distribution functions as a concave lens. In practice, the control light beam is condensed by a condenser lens 31 or the like and is irradiated into the light absorbing layer film containing the thermal lens forming layer. Then, light absorption occurs multiply in the traveling direction of the converged light beam and the light flux of the traveling control light beam itself is also multiply deformed by the thermal lens formed. Therefore, the thermal lens effect that is observed here is different from the effect caused by a single concave lens as described below.

Figure 18A:
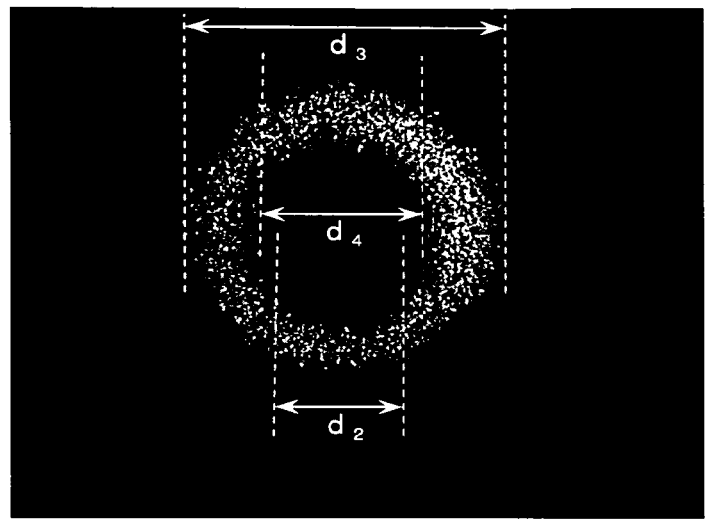
FIG. 18(a) is an image captured when a control light beam was irradiated at the same time after the position of the beam waist was adjusted such that the beam waist was positioned in the vicinity of the beam-entering side of a light absorbing layer film.
Figure 18B:
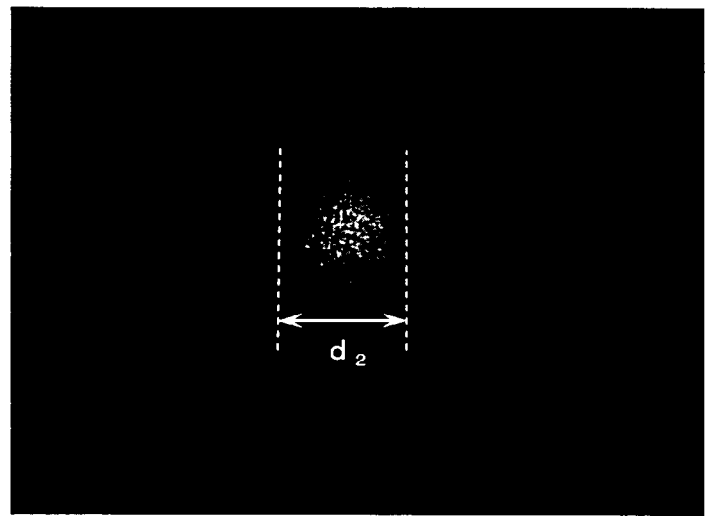
FIG. 18(b) is an image captured when only a signal light beam was converted and irradiated.

When the control light beams having a wavelength in a absorption band of the light absorbing layer film and the signal light beams having a wavelength in a transmission band are irradiated simultaneously such that these light beams focus at a position 5 close to the entering surface of the light absorbing layer film of the thermal lens forming device 1 as shown in FIG. 11a, the signal light beams exit with a divergence angle larger than that of ordinary exiting light beams 200 as exiting light beams 201 being spread such that the cross section of the light beam spreads in an annular shape, due to a thermal lens 50 formed at a position close to the entering surface by the control light beams as shown in FIG. 12(a). The photographs of signal light beam cross-sections shot from the rear side after projecting the signal light beam 201 or 200 that exited from the thermal lens forming device 1 on a semitransparent screen placed at a distance of about 50 cm are shown in FIGS. 18(a) and 18(b). As shown in FIG. 18(b), the cross-section of the signal light beam 200 exited at an ordinary divergence angle from the thermal lens forming device 1 has a circular shape with a diameter of $d_2$ on the screen. Whereas, when the control light beam and the signal light beam are irradiated simultaneously such that these light beams focus at a position 5 close to the entering surface of the light absorbing layer film of the thermal lens forming device 1, the cross-section of the exited signal light beam 201 diffused so that the cross section of the light beam spreads in an annular shape through the thermal lens 50 formed at a position close to the entering surface is, as shown in FIG. 18(a), projected on the screen as the ring having an outer diameter of $d_3$ and an inner diameter of $d_4$. As clearly observed in FIG. 18, both of the outer diameter $d_3$ and the inner diameter $d_4$ are larger than a circular beam diameter $d_2$ of the signal light beam when a control light beam is not irradiated.

Figure 18C:
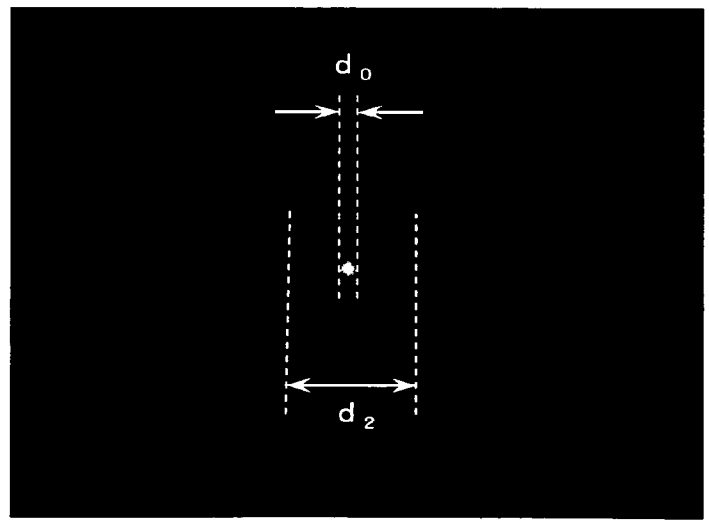
FIG. 18(c) is an image captured after the position of the beam waist was adjusted such that the beam waist was positioned in the vicinity of the beam-exiting side of a light absorbing layer film.

On the other hand, as shown in FIG. 11b, when the control light beams and the signal light beams are irradiated simultaneously such that these light beams focus at a position 6 close to the exiting surface of the light absorbing layer film of the thermal lens forming device, the signal light beam exits as a signal light beam 119 that has been converged by a thermal lens 60 formed at a position close to the exiting surface by the control light beam as shown in FIG. 12b. FIG. 18(c) shows a photograph of a cross-section of the exited signal light beam 119 that exited from the thermal lens forming device 1, and projected on the semitransparent screen, then shot from the rear side. When the control light beams and the signal light beams are irradiated simultaneously such that these light beams focus at a position 6 close to the exiting surface of the light absorbing layer film of the thermal lens forming device 1, the cross section of the exited signal light 119 that is converged by the thermal lens 60 formed at a position close to the exiting surface formed by the control signal beam and exits unchanged, and is projected on the screen as a circular shape with an outer diameter of $d_0$. As clearly shown in FIG. 18, the outer diameter $d_0$ is smaller than the diameter d2 of the circular shaped beam of the signal light beam when a control light beam is not irradiated. The luminance of the converged and exited signal light beam 119 is significantly high, therefore a neutral density filter was provided before the screen to prevent halation when projecting the signal light beam 119 projected on the screen.

In either of the examples shown in FIGS. 11a and 11b, the signal light beam only exits as the exited light beam 200 at an ordinary divergence angle without being affected by the thermal lens 50 or 60 when no control light beam is irradiated, as shown by dotted lines in FIGS. 12*a* and 12*b*.

Figure 19:
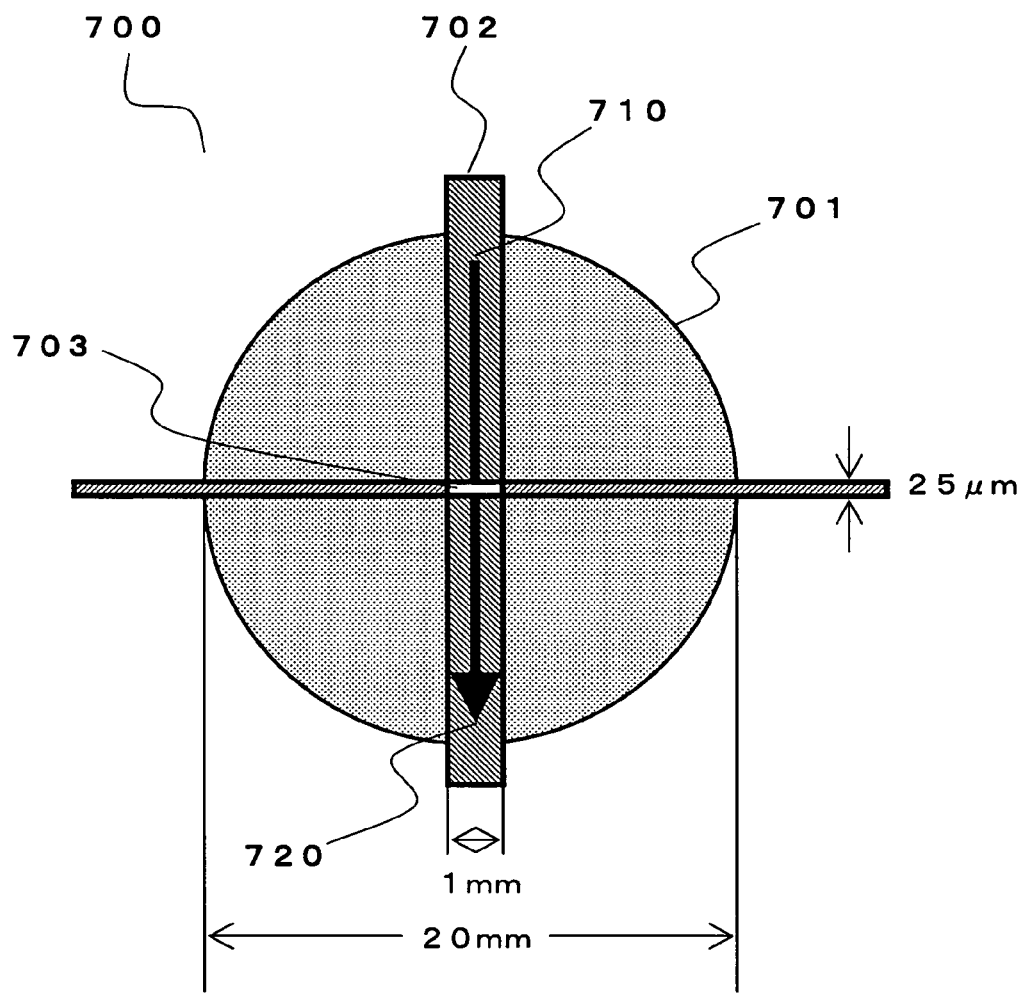
FIG. 19 shows the relationship between a slit and a light beam used in optical intensity distribution measurement on a cross-sectional plane of a signal light beam.
Figure 20:
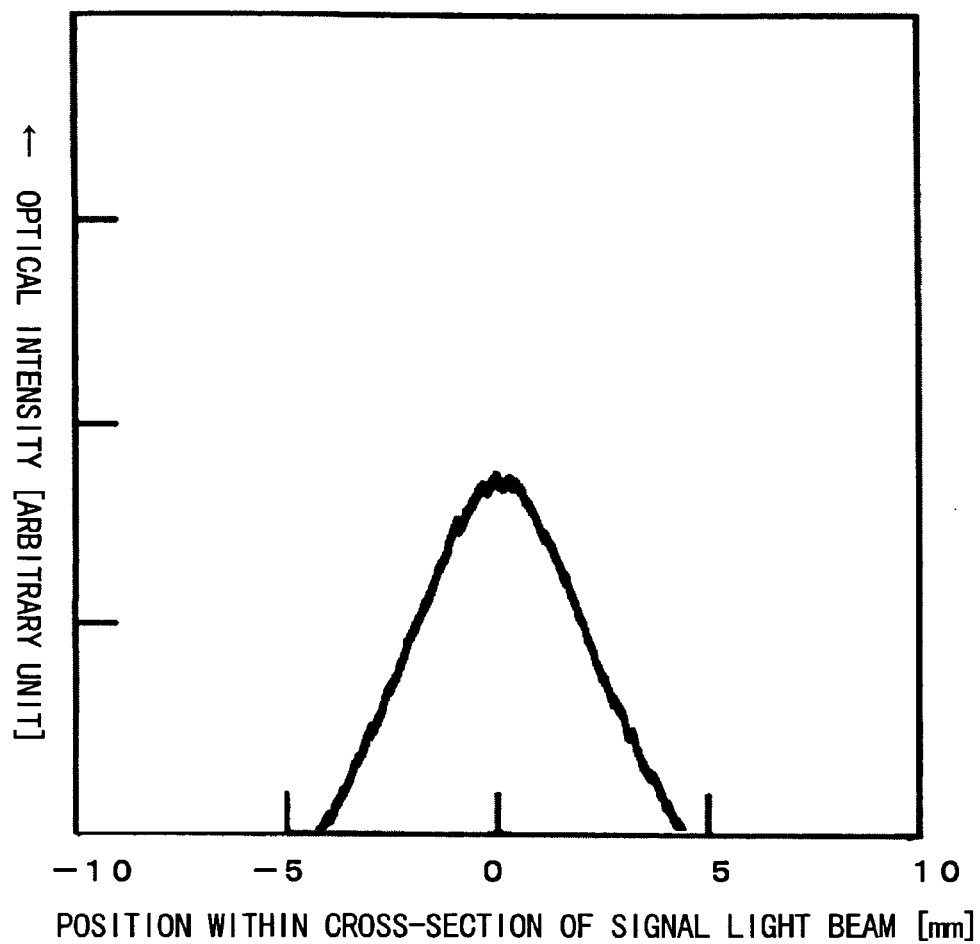
FIG. 20 shows an optical intensity distribution on a cross-sectional plane of a signal light beam.
Figure 21:
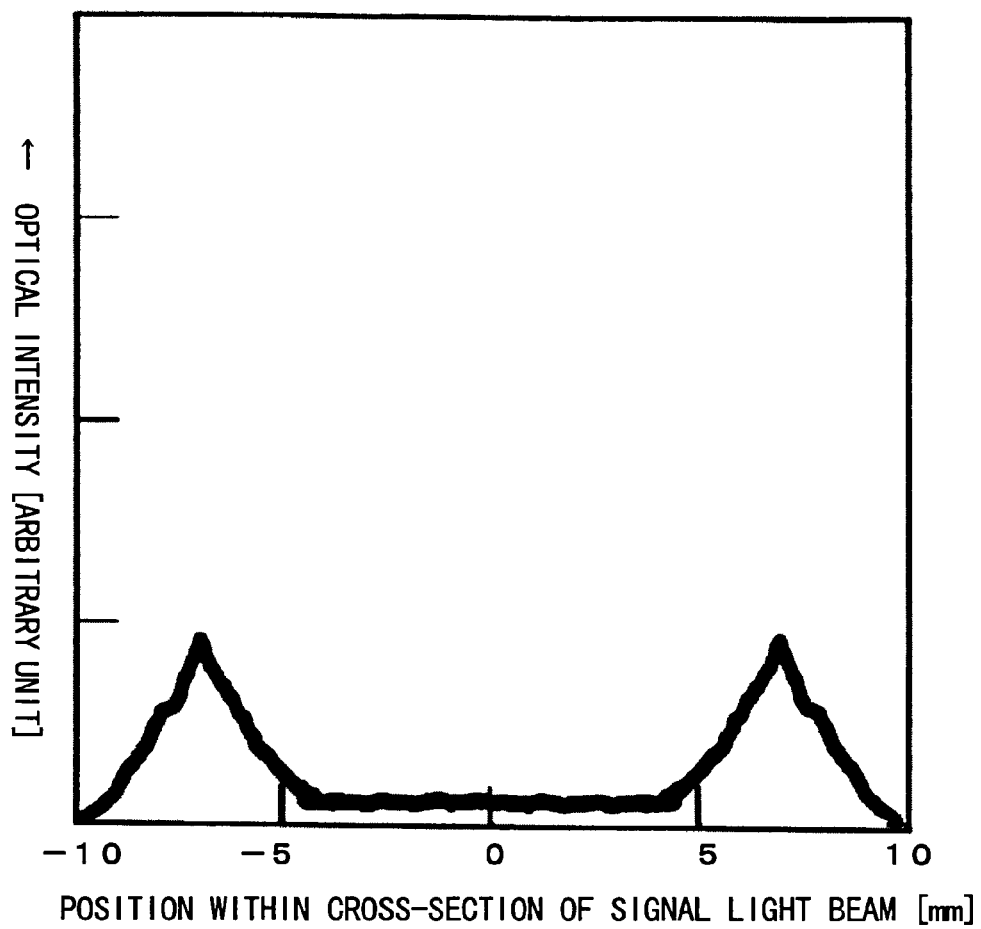
FIG. 21 shows an optical intensity distribution on a cross-sectional plane of a signal light beam.
Figure 22:
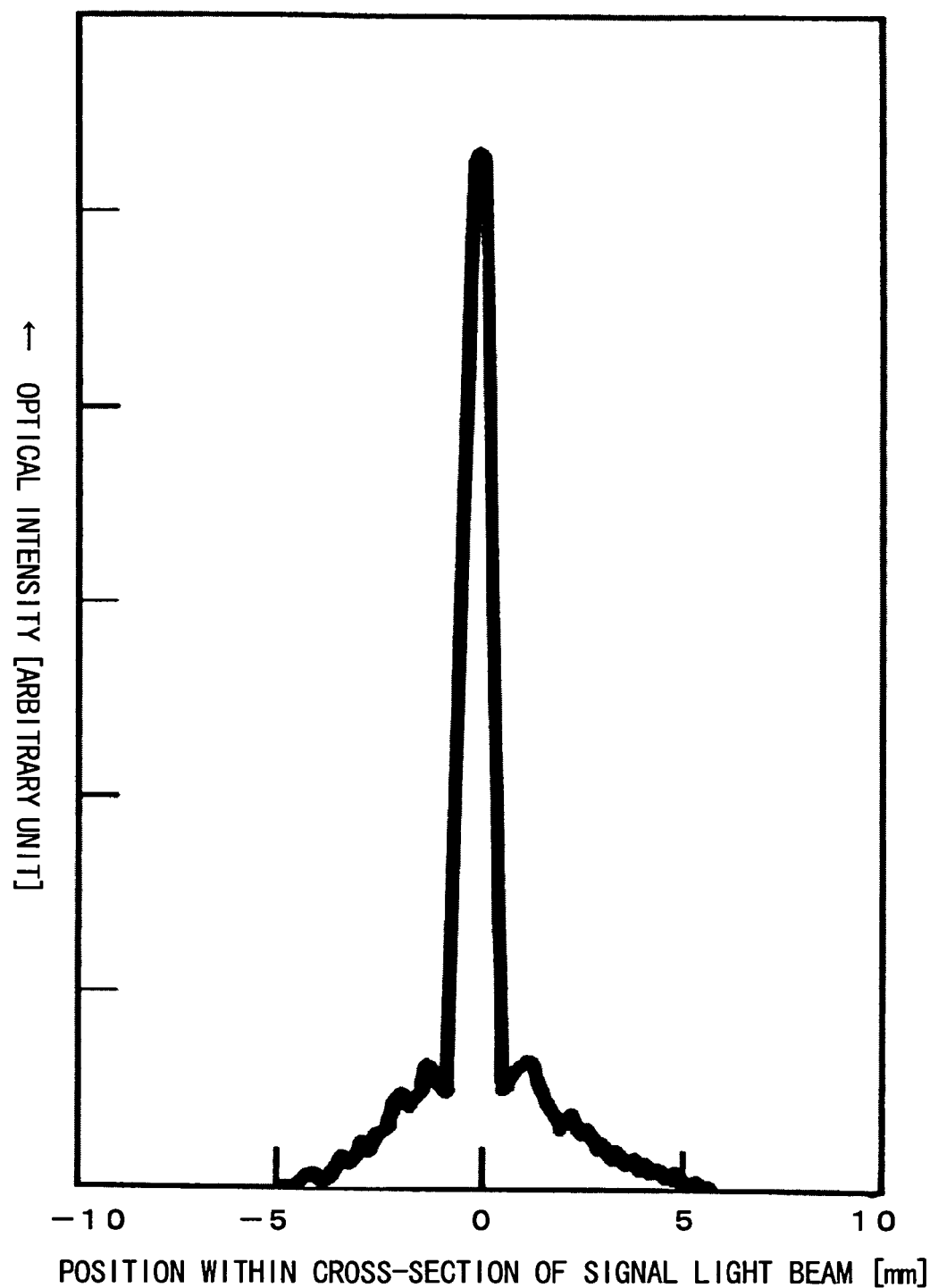
FIG. 22 shows an optical intensity distribution on a cross-sectional plane of a signal light beam.

Optical intensity distribution difference in the cross section of the signal light beam corresponding to the presence/absence of thermal lens effect, and differences in beam waist (concentrating point; focal point) position in the light absorbing layer film of the thermal lens forming device can be measured in any of the following manners. For example, in an experimental test, the apparatus whose schematic views are shown in FIGS. 4, 13*a* and 13*b*, or 14*a* and 14*b*, the numerical aperture was set to 0.55 for the light receiving lens 41 while the numerical aperture to 0.25 for the condenser lens 31, an optical intensity distribution measuring device 700 was provided instead of a mirror with a hole 61, as shown in FIG. 19, then all the signal light beams transmitted through the thermal lens forming device 1 were received by the light receiving lens 41 to cause the light beam enter into a light receiving unit 701 (effective diameter: 20 mm), then the optical intensity distribution at the cross section of the signal light beam was measured. The measured results are shown in FIGS. 20, 21 and 22. Here, as shown in FIG. 19, the optical intensity distribution measuring device is a device that is provided with a first slit 702 having a width of 1 mm to the light receiving unit 701 (having an effective diameter of 20 mm), moves a second slit 703 having a width of 25 µm at a constant velocity in a direction of the length of the first slit, i.e. from a point 710 toward a point 720 in FIG. 19 and measures the intensity of a light beam having passed through a rectangular window of a size of 1 mm×25 µm formed by the two slits, corresponding to the moved position of the window. In order to measure the optical intensity corresponding to the moved position of the window, for example, output of a detector receiving the light beam having passed through the window may be recorded on a storage oscilloscope synchronized with the moving velocity of the second slit 703. FIGS. 20 to 22 show the optical intensity distribution on a light beam cross sectional planes of the signal light beams recorded on a storage oscilloscope as described above, and the axis of abscissa (the position in the light beam cross sectional plane) corresponds to a position represented according to coordinates relative to the center of the light receiving unit 701 that is defined as zero and to the direction from the center to the point 710 that is defined as the negative direction and to the point 720 that is defined as the positive direction, and the axis of ordinate represents optical intensity.

Figure 13A:
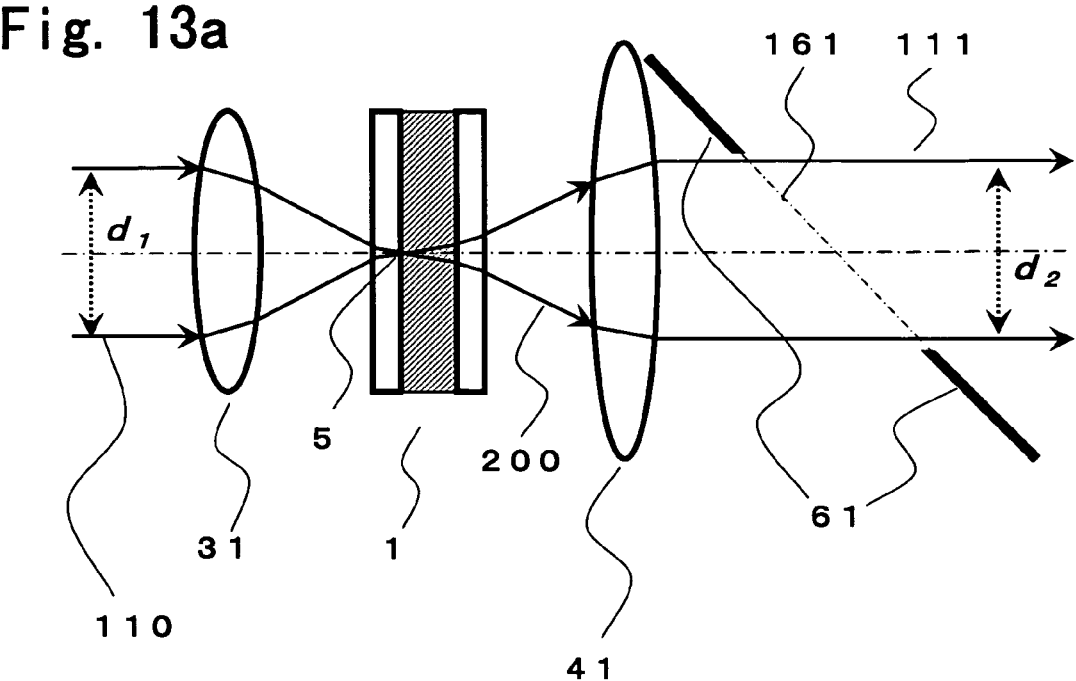
FIG. 13a is a schematic view illustrating the principle of the switching of optical paths when the position of the beam waist is adjusted such that the beam waist is positioned in the vicinity of the beam-entering side of a light absorbing layer film.

FIG. 20 corresponds to the case shown in FIG. 11*a* and FIG. 13*a* and shows an optical intensity distribution on the beam cross-section of the signal light beams when the control light beams do not enter the thermal lens forming device 1 but only the signal light beams enter the device 1. The optical intensity distribution in this case is a distribution wherein the intensity of the central portion is strong and the intensity becomes weaker as the position becomes closer to the circumference (generally, a Gaussian distribution). Therefore, when the hole-provided mirror 61 having a hole 161 of a sufficient size is disposed as shown in FIG. 13(*a*), all of the signal light beams 111 can pass through the hole 161 of the hole-provided mirror. Here, representing the beam diameter of the signal light beam entering the condenser lens 31 (having the focal distance of $f_1$) as parallel light beam as $d_1$ and the beam diameter of the signal light beam 111 converted into a parallel beam by the light receiving lens 41 (having the focal distance of $f_2$) as $d_2$, $$f_1:f_2=d_1:d_2 \qquad [8]$$

and, therefore, $d_2$ can be obtained by the following equation.

$$d_2=(f_2/f_1)\times d_1 \qquad [9]$$

The hole-provided mirror 61 is installed at an angle of 45 degrees against the optical axis of the signal light beams. The cross section of the signal light beam passing through the hole 161 is circular. Therefore, the shape of the hole 161 must be an ellipse whose minor axis $D_1$ and major axis $D_2$ must satisfy the relationship defined by the following equation [10].

$$D_2=D_1\times\sqrt{2} \qquad [10]$$

Here, although a minor axis $D_1$ of the elliptic hole 161 of the hole-provided mirror 61 larger than the beam diameter $d_2$ of the signal light beams 111 obtained from equation [9] may be sufficient, when $D_1$ is too large, a portion of the signal light beams expanded in an annular shape due to the irradiation of the control light beam will also passes through the hole 161. Thus, the optimal value of $D_1$ is a value 1.01 to 1.2 times and, more preferably, 1.02 to 1.1 times $d_2$.

FIG. 21 corresponds to the optical system arrangements shown in FIGS. 11*a*, 12*a*, 13*a* and 13*b*, and shows the optical intensity distribution on a beam cross-sectional plane of the signal light beam when the beam waist (condensing point: focal point) is set at the position 5 (on the entering side of the light beam) close to the condenser lens 31 of the thermal lens forming device 1 and the control light beam is irradiated. The resulting optical intensity distribution shows that optical intensity is weak in the central portion thereof and becomes stronger in an annular shape toward the circumference thereof. The optical intensity in the central portion on the cross-sectional plane of the signal light beam is reduced depending on the optical intensity of the control light beam and the positional relation between the thermal lens forming device 1 and the focal point, and approaches zero as the optical intensity of the control light beam is increased. The position at which the optical intensity of the signal light beam becomes maximal is a value (a diameter of approximately 15 mm) that is larger than the original beam diameter.

FIG. 22 corresponds to the optical system arrangements shown in FIGS. 11*b*, 12*b*, 14*a* and 14*b*, and shows the optical intensity distribution on a beam cross-sectional plane of the signal light beam when the beam waist (condensing point: focal point) is set at the position 6 (on the exiting side of the light beam) close to the light receiving lens 41 of the thermal lens forming device 1 and the control light beam is irradiated. In this case optical intensity at the central portion is stronger than the optical intensity at the center portion (FIG. 21). The optical intensity in the central portion of the beam cross-sectional plane of the signal light beam depends on the optical intensity of the control light beam and positional relation between the thermal lens forming device 1 and the focal point 6, but reaches to several times as much as the intensity measured when the control light beam is not irradiated.

Therefore, if a hole-provided mirror 61 is disposed in this case, the majority of the signal light beam passes through the hole 161 of the hole-provided mirror. Here, when the size of the hole 161 of the hole-provided mirror 61 (and 62 and 63) is optimized, the portion of the signal light beam that is reflected by the hole-provided mirror 61 can be substantially reduced to zero. However, even when the size of the hole 161 of the hole-provided mirror 61 is optimized, when the control light beams are not irradiated, the central portion of the signal light beam as shown in FIG. 14*a* is not prevented from passing through the hole 161 as a leaked signal light beam 118, and occurrence of cross-talk cannot be prevented.

Figure 6:
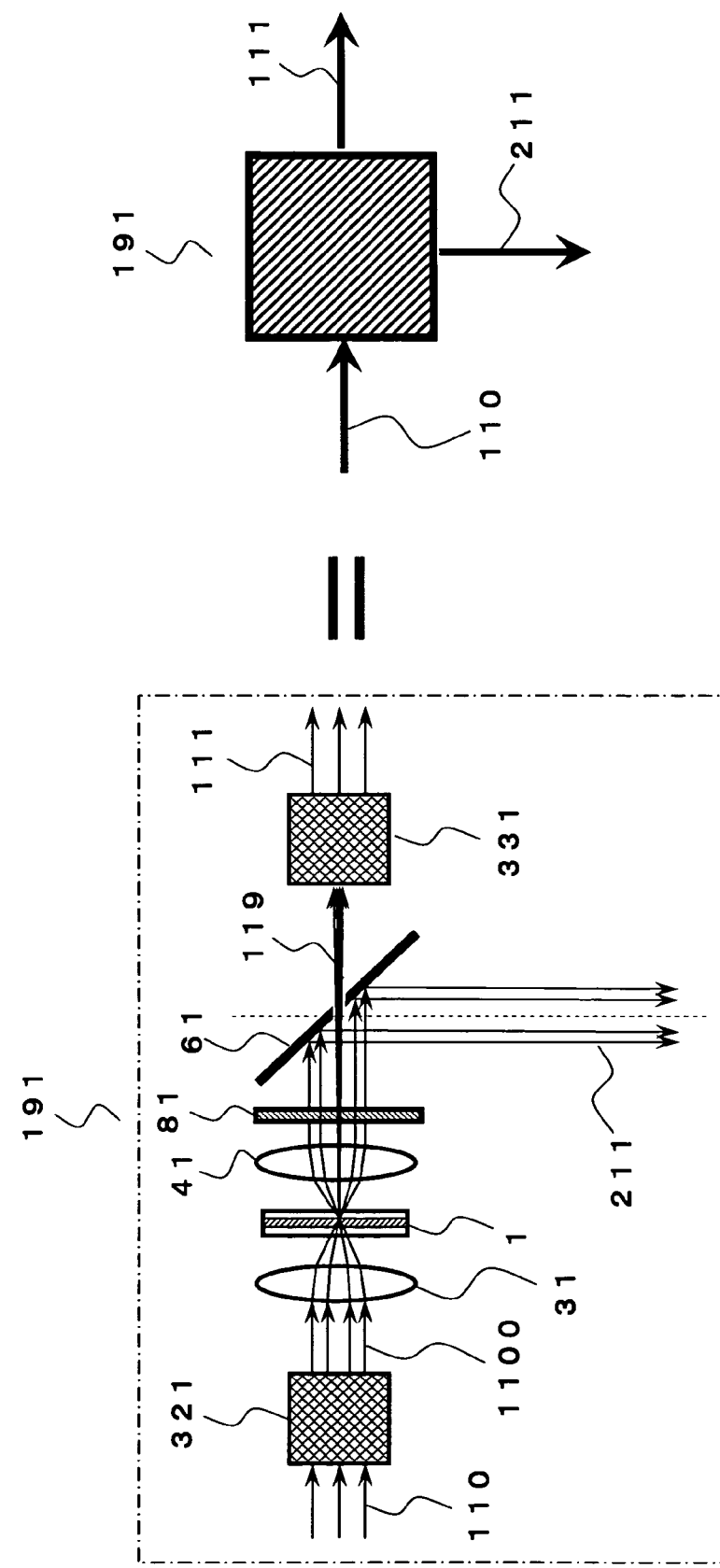
FIG. 6 is a simplified schematic representation of the configuration of an optical path switching mechanism of a space-coupling type.

However, such a leaked signal light beam can be reduced to near zero by changing the optical intensity distribution on the on the cross-sectional plane of the signal light beam that enters into the thermal lens forming device. That is, as shown in FIG. 6, it is easy that, after the signal light beam 110 exited from the optical path 1110 is shaped using the collimating lens 30, to vary the optical intensity distribution on the cross-sectional plane of the signal light beam to an annular distribution corresponding to FIG. 18(*a*) and FIG. 21, using a beam-cross-section shaping-into-ring lens group 321 comprising a circular-cone-prism-type lens, etc. After the signal light beam 110 having such an optical intensity distribution on the cross-sectional plane thereof has been converged using condenser lens 31 such that the signal light beam 110 passes through the focal point position 6 (FIG. 14*a*) and the signal light beam 110 has passed through the thermal lens forming device 1, the signal light beam 110 is restored to a parallel light beam by the light receiving lens 41. Then, the optical intensity distribution of the beam cross-sectional plane of the signal light beam 110 is an annular shape having a stronger intensity on the periphery thereof, and intensity near zero in the central portion as corresponding to FIG. 21. Therefore, when the hole-provided mirror 61 is disposed, the leak of the signal light beam passing through the hole 161 can be substantially eliminated. Even when the optical intensity distribution on the beam cross-sectional plane of the signal light beam assumes such an annular shape, when the thermal lens 60 is transiently formed by irradiating the control light beam as shown in FIG. 14*b*, the optical intensity distribution on the beam cross-sectional plane of the signal light beam becomes a sharp-beam shape and the signal light beam passes through the hole 161 of the hole-provided mirror 61 as a converged straight-traveling signal light beam 119.

Figure 13B:
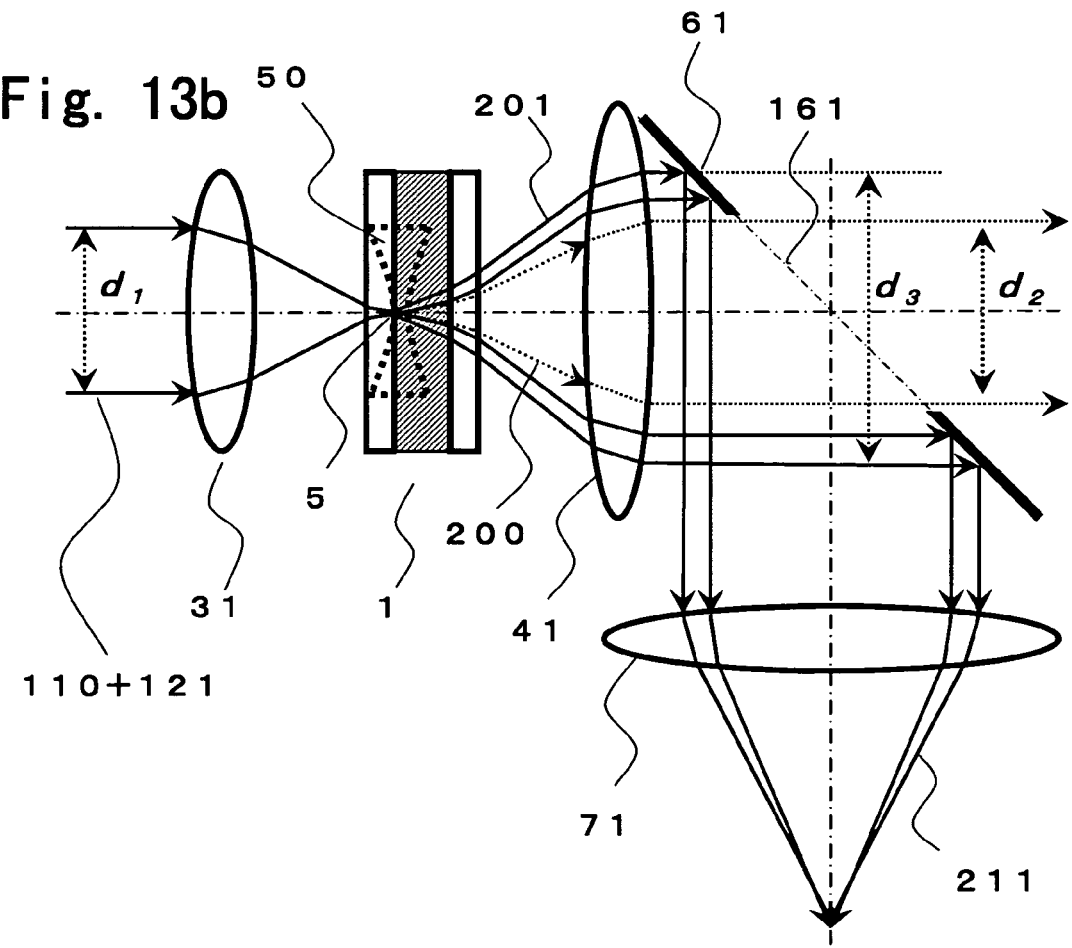
FIG. 13b is a schematic view illustrating the principle of the switching of optical paths when the position of the beam waist is adjusted such that the beam waist is positioned in the vicinity of the beam-entering side of a light absorbing layer film.

To summarize, in an optical system configuration in FIGS. 13*a* and 13*b*, in response to the presence/absence of control light beam irradiation, the optical intensity distribution on the beam cross-sectional plane of the signal light beam can be switched between the annular distribution (when the control light beam is irradiated) shown in FIG. 21 and the Gaussian distribution (when the control light beam is not irradiated) shown in FIG. 20, then switching of optical paths becomes possible by taking out the light beam individually using a hole-provided mirror suitable for the shape of the optical intensity distribution on the beam cross-sectional plane of the signal light beam.

Figure 14A:
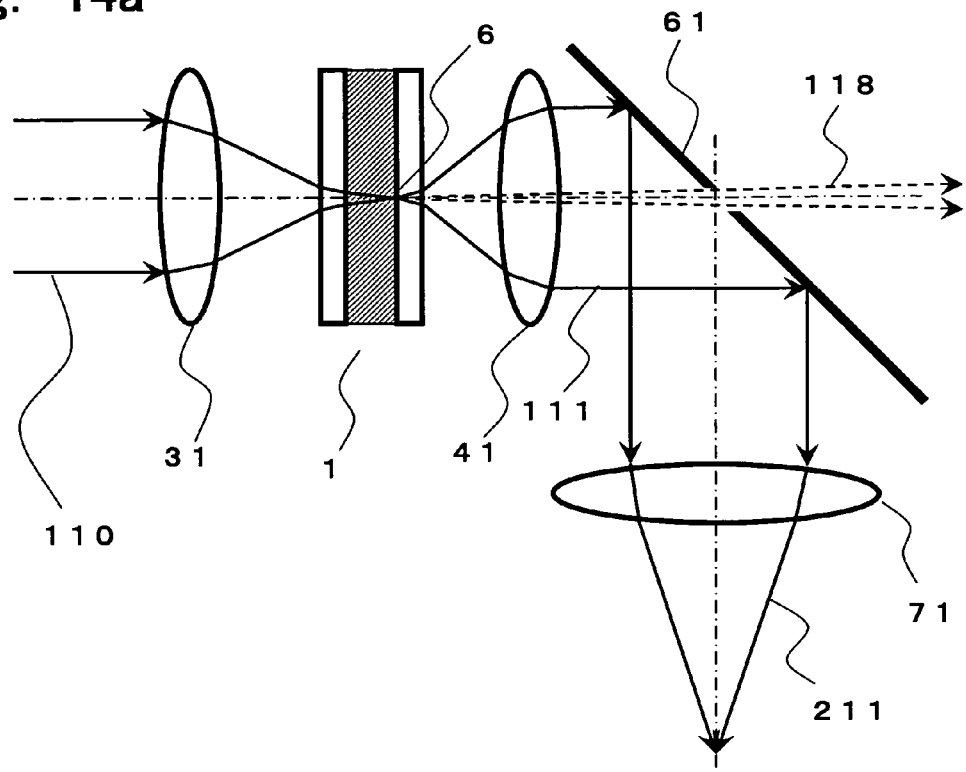
FIG. 14a is a schematic view illustrating the principle of the switching of optical paths when the position of the beam waist is adjusted such that the beam waist is positioned in the vicinity of the beam-exiting side of a light absorbing layer film.
Figure 14B:
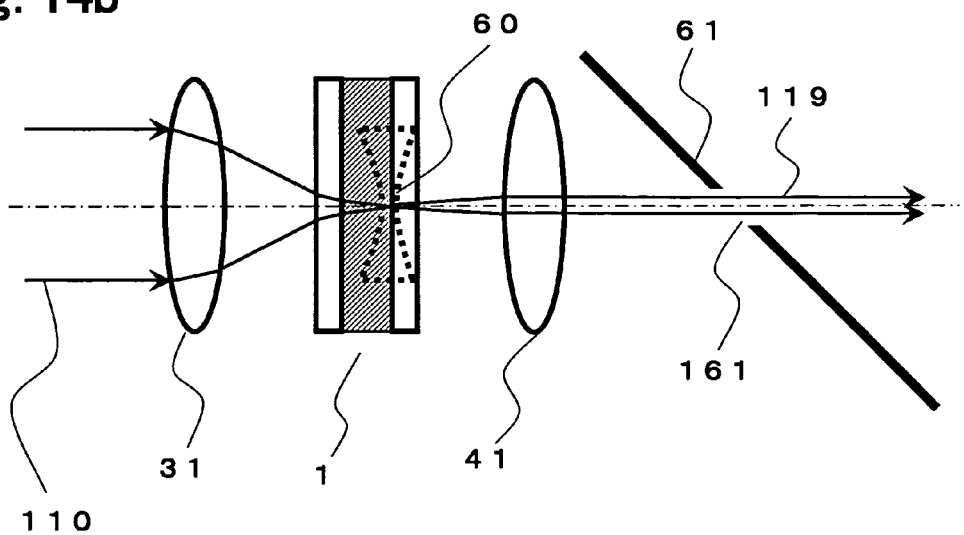
FIG. 14b is a schematic view illustrating the principle of the switching of optical paths when the position of the beam waist is adjusted such that the beam waist is positioned in the vicinity of the beam-exiting side of a light absorbing layer film.

On the other hand, in an optical configuration in FIGS. 14*a* and 14*b*, by adjusting the focal points of the control light beam and the signal light beam to be positioned at the position 6 close to the exiting side of the thermal lens forming device and, furthermore, by shaping the optical intensity distribution on the beam cross-sectional plane of the signal light beam into annular, the optical path of the signal light beam can be switched by 90 degrees from the original traveling direction thereof and the signal light beam can be caused to exit, when the control light beam is not irradiated, and the signal light beam can be caused to travel straight when the control light beam is irradiated.

[Method of Combining a Plurality of Optical Path Switching Mechanisms]

When more than one optical path switching mechanism (91, etc.) comprising a thermal lens entering light beam condenser lens (31, etc.), a thermal lens forming device (1, etc.), a thermal lens exiting light beam receiving lens (41, etc.), a wavelength selecting and transmitting filter (81, etc.), and a hole-provided mirror (61, etc.) is used by coupling with the space coupling method, three combinations of an operating mode where an exiting signal light beam exits at an angle larger than ordinary divergence angle, and an operating mode where an exiting signal light beam exits while being converged can be use. These are the following:

(1) Combination of only the operating modes where an exiting signal light beam exits at an angle larger than ordinary divergence angle;
(2) Combination of only the operating modes where an exiting signal light beam exits while being converged; or
(3) Combination of the operating mode where an exiting signal light beam exits at an angle larger than ordinary divergence angle comes before the operating mode where an exiting signal light beam exits while being converged.

In regards to the third combination listed above, if an operating mode is enabled wherein the optical path switching mechanism at the first stage simultaneously irradiate the control light beam and the signal light beam so that the beam waist (focal point) is positioned at position 5 that is close to the entering surface of the light absorbing layer film of the thermal lens forming device 1, as shown in FIG. 11*a*, then combining two optical path switching mechanisms efficiently without using the beam-cross-section shaping-into-ring lens group 321, by employing the operating mode where the exiting signal light beam spreads through thermal lens effect to exit with a divergence angle larger than that of ordinary exiting light beam, then the signal light beam with annular cross-section is reflected by the hole-provided mirror to switch the path, and the optical path switching mechanism at the second stage simultaneously irradiate the control light beam and the signal light beam so that the beam waist (focal point) is positioned at position 6 that is close to the exiting surface of the light absorbing layer film of the thermal lens forming device 1, as shown in FIG. 11*b*, and the exiting signal light being converged by the thermal lens effect exits with a small cross section. The details of this combination will be described in Example 4, below.

[Hole-provided Mirror]

A hole-provided mirror 61 is, for example, disposed at an angle of 45 degrees to the optical axis of a signal light beam. As the mirror surface of the hole-provided mirror 61, a surface that is a dielectric multi-layer film produced on a glass surface by a sputtering method and is adjusted such that the reflectivity thereof becomes maximal when the wavelength of the signal light beam is used. The hole 161 portion of the hole-provided mirror 61 is produced by making an elliptic hole through a glass plate inclined at an angle of 45 degrees. Although instead of making a hole, the elliptic reflecting film maybe eliminated, a hole is preferable because the glass surface reflects several percent of the incident light, causing attenuation and cross-talk of the signal light beam. In order to prevent stray light caused by optical dispersion or the like, it is preferable that the inner surface of the hole is processed to provide no reflection. Furthermore, the reflecting film is not limited to a dielectric multi-layer film, but may be any material that reflects the control light beams and the signal light beams used therefore and, thus may be gold, silver, etc.

[Time-Division "Point-to-Multipoint" Two-way Optical Communication]

In an optically controlled optical-path-switching-type data distribution apparatus and distribution method of the present invention, optical communication paths of a data server device side and a particular client device side becomes open in both directions only while an optical switch is operating, due to the operation principle of the optical switch that is used. Therefore, in order to allow a particular client to transmit a data transmission request at a desired time via the optical communication path, the data server device must repeatedly transmit at least a control light beam optical destination tag for a predetermined period continuously to individual client devices in turn. Otherwise, optical communication using another optical communication path, or electric communication using a conventional local area network must be carried out from the client devices to the data server device.

Opening optical signal paths between a plurality of clients and a single data server at a certain interval in turn is the time-division type "multipoint-to-point" two-way optical communication.

The time divided interval, optical packet data size, optical switch ON/OFF response rate, and the number of clients relate to each other. For example, when the ON/OFF response rate of an optical switch is sufficiently high, the data volume of an optical packet will not become insufficient, even when the number of clients increases, however, the number of client devices to which sufficient data volume can be provided will be limited if a longer time is required for ON/OFF response of the optical switch.

As described in the Examples, the optical switch used in the present invention is capable of carrying out ON/OFF operation sufficiently in 1 (one) millisecond, thus, the optical switch can provide optical signal paths, for example, to 8 clients, by assigning 124 millisecond for each of the clients by dividing one second into eight (8) time units. Therefore, if the modulation speed of an optical signal transmitting unit 1120 at the data server side is 10 Gbps, the data volume of an optical packet including an optical sequence tag can be set to 1.24 Gbps (155 MB). This is equivalent to a case wherein the data communication volume of 100 or more high-definition still color images, each having 2272×1704 pixels with 32 bits of color information per pixel, can be transmitted in one second to each of 8 clients. That is, for example, a 3D image of a human body represented by laminating 1000 monochrome high-definition images can be distributed to 8 locations in one second and uncompressed digital high-vision color moving images can be distributed to 8 locations in one second. When the modulation velocity of an optical signal transmitting unit is increased from 10 Gbps to 40 Gbps, four times the data volume can be distributed.

The upper limit of the number of clients is determined by the attenuation of a signal light beam that is caused by multi-staged use of an optical switch, however, the switch can normally be used for 2 to 8 clients without difficulty, and, depending on the transmission loss of the optical fiber that is used, the switch can in most cases be used for 16 to 32 client devices. When using 32 client devices, the effective time width of an optical packet is 30.25 millisecond(=(1000/32)−1), however, a data volume of 1.21 GB can be secured for an optical packet by increasing the modulation velocity of the optical signal transmitting unit 1120 to 40 Gbps.

The switch is a time-division type multipoint-to-point two-way optical communication switch, and the data transfer rate $D_s$ of an electric signal path 1400 from the data server device 1000 to the optical signal transmitting unit 1120 satisfying the relation expressed by equation [11] is sufficient; where $D_c$ represents the data transfer rate of an electric signal path 1401 or the like at the client device side and $N_c$ represents the number of client devices:

$$D_s \leq D_c \times N_c \quad [11]$$

When $D_s$ is 10 Gbps, the number of client devices is 4, and the information contained in optical packets received by the optical signal receiving unit 1131, etc. at the client device side is converted to electrical signals, stored temporarily, and transmitted as electric signals, a data transfer rate $D_c$ of an electric signal path 1401, etc. at the client device side of 2.5 Gbps or higher is sufficient. However, the optical signal receiving rate of the optical signal receiving units 1131, 1132, 1133, etc. at the client device side needs to be $D_s$ or higher. That is, in the optically controlled optical-path-switching-type data distribution apparatus of the present invention, the data transfer rate of an electric signal path on the client side can be reduced to ½ or smaller than the data transfer rate on the data server device side when two or more client devices are connected, thus the cost for an apparatus can be reduced, as compared with a case wherein all of the client devices are connected via components with high data transfer rates.

EXAMPLES

The embodiments according to the present invention will be described in details with reference to experimental Examples.

Example 1

A schematic view of the configuration of an optical component elements used in an optically controlled optical-path-switching-type data distribution apparatus of Example 1 is shown in FIG. 4a. In addition to optical component elements shown in FIG. 4a, the optically controlled optical-path-switching-type data distribution apparatus of Example 1 comprises a data server device, an electric circuit in the data communication unit and a power supply thereof, a client device, an electric signal path connecting the data server device and data communication unit, an electric signal path connecting the data communication unit and the client unit, and a power supply.

FIG. 4a illustrates a schematic view of a partial configuration of an optically controlled optical-path-switching-type data distribution apparatus, showing a portion of an optical signal transmitting unit 1120, details of an optical switch 1101, and optical signal paths 1110, 1111, 1112 and 1113.

As the data server device, a single commercially marketed ordinary computer unit having a central processor unit with a clock frequency of 3 GHz for controlling an input/output control unit 1040, a semiconductor memory device with a capacity of 2 GB that operates as a transmission data storage unit 1010, and a hard disk storage device with a capacity of 800 GB, was used.

As the client devices, four commercially available ordinary computer units, each having a central processor unit with a clock frequency of 2.8 GHz for controlling an input/output control unit 1241, a semiconductor memory device with a capacity of 1 GB that operates as a received data storage unit 1211, and a hard disk storage device with a capacity of 250 GB, were used.

The electric circuit and the power supply of the data communication unit at the data server device side includes a data transmission/receipt control unit 1140, the control electronic circuit for an optical signal transmitting unit 1120, the light receiving device such as an optical signal receiving unit 1130 and 1131, etc. and a control electronic circuit, and a power supply therefore. As the electronic circuits for these components at the data server device side, the transmitting unit and receiving unit of a commercially available optical transceiver device with a data communication speed of 10 Gbps that uses infrared laser was used. The power supply was a constant voltage power supply which provided sufficient voltage and current.

The electric circuit and the power supply of the data communication unit at the client device side includes a data transmission/receipt control unit 1141, 1142, 1143, or the like, a control electronic circuit for an optical signal transmitting unit 1121, a light receiving device such as an optical signal receiving unit 1131, 1132, 1133, or the like and a control electronic circuit therefore, and a power supply therefore. As the electronic circuits for these components at the client device side, the transmitting unit and the receiving unit of a commercially marketed optical transceiver device with a data communication speed of 10 Gbps that uses infrared laser was used, so that optical packet information was converted to electric signals, temporarily stored, then transmitted as electric signals. The power supply was a constant voltage power supply that provided sufficient voltage and current capacity.

As the control electronic circuit for a control light beam light source, a constant voltage power supply and the transmission unit of an optical transceiver device that are suitable for the laser diode to be used are combined and used.

As an electric signal path 1400 that connects the data server device and the data communication unit, one having a data transfer rate of 10 Gbps and complying with the applicable Telecommunication Standards was used in combination with the electric signal input/output unit of the optical transceiver having a data transfer rate of 10 Gbps. On the other hand, as a single optical signal path at the data server side is shared by four client devices by splitting the path into four time units, the electric signal paths 1401, 1402, 1403, etc. are not required to secure the data transfer rate of 10 Gbps at the data server device side, and in this case, 10/4, or 2.5 Gbps is sufficient. As such, the electric signal path complying with the applicable Telecommunication Standards for the transfer rate of 3 Gbps was used in combination with the electric signal input/output unit of the optical transceiver having a data transfer rate of 10 Gbps.

The optical component elements configuring the optical signal transmission unit 1120 include a single signal light beam light source 20; three control light beam light sources 21, 22, and 23, each of a different wavelength; dichroic mirrors 51, 52, and 53 for aligning the optical axes of all of the control light beams 121, 122, and 123 to propagate in the same direction; and a condenser lens 10 for combining the signal light beam 120 and the three control light beams 121, 122, and 123 to direct the combined beams into the optical fiber 1110.

As the optical signal path 1110 to combine and transport all the signal light beam 120 and the three control light beams 121, 122, and 123, a single mode quartz glass optical fiber having a length of 10 m was used.

The optical switch of Example 1 exemplifies a case wherein the optical switch comprises a collimating lens 30 to substantially restore the signal light beam 120 exiting from the optical fiber 1110 and the control light beams 121, 122, and 123 to parallel, and optical path switching mechanisms 91, 92, and 93 that include condenser lenses (31, 32, 33) for light entering the thermal lens, thermal lens forming devices (1, 2, 3), the light receiving lenses for light exiting the thermal lens, wavelength selecting and transmitting filters (81, 82, 83) and hole-provided mirror (61, 62, 63), which are serially connected in three stages. The straight traveling signal light beams 111 and 112 exiting from the optical path switching mechanisms 91 and 92 are specially coupled, and enter into the thermal lens entering light beam condenser lenses 32 and 33 of the optical path switching mechanisms 92 and 93, respectively, at the latter stages, the straight traveling signal light beam 113 exiting from the optical path switching mechanism 93 is condensed by the condenser lens 401 for the straight traveling signal light beam, and enters into the optical signal path 1114 as the straight traveling exited signal light beam. Signal light beams 211, 212, 213 switched and output from the optical path switching mechanism 91, 92 and 83 are respectively condensed by optical path switched exiting signal light beam condenser lenses 71, 72 and 73, then enter into optical signal paths 1111, 1112 and 1113 as the exiting signal light beams with optical path switched.

As the optical signal paths 1111, 1112, 1113, and 1114 at the exiting side, a normal single mode quartz glass optical fiber (having a length of 100 m) was used. Instead of a single mode quartz glass optical fiber, multimode quartz glass optical fiber, SI type plastic optical fiber, or GI type plastic optical fiber may be selected and used in accordance with the transmittance/transmission loss property of the control light beams and signal light beams.

The number of optical path switching mechanisms to be connected corresponds to the number of light sources for signal light beams having wavelengths different from each other. However, the number of stages that can be coupled is calculated based on the transmittance of the signal light per one stage of optical path switching mechanism, initial intensity of the signal light beam that enters into the optically controlled optical-oath-switch-type data distribution apparatus, and the signal light beam intensity required at the end. For example, if the transmittance of a single optical path switching mechanism is 85% (attenuation of 0.7 dB for signal strength), the total transmittance will be 52.2% (attenuation of 2.8 dB for signal strength) when four optical path switching mechanisms are connected in series.

A three-stage serial configuration as shown in FIG. 4*a* will next described in detail, as an example. Partial views of the condenser lens 31 and thermal lens forming device 1 shown in FIG. 4*a* are extracted as FIGS. 11*a*, 11*b*, 12*a* and 12*b*, and partial views added further with a light receiving lens 41 and a hole-provided mirror 61, etc. are shown in FIGS. 13*a*, 13*b*, 14*a* and 14*b*. To avoid complicated drawings of an apparatus having three or more optical path switching mechanisms, when optical path switching mechanisms, 91, 92 and 93 are spatially-connected type, a portion of the schematic view of the configuration (the left view in FIG. 5) of an optical path switching mechanism of a spatially-connected type is symbolized and represented as shown in FIG. 5. That is, for example, the optically controlled optical-path-switching-type data distribution apparatus shown in FIG. 4*a* is represented by a schematic configuration view as shown in FIG. 4*b* where some portion thereof are symbolized. As FIGS. 4*a* and 4*b* are the schematic configuration views having identical contents except that the way of representation is different, hereinafter, these views are simply referred to as "FIG. 4" when FIG. 4*a* and FIG. 4*b* need not be distinguished.

Furthermore, two or more optical path switching mechanisms can be connected as an optical-fiber-connected type. However, in this case, the mechanisms are represented as in FIG. 9 by omitting the schematic view of the configuration of the optical path switching mechanisms of the optical-fiber-connected type.

Although the thermal lens forming device 1 is depicted in FIGS. 4*a*, 5, 6, 9 and FIGS. 11*a* to 14*b* as a device having a three (3)-layer configuration of the heat-conducting layer film 501, the light absorbing layer film and thermal lens forming layer 502, and the heat-conducting layer film 503, the configuration of the thermal lens forming device is not limited to this configuration.

In Example 1, as the thermal lens forming devices 1, 2 and 3, the pigment-solution-filling-type thermal lens forming devices 800 (FIG. 15) filled respectively with solutions of each of the above-described pigments [1], [2] and [3] were used. As the solvent for the pigments, o-dichlorobenzene thoroughly dehydrated and degassed was used. Optical cells 809 having the same shape were used for the thermal lens forming devices 1, 2 and 3, and the thickness of the pigment solution filling unit 808 thereof, i.e., the spacing between the entering and exiting surface glass plates 801 and 802 was, for example, 200 µm. AR coating was applied on the outer surface of the entering surface glass plate 801 and the exiting surface glass plate 802 of the optical cell 809. In addition, the introducing inlet 807 of the optical cell 809 was melted and sealed after a filling and degassing processes for the pigment solution were carried out. The concentration of the pigment solutions was adjusted between 0.2 to 2 weight percent and was adjusted for each of the pigments [1], [2], and [3] such that the transmittance for 532 nm, 670 nm, and 800 nm was respectively 0.0 to 0.2%, while the transmittance for the signal light beam having a wavelength of 850 nm was 85 to 99%.

In the configuration employed in Example 1, an entering signal light beam 110 from the optical signal path 1110 is focused by the collimating lens 30 to form an approximately parallel light beam having a beam radius of 5.0 mm.

Although in Example 1, an optical transceiver transmission unit utilizing a vertical cavity surface emission type semiconductor laser having an oscillation wavelength of 850 nm enabling data transmission at 10 Gbps was used as a light source 20 of the signal light beam 120, semiconductor laser beams having oscillation wavelengths of 1350 nm and 1550 nm with a super high speed modulation capability may be used. Further, signal light beams having a plurality of wavelengths may be used simultaneously. When a signal light beam light source providing a plurality of wavelengths is employed, one optical packet contains signal light beams with a plurality of wavelengths that have been overlapped, and the signal light beams are collected according to wavelength by an optical signal receiving unit. In Example 1, the secondary high harmonic wave of a semiconductor excited Nd:YAG laser oscillation wavelength of 532 nm, and a semiconductor laser providing 670 nm and 800 nm were used for control signal light beam light sources 21, 22, and 23 that irradiate control light beams 121, 122, and 123 to form respective thermal lenses in the thermal lens forming device 1, 2, and 3, then to switch signal light beam optical paths by turning ON/OFF of the control light beams. Each of the control light beams 121, 122 and 123 were formed so that they provided a parallel light beam with a beam radius of 4.5 mm. The laser power of a control light beam light source positioned before either the condenser lens 31, 32, or 33 was set to 2 or 10 mW.

The control light beams 121, 122, and 123 and the signal light beams 110, 111, and 112 were converged by the common condenser lenses 31, 32, and 33, respectively, and were irradiated on the thermal lens forming devices 1, 2 and 3. In order to overlap the beam waist of each of the control light beams and the signal light beams in the thermal lens forming devices, the signal light beams and the control light beams were adjusted using the dichroic mirrors 51, 52 and 53 such that the signal light beams and the control light beams were on the same optical axis and parallel to each other, before the beams entered the optical signal path 1110. In this manner, the thermal lens effect created by the light absorption at the position of the beam waist of the control light beams can be utilized efficiently for deflecting the traveling direction of the signal light beams.

In the configuration employed in Example 1, the positional relations between condenser lens 31, 32, and 33, and respective thermal lens forming devices 1, 2, and 3 are adjusted so that the beam waist of signal light beams and control light beams is located in the vicinity of the entering surface in the light absorbing layer film of the thermal lens forming devices 1, 2 and 3, and set so that the signal light beams having converged and entered into the thermal lens forming devices 1, 2 and 3, exit as signal light beams 111, 112 and 113 at ordinary divergence angle when no control light beam is irradiated, while the signal light beams exit at a divergence angle larger than the ordinary divergence angle by forming an annular cross-section due to the thermal lens effect when a control light beam is irradiated. Here, after passing through the thermal lens forming devices 1, 2, and 3, the signal light beams are collimated into generally parallel light beams by the light receiving lenses 41, 42 and 43. The numerical aperture (hereinafter, referred to as "NA") of these light receiving lenses is set to be larger than the NA of the condenser lenses. In the configuration used in Example 1, the NA of the condenser lenses was 0.25 and the NA of the light receiving lenses was 0.55. The NA of the light receiving lenses is preferably greater than or equal to twice the NA of the condenser lenses. The condenser lenses and the collimating lens are not limited to lenses having these specific NA values, and any combination of lenses satisfying the relationship may be employed. By setting the NA of the light receiving lenses to be at least twice the NA of the condenser lenses, the light beams can be received without any loss, even when the beam diameter of the signal light beams is expanded by a factor of two or more at the time when the signal light beams enter the thermal lens forming device. In Example 1, the focal distances of the condenser lenses and the light receiving lenses were set to be same and condenser lenses with an effective diameter of approximately 10 mm were used.

The signal light beams collimated by the light receiving lenses 41, 42, and 43 are made to enter the hole-provided mirrors 61, 62, and 63. As described above, the paths of the signal light beams can be switched by providing these hole-provided mirrors.

In the configuration used in Example 1, the focal distance $f_1$ of the condenser lens 31 and the focal distance of $f_2$ of the light receiving lens 41 are the same. Therefore, the beam diameter $d_1$ of the signal light beam 110 that enters into the condenser lens 31 and the diameter $d_2$ of the signal light beam 111 that has been converted into a parallel light beam by the light receiving lens are the same, 10 mm in the constructed example, as noted above. The minor axis $D_1$ of the ellipse hole 161 of the hole-provided mirror 61 is preferably 10.1 mm to 12 mm, and more preferably 10.2 mm to 11 mm, and in Example 1, the minor axis $D_1$ is set to 10.5 mm. $D_2$ is determined to be 14.8 mm using equation [7]. A mirror having a size (50 mm×50 mm) sufficient to reflect a beam having a diameter of 30 mm by 45 degrees may be used.

As shown in FIG. 4, the switching of the optical paths causes the signal light beams (switching signal light beams) 211, 212, and 213 taken out by deflecting the direction by 90 degrees from the original traveling direction of the signal light beams to enter the optical fibers in optical paths 1111, 1112, and 1113, by condensing the signal light beams through the condenser lenses 71, 72 and 73.

When all of the light sources 21, 22, and 23 of the control light beams are turned off, the signal light beams are not subject to the thermal lens effect and exit as the signal light beams 111, 112, and 113. The condenser lens 401 condenses the exiting signal light beam 113 and directs it to enter the optical fiber of the optical signal path 1114.

In the configuration employed in Example 1, respective wavelength selecting and transmitting filters 81, 82, and 83 are provided behind the thermal lens forming devices 1, 2 and 3. The wavelength selecting and transmitting filters 81, 82, and 83 absorb 100% of the light of control light beams having a wavelength of 532 nm, 670 nm, and 800 nm, respectively, and the control light beam having a longer wavelength used at the later stage and signal light beams having a wavelength of 850 nm by 99.5% or more.

An optically controlled optical-path-switching-type data distribution apparatus such as that employed in Example 1 can be configured by connecting, in series, in three stages, optical path switching mechanisms comprising a condenser lens, thermal lens forming device, a light receiving lens, and a hole-provided mirror. Therefore, when all of the control light beams are turned off, the signal light beam travels straight and enters the optical fiber of the optical signal path 1114. When the control light beam 21 is turned on, by switching the optical path, the signal light beam 211 exits to the optical fiber in the optical signal path 1111. When the control light beam 22 is turned on and the control beam 21 is turned off, the signal light beam 212, by switching the optical path, exits to the optical fiber in the optical signal path 1112, while the signal light beam 213, by switching the optical path, exits the optical fiber in the optical signal path 1113 when the control light beams 21 and 22 are turned off and the control beam 23 is turned on. An example in which plurality of control light beams are turned on simultaneously will also be described below.

The signal light beams entering the optical fibers in the optical signal paths 1111, 1112, 1113, and 1114 are received by the optical signal receiving units at the receiving side, converted to electric signals, and distributed to the client devices 1201, 1202, 1203, and 1204, respectively.

In the optically controlled optical-path-switching-type data distribution apparatus of Example 1, in order to measure the optical response speed of the optical path switching mechanism in the first stage, a continuous light beam was used as the signal light beam while a square-wave intermittent light beam at a frequency of several Hz to 100 kHz and a duty ratio of 1:1 was irradiated as the control light beam 121, and magnitudes of the intensity amplitudes of the signal light beam for which the optical paths had been switched were compared.

Figure 23:
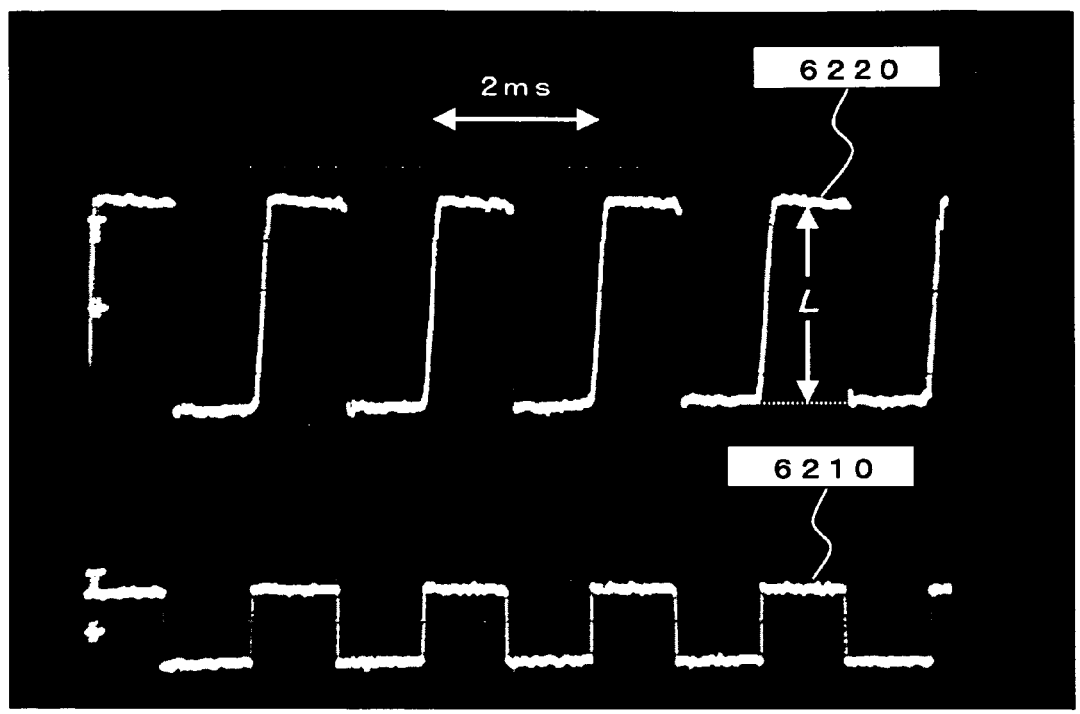
FIG. 23 shows the waveforms of a control light beam and a signal light beam observed on an oscilloscope.
Figure 24:
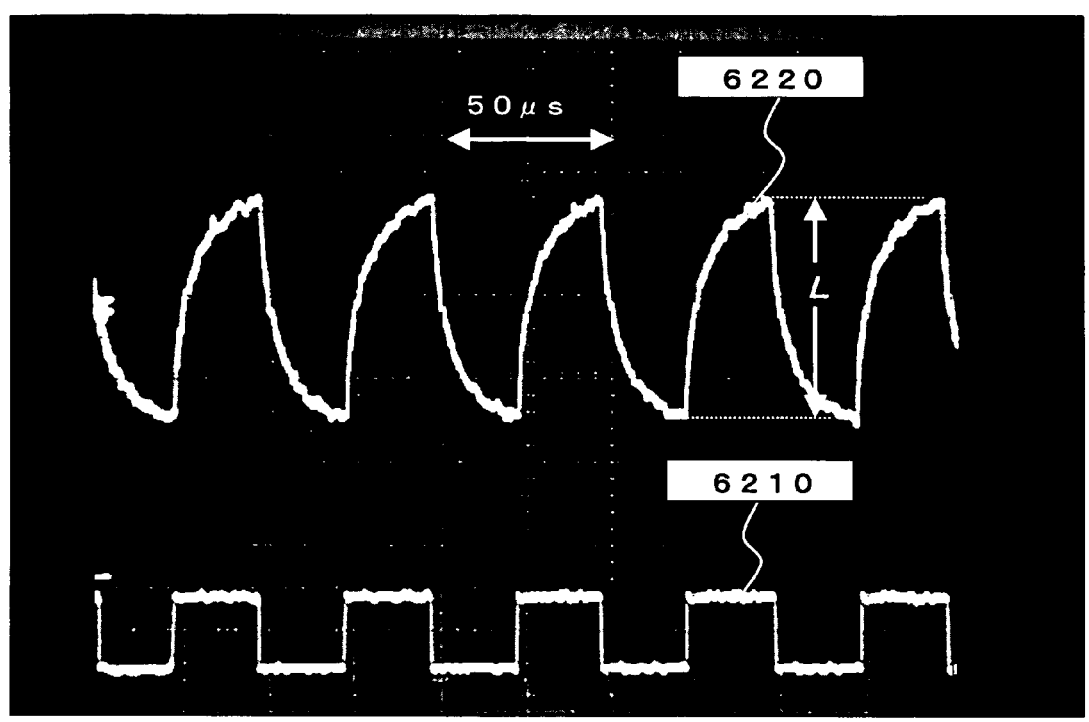
FIG. 24 shows waveforms of a control light beam and a signal light beam observed on an oscilloscope.

The waveform 6210 of the control light beam 121 measured by an oscilloscope by directing the control light beam from the control light beam light source 21 shown in FIG. 4 to an optical detector, and the waveform 6220 of the signal light beam 211 whose optical path was switched in response to on/off of the control light beam 121 and directed to an optical detector measured by an oscilloscope are shown in FIGS. 23 and 24. The axis of ordinate of FIG. 24 is enlarged three (3) times as large as that of FIG. 23. The frequency of the square wave that turned on and off the control light beam 121 was set at 200 Hz to 100 kHz and the measured result of the amplitude L of the waveform 6220 of the signal light beam corresponding to the turning on and off of the signal light beam in that case is shown in FIG. 25.

As shown in FIG. 23, the frequency of the square wave that turned on and off the control light beam 121 (FIG. 4) was 500 Hz and assuming that the amplitude L of the waveform 6220 of the signal light beam corresponding to the turning on and off of the signal light beam in this case was one (1) as a reference, the amplitude L was approximately one (1) for the frequency range of 0.2 to 2 kHz of the square wave that turned on and off the control light beam 121 (FIG. 4). That is, it was confirmed that complete optical path switching was possible in 500 μsec. This high-speed response was performed at greater than twice the speed of an optical switch using a thermo-optical effect using an electric heater, which typically have a response speed measured in milliseconds.

Figure 25:
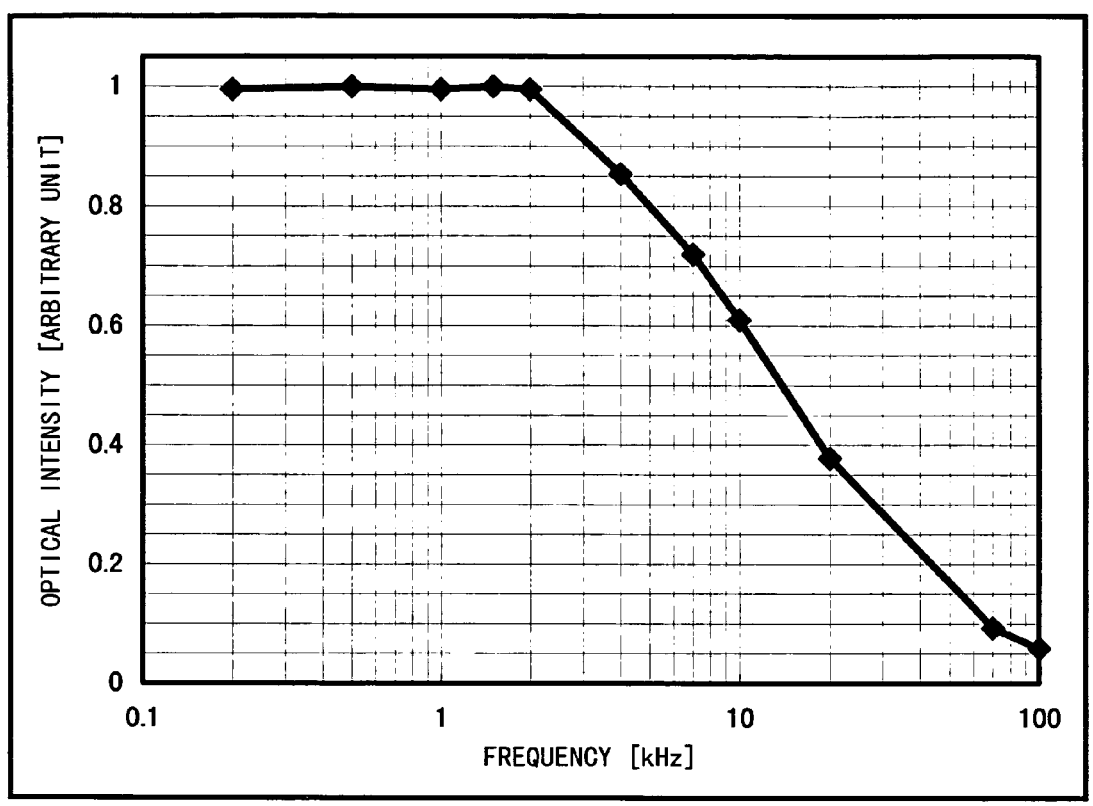
FIG. 25 shows the relationship between a frequency for turning on and off the control light beam and the intensity (amplitude) of the signal light beam for which optical paths have been switched.

As an example for the case when the frequency is further increased, the waveform 6220 of the signal light beam at a frequency of 20 kHz is shown in FIG. 25. As can be seen from FIG. 25, when the control light beam has been turned off before the switching of the optical paths by the thermal lens effect is completed, the waveform of the signal light beam becomes a saw-tooth shape and the amplitude L becomes smaller. That is, when the response speed of the thermal lens effect is exceeded, the switching of the optical paths is incomplete, and the paths of a portion of the signal light beam are not switched and travel straight.

The same measurement as that measured for the optical response speed of the optical path switching mechanism in the first stage described as above was carried out for the second-stage and the third-stage optical path switching mechanisms with each of the signal light beams 122 and 123 being turned on and off, and a high response speed equivalent to that of the first stage was obtained in each stage.

In order to measure the durability of the optically controlled optical-path-switching-type data distribution apparatus of Example 1, a continuous light beam was used as the signal light beam while square-wave intermittent light beams at a frequency of 1 kHz and a duty ratio of 1:1 were irradiated respectively as the control light beams 121, 122 and 123, and the intensity amplitudes over time of the signal light beam for which the optical paths had been switched were compared. As a result, the intensity amplitude of neither of the signal light beams was attenuated, even after ten thousand hours of continuous operation.

In order to verify the polarized-wave dependence of the optically controlled optical-path-switching-type data distribution apparatus of Example 1, a single polarizing device was inserted in the signal light beam and the control light beam, and an experiment was conducted varying the polarization angle in various manners. Absolutely no polarized-wave dependence was found in any test.

In order to test the cross-talk characteristic of and between the exiting straight-traveling light beam and the optical-path-switched light beam of the optically controlled optical-path-switching-type data distribution apparatus of Example 1, the optical intensity of the exiting light beam from the optical fibers 1111, 1112, 1113 and 1114 in optical signal paths was compared in cases when all of the control light beams were turned off, when only the light source 21 for the control light beam was turned on, when only the light source 22 for the control light beam was turned on and when only the light source 23 of the control light beam was turned on. Then, the leaking light (cross-talk) intensity to the exiting light beam intensity of interest was a very weak 2000:1 to 8000:1 (−33 to 39 dB).

In the optically controlled optical-path-switching-type data distribution apparatus of Example 1, one data server device transmits data to four client devices, and the time required for switching optical paths in response to ON or OFF of a control light beam was 0.5 millisecond. Therefore, the delay time Δt for an optical packet in response to ON/OFF of the reference clock pulse as shown in FIG. 3 is 1 millisecond. Thus, the data distributable period to be allocated to one client is (1000/4−1=) 249 millisecond at maximum; the time width of an optical packet can be set to 249 millisecond at maximum; and the data size to (10 Gbps×0.249 second=) 2.49 Gbit, or 311 MB at maximum.

An image data distribution experiment was carried out by distributing 240 to 300 MB of data consisting of 200 pages of high-definition still color images (1.2 to 1.5 MB per one image) having 2272×1704 pixels with 32-bit color information per pixel to each of four users, and the data distribution was successfully completed in one second (equivalent to 1 optical packet×4).

An experiment to distribute four different types of files recording color moving images with a size of 1000 MB to four users was carried out, and the data distribution was successfully completed in four seconds (equivalent to 4 optical packets×4).

Comparison Example 1

An Ethernet (registered trademark) card providing an Ethernet standard transfer rate of 1 Gbps was installed in each of the data server device and the four client devices, and a LAN cable with a length of 10 m was used to connect between the data server device and the switching HUB device providing a standard transfer rate of 1 Gbps, and between each of the client device and the switching HUB device. The data transfer rate was then measured. 58 seconds were required to distribute the moving image files having a size of 1000 MB, which were the files used in Example 1, to each of the client devices simultaneously. The same measurement was performed after changing the Ethernet of the client devices to the cards providing an Ethernet standard transfer rate of 100 Mbps, in which case 123 seconds were required.

Example 2

In an optically controlled optical-path-switching-type data distribution apparatus such as employed in Example 2, all of optical path switching mechanisms 91, 92 and 93 of Example 1 (FIG. 4) are replaced with an optical path switching mechanism 191 (FIG. 6); the beam waist (focal point) of the signal light beams and control beams are set to position 6 (light beam exiting side) close to light-receiving lens 41 of a thermal lens forming device 1; and the diameter of a hole 161 of a hole-provided mirror 61 is set to 2 mm, which is smaller than that of the mirror used in Example 1. Other component elements are the same as those used in Example 1.

Using the device, the beam waist (focal point) of signal light beams and control light beams are set to a position 6 (light beam exiting side) close the a light receiving lens 41 of the thermal lens forming device 1, therefore, the transmittance of 1 to 5% for the control light beams at light absorbing layer film of a thermal lens forming device is preferable. When the optical intensity distribution on the cross-sectional plane of the signal light beam 110 entering an optical path switching mechanism 191 has a Gaussian distribution, or a distribution similar to a Gaussian distribution but not an annular shape, it is preferable to shape the optical intensity distribution on a beam cross-sectional plane of the signal light beam into a annular shape using the beam-cross-section shaping-into-ring lens group 321 comprising a circular-cone-prism-type lens, etc. Furthermore, when the signal light beams and the control light beams are simultaneously irradiated, the converged traveling straight signal light beam 119 exiting the thermal lens 60 formed by the optical absorption of the control light beams has a smaller beam diameter, and the beam waist thereof becomes relatively large, as described above, after the signal light beam 119 is condensed in the latter stages. In order to avoid this, it is preferable to cause the converged traveling straight signal light beam 119 to exit as the signal light beam 111 by expanding the radius of the signal light beam 119 to 5 mm that is equal to the radius of the entering signal light beam 110 using the beam expander 331.

Figure 7:
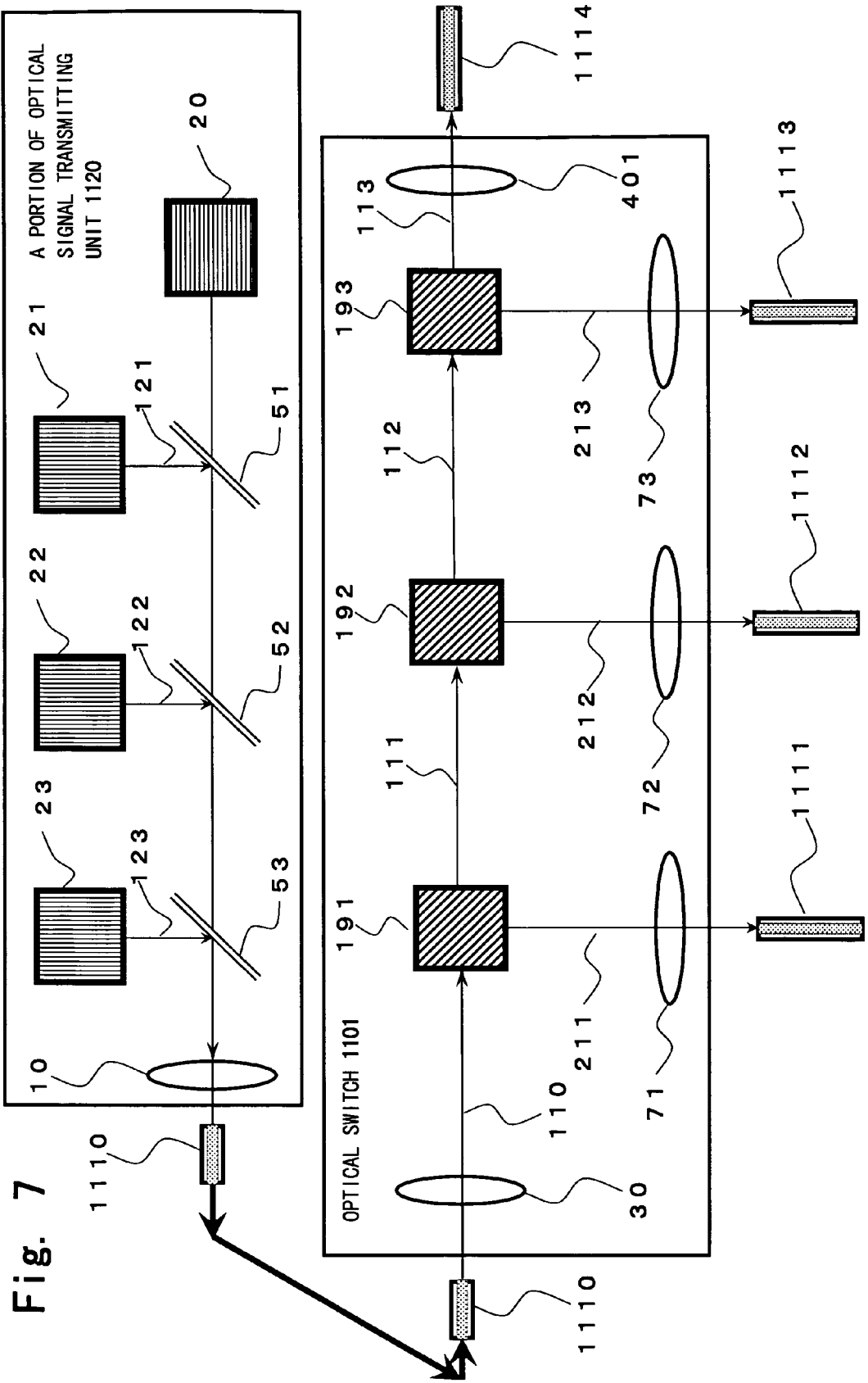
FIG. 7 is a simplified schematic representation of the configuration of an optically controlled optical-path-switching-type data transmitting apparatus in an Example 2 of the present invention.

The relationship between the on/off state of the control light beams 121, 122, and 123 of the optically controlled optical-path-switching-type data distribution apparatus of Example 2 and optical path switching is as described below. When at least the control light beam 121 is turned off, the signal light beam 110 is reflected by the reflection surface of a hole-provided mirror 61, exits as an optical path switching signal light beam 211, and condensed by a condenser lens 71, and enters an optical fiber 1111. When the control light beams 121 is turned on, the signal light beam 110 passes through the hole 161 of the hole-provided mirror 61 as the converged straight-traveling signal light beam 119 then the beam diameter thereof is expanded to the diameter that is equals to the beam diameter of the entered signal light beam 110 by the beam expander 331, and enters the second stage optical path switching mechanism 192 (FIG. 7). When the control light beam 121 turns on while the control light beam 122 turns off, the signal light beam 111 exits as an optical path switched light beam 212, and enters an optical fiber 1112. When the control light beams 121 and 122 are turned on at the same time, the signal light beam travels straight, and enters the third-stage optical path switching mechanism 193 (FIG. 7) as the signal light beam 112, while enters an optical fiber 1113 as the optical path switched light beam 213 when the control light beams 121 and 122 are turned on simultaneously and the control light beam 123 is turned off. When all the control light beams 1121, 122 and 123 are turned off, the signal light beam 110 will finally exits as a straight-traveling signal light beam 113 that is condensed by a condenser lens 401 then enters an optical fiber 1114.

In order to measure the optical response speed of the optically controlled optical-path-switching-type data distribution apparatus of Example 2, a continuous light beam was used as the signal light beam while a square-wave intermittent light beam at a frequency of several Hz to 100 kHz and a duty ratio of 1:1 was irradiated as the control light beam 121, and magnitudes of the intensity amplitudes of the signal light beam for which the optical paths had been switched were compared. As a result, it was found that the intensity amplitude was not varied up to 2 kHz relative to the intensity amplitude of the signal light beam at 1 Hz and that, when the frequency was further increased, the intensity amplitude was gradually attenuated, and at 10 kHz, the intensity amplitude was attenuated to a half of the original magnitude thereof. That is, it was confirmed that complete optical path switching was possible in 500 μsec. This is a response speed more than twice as fast as the fastest known optical switch using a thermo-optical effect using an electric heater. When the control light beams 122 and 123 turned on and off similarly, a response speed similar to that when the control light beam 121 was turned on and off was observed.

In order to measure the durability of the optically controlled optical-path-switching-type data distribution apparatus of Example 2, a continuous light beam was used as the signal light beam while square-wave intermittent light beams at a frequency of 1 kHz and a duty ratio of 1:1 were irradiated respectively as the control light beams 121, 122, and 123, and the intensity amplitudes over time of the signal light beam whose optical paths had been switched were compared. The result shows that the intensity amplitude of either of the signal light beams was not attenuated even after ten thousand hours of continuous operation.

In order to test the cross-talk characteristic between the exiting straight-traveling light beam and the optical-path-switched light beam of the optically controlled optical-path-switching-type data distribution apparatus of Example 2, the optical intensities of the exiting light beam from the optical fibers 101, 11, 12 and 13 were compared in tests wherein all of the control light beams were turned off, wherein only the light beam 121 was turned on, wherein only the light beams 121 and 122 were turned on, and wherein the control light beams 121, 122 and 123 were all turned on. As a result, the leaking light (cross-talk) intensity to the exiting light beam intensity of interest was very weak, between 1000:1 to 2000:1 (−30 to 33 dB).

An image data distribution experiment was carried out by distributing 240 to 300 MB of data consisting of 200 pages of high-definition still color images (1.2 to 1.5 MB per one image) having 2272×1704 pixels with 32-bit color information per pixel to each of four users. In each case, data distribution was successfully completed in one second.

Example 3

The installation angle (45 degrees against the optical axis of the signal light beam 110) of a hole-provided mirror 61 as used in Example 1 can be changed and, by determining the shape (the length of the major axis against that of the minor axis) of the elliptic hole 161 through the calculation using trigonometric functions based on the installation angle, the angle of the optical path switching against the optical axis of the signal light beam 110 can be changed freely within a range of approximately 5 to 175 degrees. The hole-provided mirrors 62 and 63 disposed in the second and subsequent stages can similarly be changed.

Furthermore, by rotating the installation position of the hole-provided mirror 61 using the optical axis of the signal light beam 110 as a rotation axis and also moving the position of the condenser lens 71, etc., the switching of the optical path switching direction relative to the optical axis of the signal light beam 110 can be changed freely within a range from 0 to 360 degrees. Installation positions of the hole-provided mirrors 62 and 63 in the second and subsequent stage can also similarly be changed.

Example 4

Figure 8:
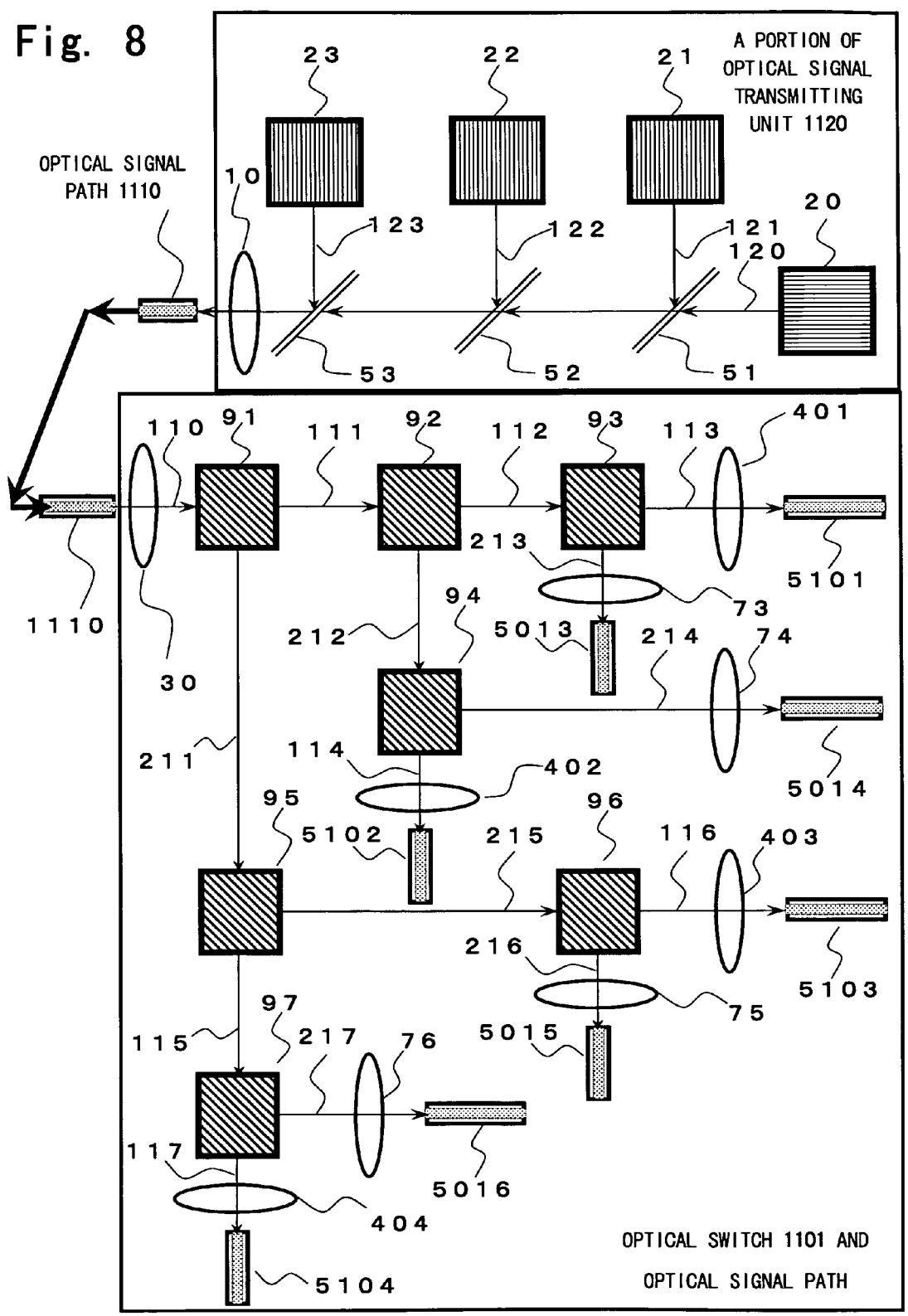
FIG. 8 is a simplified schematic representation of the configuration of an optically controlled optical-path-switching-type data transmitting apparatus in an Example 4 of the present invention.
Figure 9:
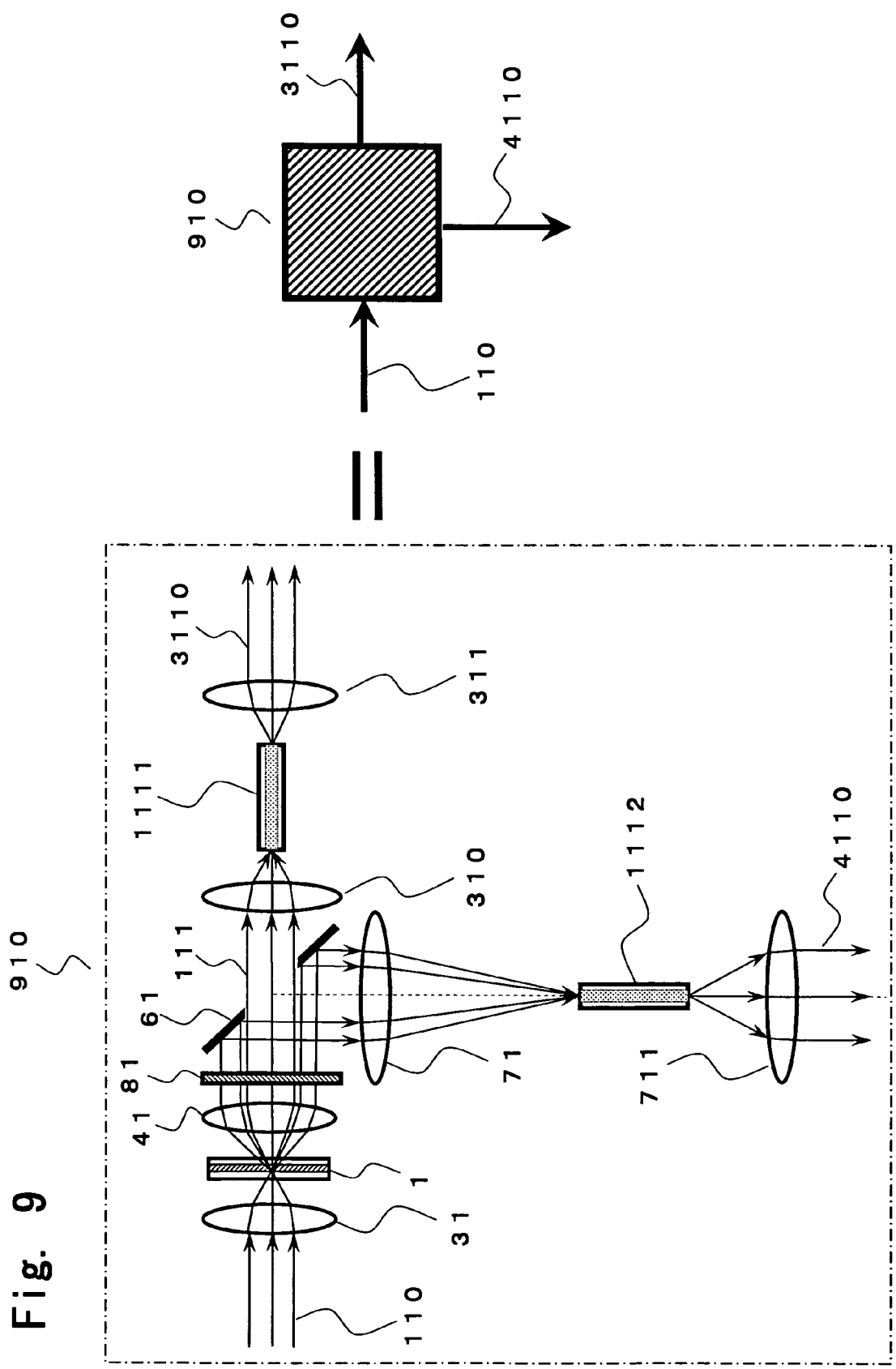
FIG. 9 is a simplified schematic representation of the configuration of an optical path switching mechanism of an optical-fiber-coupling type.

FIG. 8 shows a schematic view of the configuration of an optically controlled optical-path-switching-type data distribution apparatus as employed in Example 4. In FIG. 8, a light source 20 for a signal light beam, light sources 21, 22 and 23 for control light beams, dichroic mirrors 51, 52 and 53, a condenser lens 10, an optical fiber 100 and a collimating lens 30 identical to those used in Example 1 are employed.

The optically controlled optical-path-switching-type data distribution apparatus in FIG. 8 is an apparatus that distributes data to eight client devices by switching the optical paths of the signal light beam 120 to eight directions of the optical fibers 5101, 5102, 5103, 5104, 5013, 5014, 5015, and 5016, via a total of seven optical path switching mechanisms formed by adding and connecting, in the spatial connecting scheme, one optical path switching mechanism with the optical path switching mechanism 92 in the second stage of the Example 1 and three optical path switching mechanisms to the subsequent stage of the optical path switching mechanism 91 in the first stage, with the combinations of simultaneous turning on and off of all of the three types of control light beams. That is, in terms of the principle, in general, assuming that n is an integer of two or larger, then switching of optical paths in $2^n$ directions is enabled by connecting $2^n-1$ optical path switching mechanisms with combinations of states of turning on and off of n types of control light beams. In practice, the number of practical combination stages is determined by the combinations of transmittances of the signal light beam per one stage of the optical path switching mechanism. Assuming that the transmittance of the straight-traveling signal light beam whose optical path is not switched by the optical path switching mechanism is 85% (attenuation of 0.7 dB as the signal intensity), and that the attenuation factor of the switched signal light beam whose optical path was switched is 80% (attenuation of 1.0 dB as the signal intensity), then the total transmittance of the straight-traveling signal light beam whose the optical path has been switched throughout the optical path is 61.4% (attenuation of 2.1 dB as the signal intensity), the total transmittance when the optical path has been switched in all of the three stages is 51.2% (attenuation of 2.9 dB as the signal intensity). The combinations of the simultaneous turning on and off of the three (3) types of control light beams 121, 122 and 123 and the destinations of the exiting signal light beams are summarized in Table 2.

TABLE 2

| | Control Light Beam | | | Destination of Exiting |
|---|---|---|---|---|
| | 121 | 122 | 123 | Light Beam |
| Combination of ON and OFF of the Control Light Beams | off | off | Off | 5101 |
| | off | off | On | 5013 |
| | off | on | Off | 5014 |
| | off | on | On | 5102 |
| | on | on | Off | 5104 |
| | on | on | On | 5016 |
| | on | off | Off | 5015 |
| | on | off | On | 5103 |

As the thermal lens forming device of the optical path switching mechanism 91 in the first stage, similarly to the case of Example 1, a pigment-solution-filling-type thermal lens forming device filled with a solution of the pigment [1] that absorbs the signal light beam 121 having a wavelength of 532 nm was used. The wavelength transmittance property was also set to be same as that used in Example 1.

As the thermal lens forming devices of the optical path switching mechanisms 92 (that spatially couples with the straight-traveling light beam 111 from the optical path switching mechanism 91) and 95 (that spatially couples with the switched light beam 211 from the optical path switching mechanism 91) in the second stage, in either case, and again similar to Example 1, a pigment-solution-filling-type thermal lens forming device filled with a solution of the pigment [2] that absorbs the signal light beam 122 having a wavelength of 670 nm was used. The wavelength transmittance properties of the pigment will be described below.

As the thermal lens forming devices of the optical path switching mechanisms 93 (that spatially couples with the straight-traveling light beam 112 from the optical path switching mechanism 92), 94 (that spatially couples with the switched light beam 212 from the optical path switching mechanism 92), 96 (that spatially couples with the switched light beam 215 from the optical path switching mechanism 95) and 97 (that spatially couples with the straight-traveling light beam 115 from the optical path switching mechanism 95) in the third stage, in any of those cases, similarly to the case of Example 1, a pigment-solution-filling-type thermal lens forming device filled with a solution of the pigment [3] that absorbs the signal light beam 123 having a wavelength of 800 nm was used. The wavelength transmittance properties of this pigment will be described below.

Here, in the optical path switching mechanisms 92, 93, and 97 in the latter stages that couple with the straight-traveling light beam from the optical path switching mechanism in the previous stage, similarly as in Example 1, the signal light beams and the control light beams were adjusted such that these beams focus at a position corresponding to the position 5 of FIG. 11a and FIGS. 13a and 13b, i.e., a position close to the entering surface of the light absorbing layer films of the thermal lens devices and, furthermore, the sizes of the hole 161, etc. of the hole-provided mirror 61, etc. were set to be equal to those of Example 1. In this manner, the straight-traveling light beam from the optical path switching mechanism in the previous stage can be efficiently made to travel straight or switched by the optical path switching mechanisms in the latter stages. In the optical path switching mechanisms 92, 93, and 97, the transmittance of each of the control light beams were adjusted to be 0.0 to 0.2% and the transmittance of the signal light beam having a wavelength of 850 nm was adjusted to be 85 to 99%.

On the other hand, in the optical path switching mechanisms 94, 95 and 96 that couple with the optical-path-switched light beam (the light beam having the annular cross-section) from the optical path switching mechanism in the previous stage, similarly as in the optical path switching mechanism 191 of Example 2, the signal light beams and the control light beams were adjusted such that these beams focus at a position corresponding to the position 6 of FIG. 11b and FIGS. 14a and 14b, i.e., a position close to the exiting surface of the light absorbing layer films of the thermal lens devices and, furthermore, the sizes of the hole 161, etc. of the hole-provided mirror 61, etc. were set equal to those of Example 2. However, the beam-cross-section shaping-into-ring lens group 321 (FIG. 6) in the optical path switching mechanism 191 was not provided because the optical-path-switched annular signal light beams 212, 211, and 215 were spatially coupled respectively and entered the optical path switching mechanisms 94, 95, and 96 from the optical path switching mechanism in the previous stage, with the annular shapes being maintained. On the other hand, the beam expander 331 (FIG. 6) for expanding the beam diameter of the converged straight-traveling signal light beam 119 was provided with each of the optical path switching mechanisms 94, 95, and 96.

By doing this, the optical-path-switched light beam having an annular cross section exiting from the optical path switching mechanism in the previous stage can be efficiently caused to travel straight or switched by the optical path switching mechanisms in the latter stages. In the optical path switching mechanisms 94, 95, and 96, the transmittance of each of the control light beams were adjusted to be 1.0 to 5.0% and the transmittance of the signal light beam having a wavelength of 850 nm was adjusted to be 85 to 99%.

The straight-traveling light beams 113, 114, 116, and 117 exiting from the optical path switching mechanism in the third stage (the final stage) are condensed by respective condenser lenses 401, 402, 403, and 404, and enter respective exiting signal light beam optical fibers 5101, 5102, 5103, and 5104, while the optical-path-switched light beams 213, 214, 216, and 217 also exiting the optical path switching mechanism are condensed by respective condenser lenses 73, 74, 75, and 76 and enter respective exiting signal light beam optical fibers 5013, 5014, 5015, and 5016. The specifications of these optical fibers are the same as those specified in Example 1.

For the optically controlled optical-path-switching-type optical signal transmission apparatus of Example 4, the optical response speeds of the optical path switching mechanisms in the first to third stages were measured in the same manners as in Example 1 and similar results were obtained.

The durability of the optically controlled optical-path-switching-type data distribution apparatus of Example 4 was test in the same manners as in Example 1 and, for any of the optical path switching mechanisms, the intensity amplitude of the signal light beam was not attenuated even after ten thousand hours of continuous operation respectively and high durability was verified.

In order to verify the polarized-wave dependence of the optically controlled optical-path-switching-type data distribution apparatus of Example 4, one polarizing device was inserted in each of the signal light beam and the control light beam, and an experiment was conducted while varying the polarization angle in various manners. As a result, no polarized-wave dependence was detected.

In order to test the cross-talk property of the eight exiting signal light beams of the optically controlled optical-path-switching-type data distribution apparatus of Example 4, the optical intensities of the exiting light beams from the optical fibers 5013, 5014, 5015, 5016, 5101, 5102, 5103, and 5104 were compared for the eight combinations of the turning on and off of the control light beams as shown in Table 2. Then, the leaking light (cross-talk) intensity to the exiting light beam intensity of interest was a relatively weak 1000:1 to 8000:1 (−30 to 39 dB).

In the optically controlled optical-path-switching-type data distribution apparatus of Example 4, a single data server device distributes data to 8 client devices, and the time required to switch optical paths in response to turning on and off of a control light beam is 0.5 millisecond for each. Therefore, the optical packet delay time $\Delta t$ in response to ON or OFF of a reference clock pulse shown in FIG. 3 is 1 millisecond. Thus, the data distribution time that is allowed to allocate to one client is (1000/8−1) 124 millisecond at maximum. Thus the time width of an optical packet can be set to 124 millisecond at maximum, and the data size can be set to (10 Gbps×0.124 second=) 1.24 Gbit, or 155 MB at maximum.

As an image data distribution experiment, 120 to 150 MB of data consisting of 100 pages of high-definition still color images (1.2 to 1.5 MB per one image), each having 2272× 1704 pixels with 32-bit color information per pixel, was distributed to each of the eight users. The data distribution was successfully completed in one second.

Example 5

Figure 10:
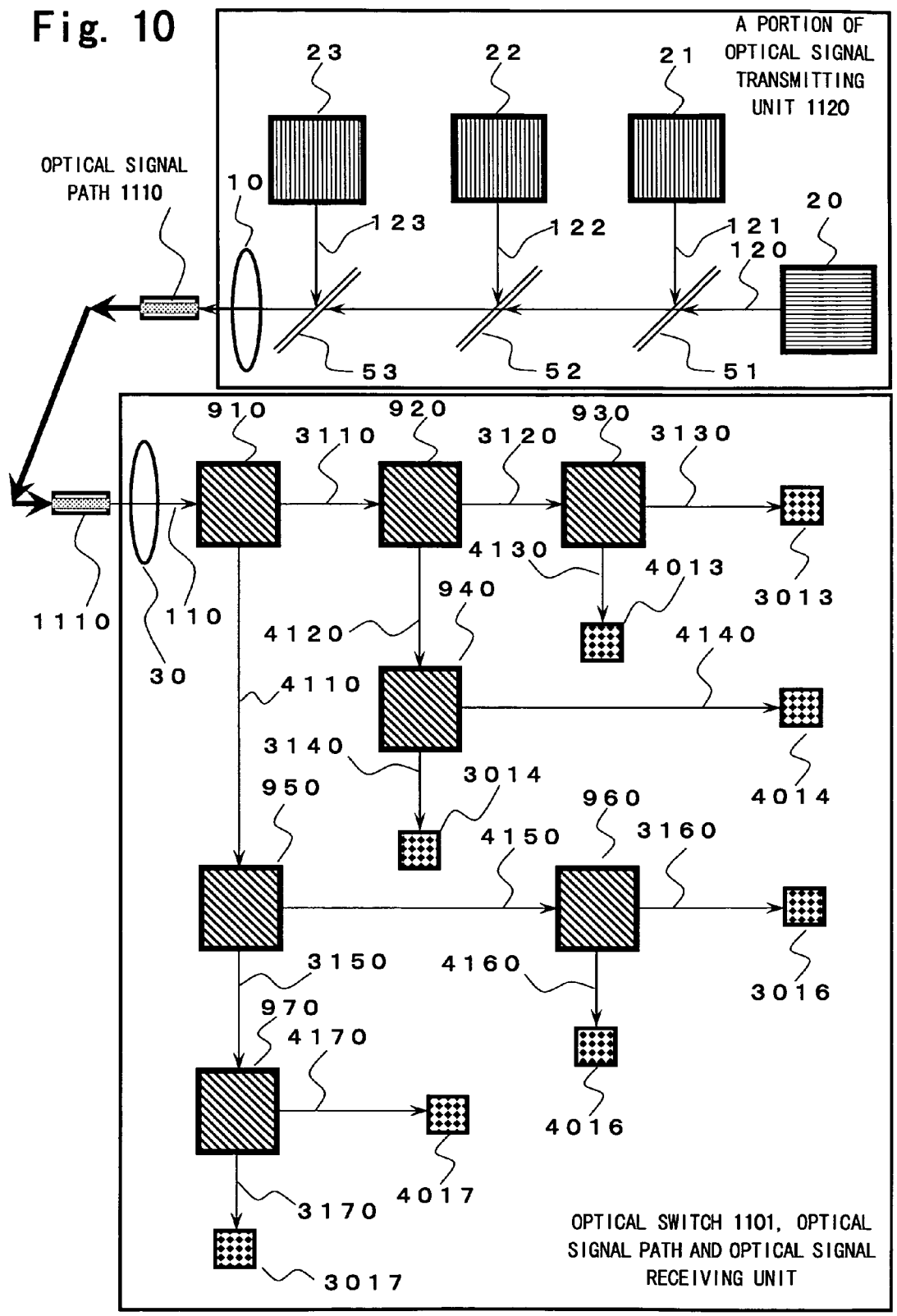
FIG. 10 is a simplified representation of the configuration of an optically controlled optical-path-switching-type data transmitting apparatus in Example 5.

In FIG. 10, a schematic view of the configuration of an optically controlled optical-path-switching-type data distribution apparatus of Example 5 is shown. Example 5 is an apparatus in which the spatially-coupling-type optical path switching mechanisms 91, 92, 93, 94, 95, 96, and 97 (corresponding to those shown in FIG. 5 or FIG. 6) in the optically controlled optical-path-switching-type data distribution apparatus of Example 4 are replaced with optical-fiber-coupling-type optical path switching mechanisms 910, 920, 930, 940, 950, 960 and 970 (corresponding to those shown in FIG. 9). In all of the optical-fiber-coupling-type optical path switching mechanisms, similar as in the optical path switching mechanisms of Example 1, the signal light beams and the control light beams were adjusted such that these beams focus at a position corresponding to the position 5 of FIGS. 11a, 13a and 13b, i.e., a position close to the entering surface of the light absorbing layer films of the thermal lens devices and, furthermore, the sizes of the hole 161, etc. of the hole-provided mirror 61, etc. were set equal to those used in Example 1. Moreover, in all of the optical-fiber-coupling-type optical path switching mechanisms, the configuration, the material and the transmittance of the thermal lens forming devices were set to be the same as those used in Example 1. The length of optical fibers connecting each of the optical-fiber-coupling-type optical path switching mechanisms was set to be 10 to 100 m, assuming they are used in ordinary homes, hospitals, offices, etc.

In order to compensate for the loss of the control light beams caused by the optical-fiber coupling, in the optical path switching mechanisms in all of the stages, the power of the control light beams that enters the thermal lens forming devices was adjusted to be 2 to 5 mW by increasing the output power of the light sources 21, 22, and 23 for the control light beams. Furthermore, the output power of the light sources for the signal light beams was also adjusted such that each of the eight exiting signal light beams has sufficient power.

The straight-traveling exiting signal light beams in the optical path switching mechanisms 930, 940, 960, and 970 in the third stage were made to enter respectively light receiving devices 3013, 3014, 3016, and 3017 through optical fibers and collimating lenses, and the optical-path-switched signal light beams were caused to enter respectively light receiving devices 4013, 4014, 4016, and 4017 through optical fibers and collimating lenses.

The correspondence between the combinations of the simultaneous turning on and off of the three control light beams 121, 122, and 123 and the destinations of the exiting signal light beams in Example 5 are summarized in Table 3.

TABLE 3

|  | Control Light Beam | | | Destination of Exiting |
|---|---|---|---|---|
|  | 121 | 122 | 123 | Light Beam |
| Combination | off | off | Off | 5101 |
| of ON and OFF | off | off | On | 5013 |
| of Control | off | on | Off | 5014 |
| Light Beams | off | on | On | 5102 |
|  | on | on | Off | 5104 |
|  | on | on | On | 5016 |
|  | on | off | Off | 5015 |
|  | on | off | On | 5103 |

The optical response speed, the durability, the polarized-electromagnetic-wave dependence and the cross-talk of the optically controlled optical-path-switching-type data distribution apparatus of Example 5 were measured in the similar manners as those used in Example 4, and the similar or better results than those of Example 4 were obtained.

The optically controlled optical-path-switching-type data distribution apparatus of Example 5 is an apparatus in which a single data server device distributes data to 8 client devices, and the time required to switch optical paths in response to turning on and off of a control light beam is 0.5 millisecond for each distribution. Therefore, the optical packet delay time Δt in response to ON or OFF of a reference clock pulse shown in FIG. 3 is 1 millisecond. Thus, the maximum data distribution time that can be allocated to any one client is 124 milliseconds. Therefore, the time width of an optical packet can be set to 124 ms at maximum, and the data size can be set to 1.24 Gbit, or 155 MB at maximum.

An image data distribution experiment was performed wherein 120 to 150 MB of data consisting of 100 pages of high-definition still color images (1.2 to 1.5 MB per one image), each having 2272×1704 pixels with 32-bit color information perpixel, was distributed to each of eight users, with the result that data distribution was successfully completed in one second.

The present invention provides an optically controlled optical-path-switching-type data distribution apparatus and distribution method that operates at a high speed and has high durability and no polarized-electromagnetic-wave dependence, without using any electric circuit and any mechanical movable portions.

INDUSTRIAL APPLICABILITY

The optically controlled optical-path-switching-type data distribution apparatus and distribution method may be preferably used in, for example, a system for distributing, at a high speed, a large volume of digital information such as high definition image data, high definition moving image data, etc. from a server to a selected specific client among a plurality of clients in an office, factory, hospital, private home, or the like.

The invention claimed is:

1. An optically controlled optical-path-switching-type data distribution apparatus for providing data from a data server device to one or more specific client devices selected from a plurality of client devices comprising:
a data server device, a data communication unit and a client device, wherein:
the data communication unit comprises:
an optical switch, an optical signal path, an optical signal transmitting unit, an optical signal receiving unit, and data transmission/receipt control unit;
the optical signal transmitting unit comprising a signal light beam light source for irradiating a signal light beam having one or more wavelengths, and a control light beam light source for irradiating a control light beam having one or more wavelengths that are different from those of the signal light beam;
the optical switch comprising:
one or more light absorbing layer films for transmitting the signal light beam and selectively absorbing respectively only one specific wavelength of the control light beams,
means for respectively converging and irradiating the control light beam and the signal light beam to each of the light absorbing layer films,
one or more thermal lens forming devices for causing the converged signal light beam to exit at an angle of divergence in response to the presence or absence of irradiation of the one specific wavelength of the control light beam, by using a thermal lens containing the light absorbing layer films and based on a distribution of refractive index produced reversibly caused by temperature increase generated in an area of the light absorbing layer film that has absorbed the one specific wavelength of the control light beam and in the periphery thereof,
wherein when the one specific wavelength of the control light beam is irradiated and focused at a first portion of the thermal lens, the angle of divergence of the signal beam is greater than the angle of divergence of the signal beam when the one specific wavelength is absent, and when the one specific wavelength of the control light beam is irradiated and focused at a second portion of the thermal lens, the angle of divergence of the signal beam is smaller than the angle of divergence of the signal beam when the one specific wavelength is absent, and
one or more mirrors, each provided after one of the thermal lens forming devices and having a hole and reflecting means, for passing the signal light beam exiting the thermal lens forming devices through the hole or deflecting the optical path of the signal light beam by reflecting the signal light beam by the reflecting means in response to the presence or absence of irradiation of the one specific wavelength of the control light beam.

2. An optically controlled optical-path-switching-type data distribution apparatus of claim 1, wherein the data communication unit irradiates and transmits an arbitrary size of digital information that has been split into optical packets, each containing a fixed length or variable length optical digital signals as the signal light beam, and actuates the optical switch by irradiating an optical tag representing the identification information of a destination client device to each of the optical packets as the control light beam in synchronization with the irradiation of the optical packets.

3. An optically controlled optical-path-switching-type data distribution apparatus of claim 1, wherein the signal light beam transports packets containing digital information of an arbitrary size that has been split into a pack of fixed length or variable length digital signals as optical packets;

the control light beam that is irradiated in synchronization with the irradiation of the optical packets as the optical tag representing the identification information on a destination client device for each optical packet, and that changes optical paths of the optical packets.

4. An optically controlled optical-path-switching-type data distribution apparatus of claim 1 wherein the light absorbing layer film contains two (2) or more pigments selected from a group consisting of:

N, N'-bis(2,5-di-tert-butylphenyl)-3,4,9,10-perylenedicarboxyimide) [1],

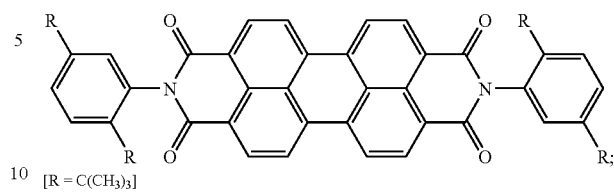

[R = C(CH₃)₃]

Copper(11)2,9,16,23-tetra-tert-butyl-29H, 31H-phthalocyanine [2],

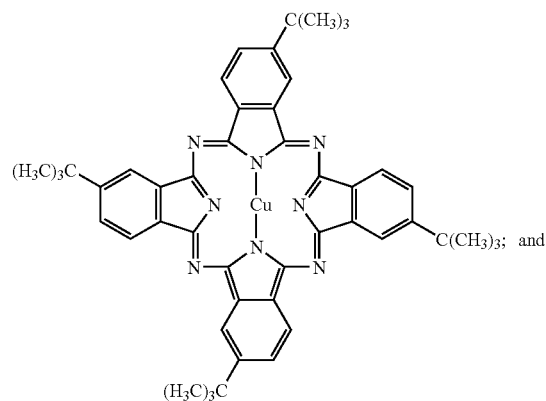

Vanadyl 2,11,20,29-tetra-tert-butyl-2,3-naphthalocyanine [3],

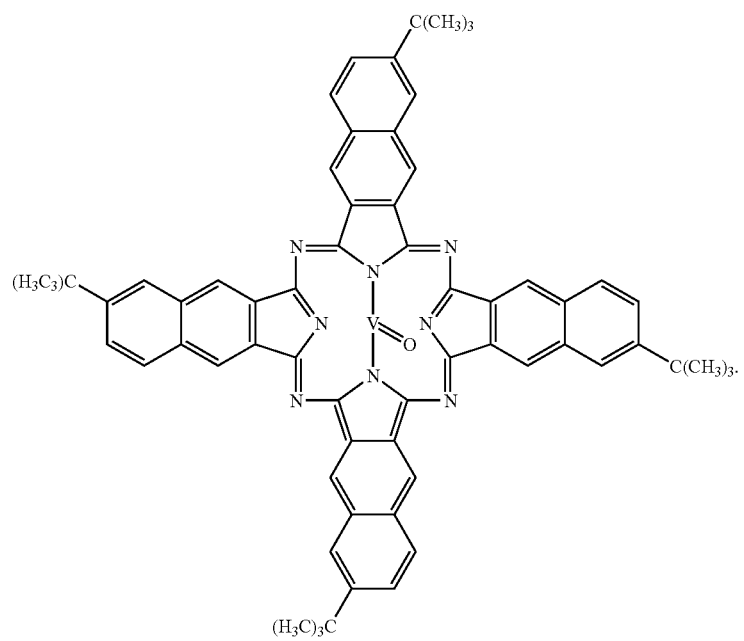

5. An optically controlled optical-path-switching-type data distribution apparatus of claim 1 wherein
a data server device distribute digital static image data or moving image data to one or more specific client devices selected among a plurality of client devices.

6. An optically controlled optical-path-switching-type data distribution method comprising:
causing a signal light beam of one or more wavelengths carrying data converted to an optical signal, and a control light beam that is irradiated from a control light beam light source in response to a data transporting destination and has one or more wavelengths that are different from those of the signal light beam to travel substantially coaxial and in the same direction;
converging and irradiating respectively the control light beam and the signal light beam to each of one or more light absorbing layer films that transmit the signal light beam and that absorb selectively only one specific wavelength of the control light beam;
at each of one or more thermal lens forming devices each containing one or more of the light absorbing layer films, by using a thermal lens based on a distribution of refractive index produced reversibly caused by temperature increase generated in an area of the light absorbing layer film that has absorbed the one specific wavelength of the control light beam and in the periphery thereof and in response to the presence or absence of irradiation of the control light beam having the one specific wavelength, causing the converged signal light beam to exit maintaining the beam converged or to exit with the angle larger than the normal divergence angle or the normal divergence angle thereof,
wherein when the one specific wavelength of the control light beam is irradiated and focused at a first portion of the thermal lens, the angle of divergence of the signal beam is greater than the angle of divergence of the signal beam when the one specific wavelength is absent, and when the one specific wavelength of the control light beam is irradiated and focused at a second portion of the thermal lens, the angle of divergence of the signal beam is smaller than the angle of divergence of the signal beam when the one specific wavelength is absent;
using a hole-provided mirror having a reflecting surface, in response to the presence or absence of irradiation of the control light beam of the one specific wavelength, causing the signal light beam exited from the thermal lens forming device to travel straight through the hole or changing the optical paths thereof by reflecting the signal light beam at the reflecting surface;
distributing data from a data server device to one or more specific client devices selected among a plurality of client devices.

7. An optically controlled optical-path-switching-type data distribution method of claim 6, wherein
the signal light beam transports packets containing digital information of an arbitrary size that has been split into a pack of fixed length or of variable length digital signals as optical packets;
the control light beam is irradiated in synchronization with the irradiation of the optical packets as the optical tag representing the identification information on a destination client device for each optical packet, to effect changes in the optical paths of the optical packets.

8. An optically controlled optical-path-switching-type data distribution method of claim 6, wherein
the light absorbing layer film contains two (2) or more pigments selected from a group consisting of:
N, N'-bis(2,5-di-tert-butylphenyl)-3,4,9,10-perylenedicarboxyimide) [1],

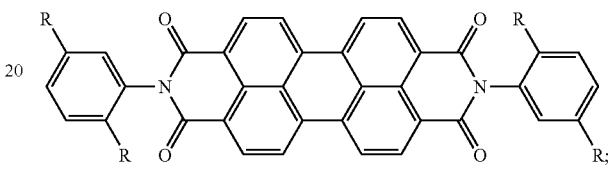

[R = C(CH₃)₃]

Copper(11)2,9,16,23-tetra-tert-butyl-29H, 31H-phthalocyanine [2],

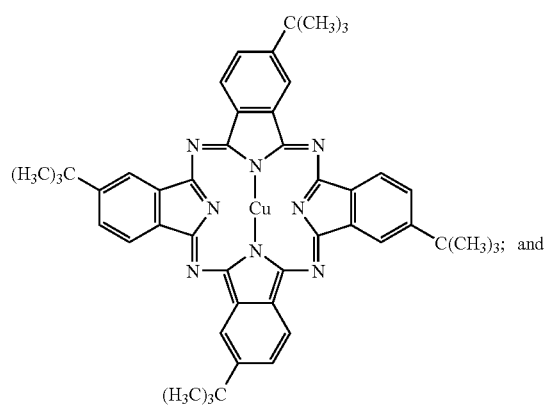

Vanadyl 2,11,20,29-tetra-tert-butyl-2,3-naphthalocyanine [3],

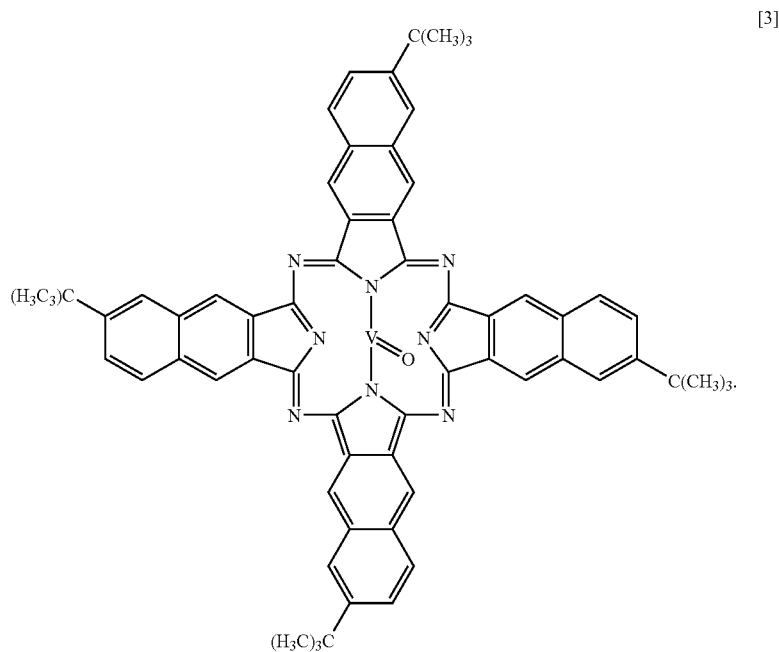
[3]
9. An optically controlled optical-path-switching-type data distribution method of claim 6 wherein
a data server device distribute digital static image data or moving image data for medical use to one or more specific client devices selected among a plurality of client devices.
* * * * *